(12) United States Patent
Fujisawa

(10) Patent No.: US 7,706,360 B2
(45) Date of Patent: Apr. 27, 2010

(54) DISK DEVICE FOR LOADING AND UNLOADING DISKS OF DIFFERENT SIZES

(75) Inventor: Shinichi Fujisawa, Akiruno (JP)

(73) Assignee: TEAC Corporation, Musashino-shi (JP)

( * ) Notice: Subject to any disclaimer, the term of this patent is extended or adjusted under 35 U.S.C. 154(b) by 312 days.

(21) Appl. No.: 11/807,243

(22) Filed: May 24, 2007

(65) Prior Publication Data
US 2007/0277187 A1    Nov. 29, 2007

(30) Foreign Application Priority Data
May 24, 2006    (JP)    ............................. 2006-144416

(51) Int. Cl.
*H04L 12/56* (2006.01)
*H04J 1/16* (2006.01)

(52) U.S. Cl. .................... 370/363; 370/463; 720/620

(58) Field of Classification Search ................ 370/363, 370/419, 463; 720/626, 620
See application file for complete search history.

(56) References Cited

U.S. PATENT DOCUMENTS

| | | | |
|---|---|---|---|
| 5,022,023 A | 6/1991 | Toyoguchi | |
| 5,113,388 A | 5/1992 | Yamada | |
| 5,150,349 A | 9/1992 | Takai | |
| 5,173,894 A | 12/1992 | Kido | |
| 5,828,641 A | 10/1998 | Abe | |
| 6,243,350 B1 * | 6/2001 | Knight et al. | ................ 369/126 |
| 6,414,927 B1 | 7/2002 | Ota | |
| 6,480,442 B1 | 11/2002 | Nakatani | |
| 6,618,341 B1 | 9/2003 | Yamashita | |
| 6,839,898 B2 | 1/2005 | Saji | |
| 6,990,673 B2 | 1/2006 | Lee | |
| 6,993,776 B2 | 1/2006 | Yamanaka | |

(Continued)

FOREIGN PATENT DOCUMENTS

CN    1136204 A    11/1996

(Continued)

OTHER PUBLICATIONS

English translation of Chinese Patent Office First Office Action issued Mar. 28, 2008, in corresponding CN Patent Application No. 2006101387619, 6 pages.

(Continued)

*Primary Examiner*—John Pezzlo
(74) *Attorney, Agent, or Firm*—Christensen O'Connor Johnson Kindness PLLC

(57) ABSTRACT

An optical disk drive of a slot-in type is loadable with any of two optical disks different in the diameter, and has an insertion slot formed in a case chassis for disk loading. A disk entered through the insertion slot is received by a disk support arm set in a ready position. A loading mechanism is actuated when the disk support arm is pressed by the disk. In response to this, plural arms and the disk support arm cooperate to support the disk, which is moved to a chuck position for writing and reading information. For disk unloading, the disk, supported by the plural arms, is moved by the disk support arm to an ejection position. The disk support arm is shifted from an advance position for pressing the disk to the ejection position, to the ready position which is offset toward the chuck position.

10 Claims, 57 Drawing Sheets

U.S. PATENT DOCUMENTS

| | | |
|---|---|---|
| 7,010,798 B2 | 3/2006 | Saji |
| 7,356,825 B2 | 4/2008 | Makisaka |
| 2003/0161243 A1 | 8/2003 | Tuchiya |
| 2005/0060734 A1 | 3/2005 | Aoyama |
| 2005/0125812 A1* | 6/2005 | Ariyoshi et al. ............ 720/601 |
| 2005/0141356 A1 | 6/2005 | Fujisawa |
| 2005/0198656 A1 | 9/2005 | Yamamoto |
| 2006/0085808 A1 | 4/2006 | Fujimura |
| 2006/0230412 A1 | 10/2006 | Fujisawa |

FOREIGN PATENT DOCUMENTS

| | | |
|---|---|---|
| CN | 1201232 A | 12/1998 |
| CN | 1320263 A | 10/2001 |
| CN | 1384498 A | 12/2002 |
| CN | 1637902 A | 7/2005 |
| JP | 10-162466 | 6/1998 |
| JP | 10-289514 | 10/1998 |
| JP | 11066677 A | 3/1999 |
| JP | 11-120657 | 4/1999 |
| JP | 11007689 A | 12/1999 |
| JP | 11007690 A | 12/1999 |
| JP | 2001-056994 | 2/2001 |
| JP | 2002-117604 A | 4/2002 |
| JP | 2002117604 A | 4/2002 |
| JP | 2002-170309 A | 6/2002 |
| JP | 2002-279716 | 9/2002 |
| JP | 2005-190646 | 7/2005 |
| JP | 2006-127680 A | 5/2006 |
| KR | 1019950010274 B1 | 9/1995 |

OTHER PUBLICATIONS

Office Action dated May 2, 2008, from U.S. Appl. No. 11/354,577, filed Feb. 15, 2006.

Office Action dated Nov. 19, 2008, from U.S. Appl. No. 11/354,577, filed Feb. 15, 2006.

Office Action dated Mar. 30, 2009, from U.S. Appl. No. 11/599,999, filed Nov. 14, 2006.

Office Action dated Jun. 19, 2009, from U.S. Appl. No. 11/347,796, filed Feb. 2, 2006.

* cited by examiner

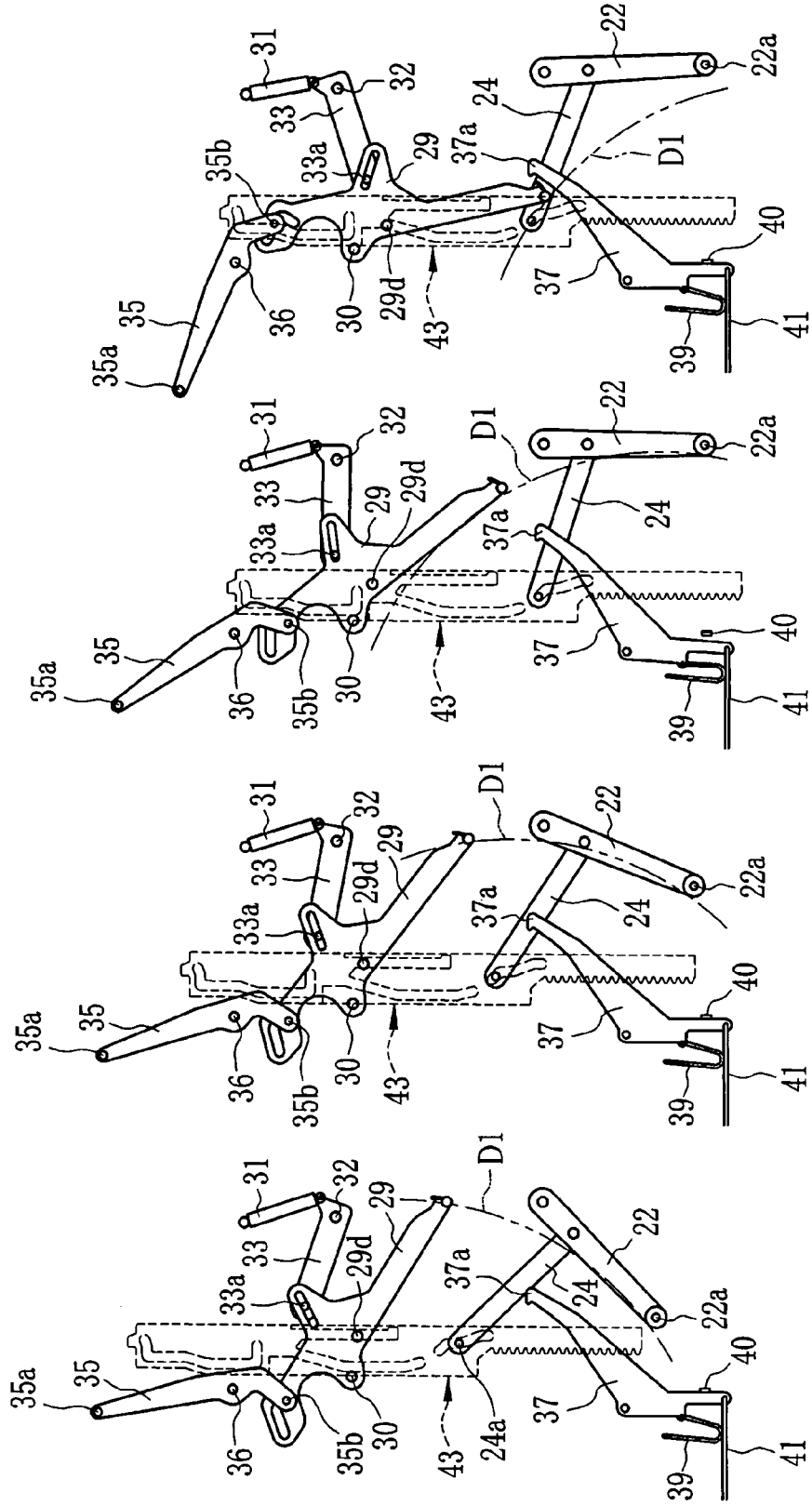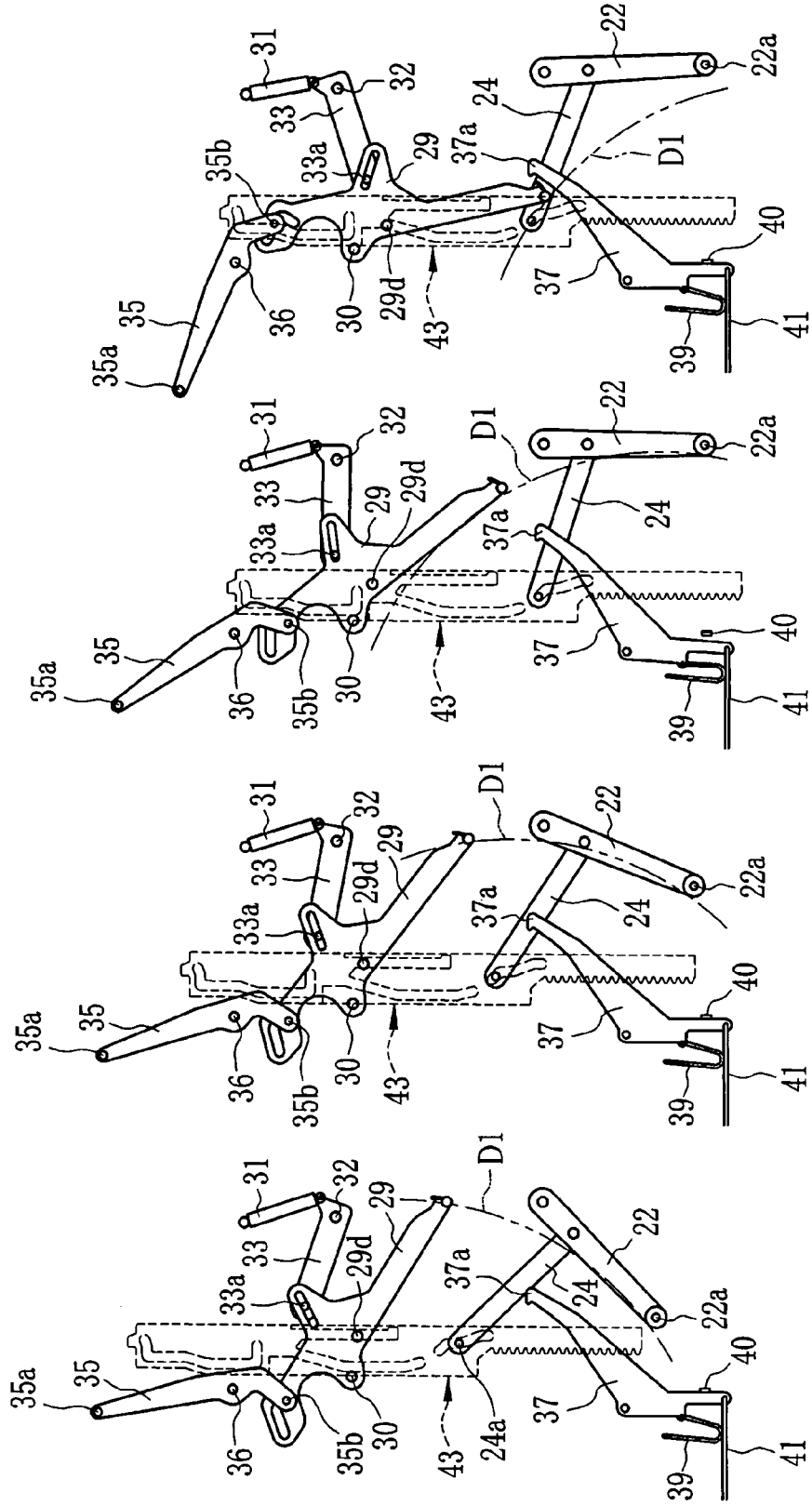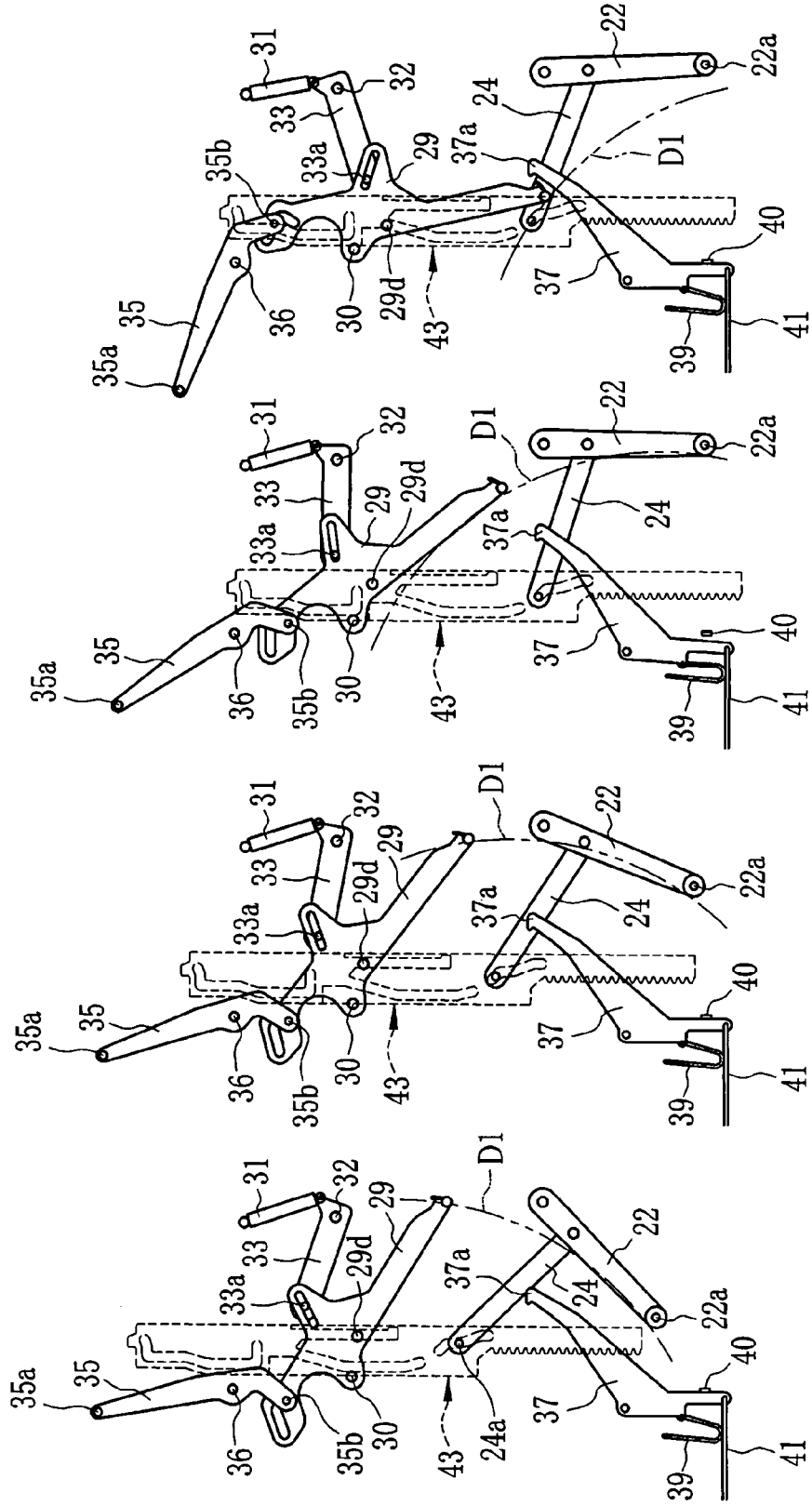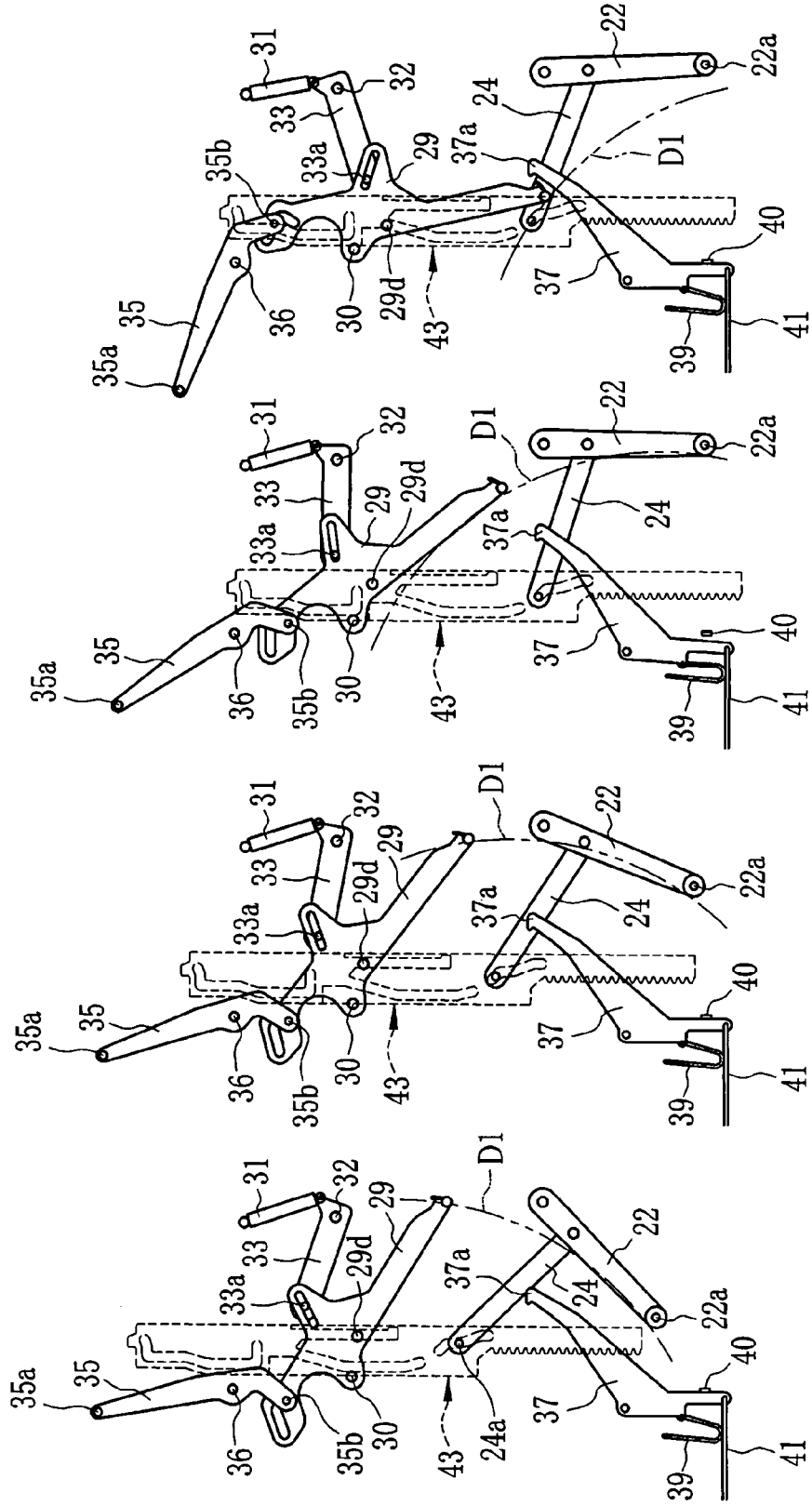

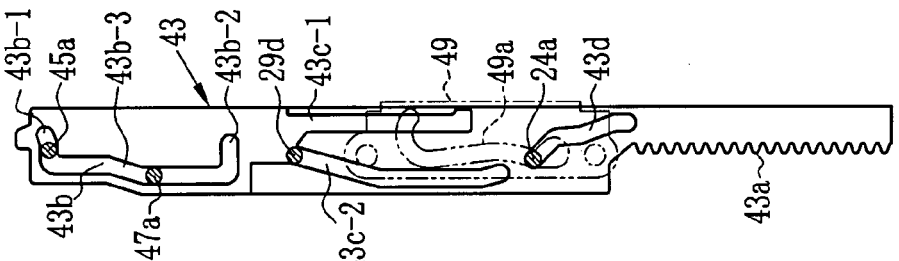
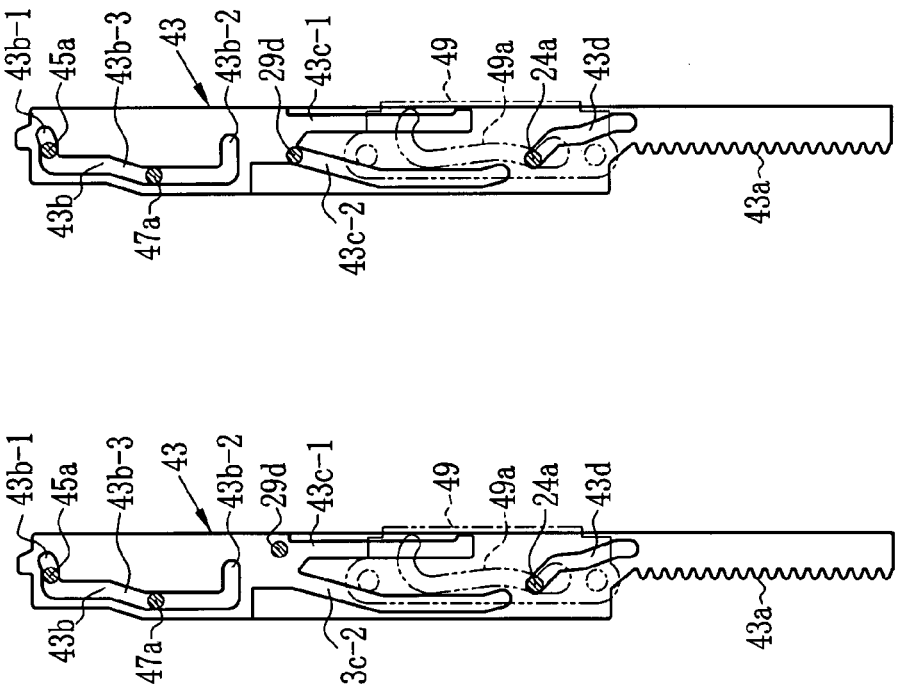
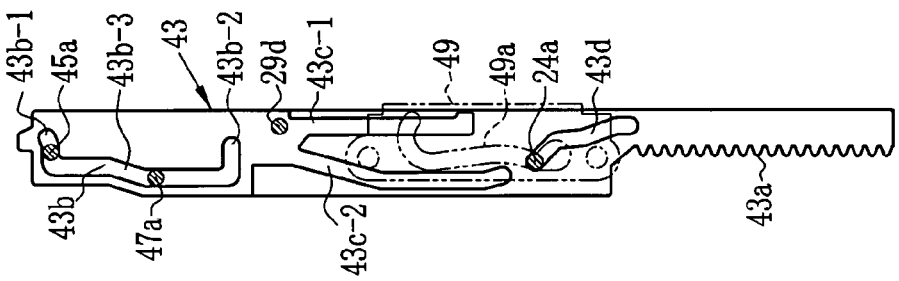
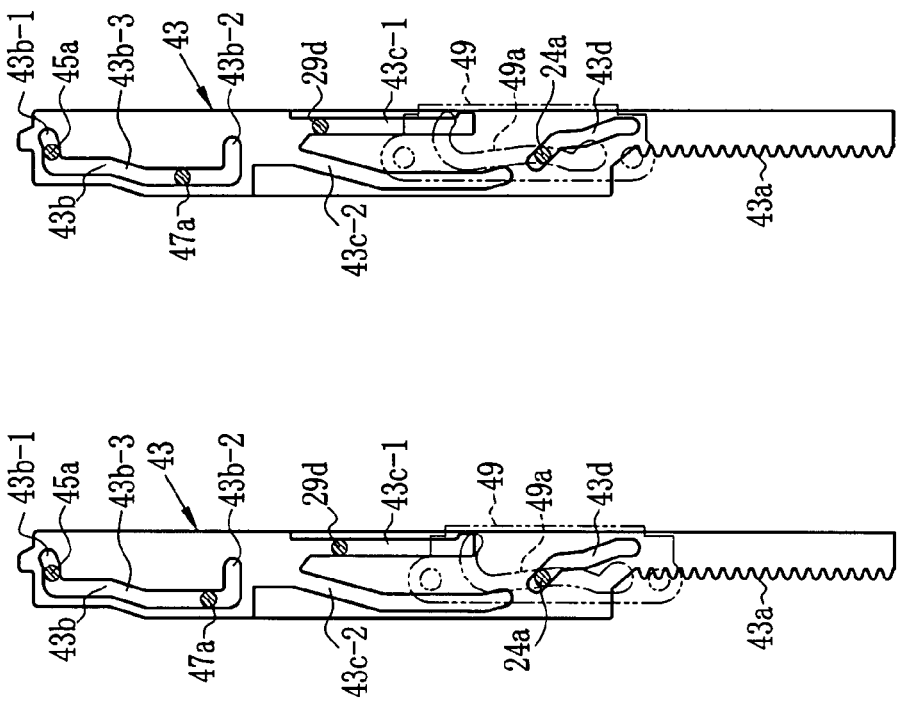

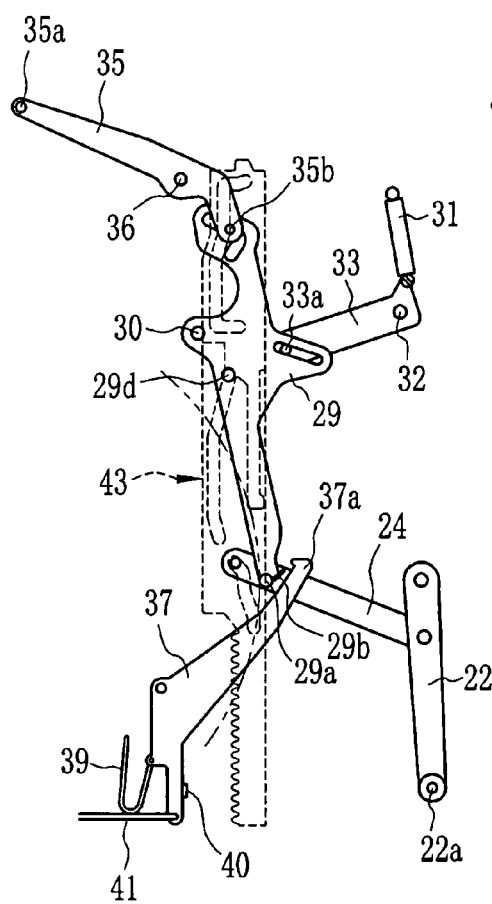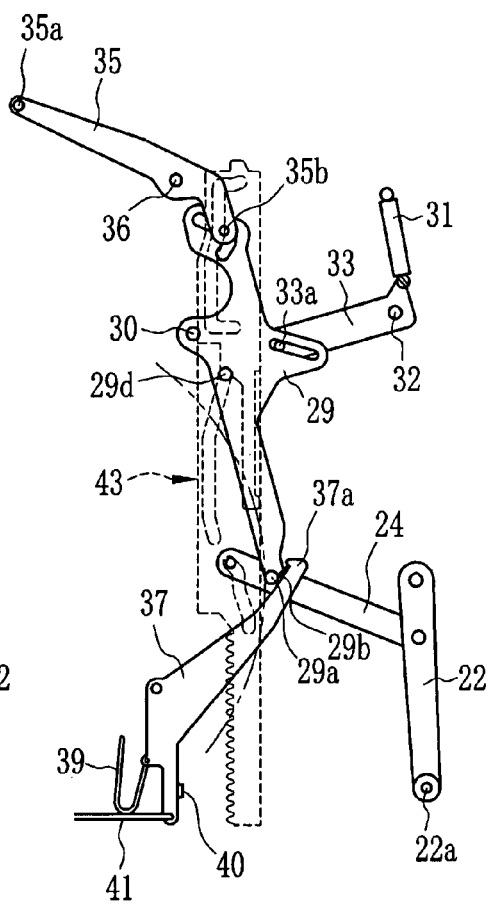

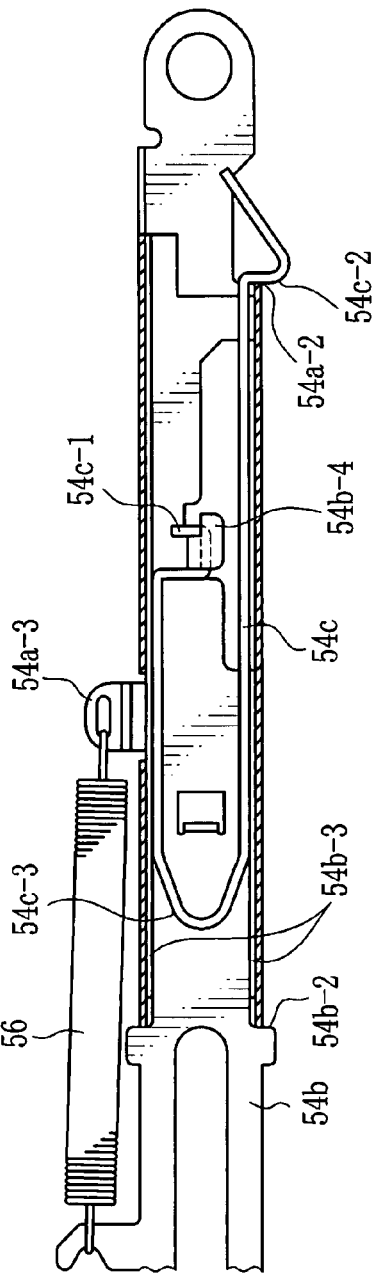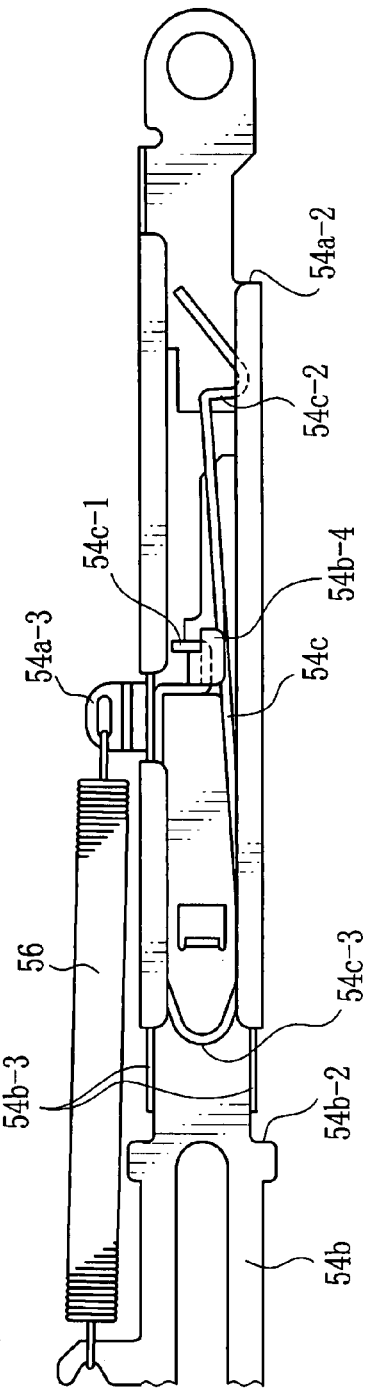
FIG.51A
FIG.51B

DISK DEVICE FOR LOADING AND UNLOADING DISKS OF DIFFERENT SIZES

BACKGROUND OF THE INVENTION

1. Field of the Invention

The present invention relates to a disk device. More particularly, the present invention relates to a disk device of a slot-in type which has an insertion slot, and is loaded with a disk inserted through the insertion slot.

2. Description Related to the Prior Art

An optical disk is an information recording medium for use in a computer system or other electronic equipment for storing information of a considerable amount, for example, CD-R/RW, DVD-R/RW/RAM/+R/+RW. An optical disk drive or player as optical disk device is loaded with the optical disk, and accesses the optical disk to write information to or read information from the optical disk. Two types of the optical disk drives are known, including a tray type and a slot-in type. The tray type includes a disk tray, which is movable into and out of the optical disk drive, and receives the optical disk. When the optical disk is contained and set on the disk trays, the disk tray is entered in the optical disk drive. The optical disk is set in a chuck position by the disk tray, and is clamped by the turntable and a chuck head. For writing and reading, the turntable rotates the optical disk.

In the slot-in type, no disk tray is used. It is possible structurally to reduce a thickness and size of the optical disk drive with advantages for use in electronic apparatuses. To load the slot-in type with an optical disk, a user enters a first half of the optical disk through an insertion slot formed in a front bezel of the optical disk drive. In response to the entry through the insertion slot, a loading mechanism is started and advance the disk inclusive of the second half automatically into the optical disk drive. To unload the optical disk from the slot-in type, a user depresses an ejection pushbutton. The loading mechanism presses out the second half of the disk out of the insertion slot at least partially. Then the user is enabled to remove the disk away from the optical disk drive.

JP-A 2002-117604 discloses an optical disk drive of a slot-in type. In FIGS. 55 and 56, a loading mechanism the optical disk drive of the document is illustrated. In FIG. 55, a disk D is entered through an insertion slot. A contact pin 100$a$ is pressed by the disk D, to move a first pivot lever 100 pivotally in an arrow direction 100A. Then a holding pin 103$a$ of a second pivot lever 103 supports a peripheral edge of the disk D, which is regulated in the height direction. The second pivot lever 103 is pressed by the disk D and rotates in an arrow direction 103A. Immediately after this, guide walls 101 and 102 regulate the disk D for control of its orientation in the lateral direction.

When the second pivot lever 103 rotates in an arrow direction 104A, a detection switch 105 is turned on. A driving mechanism 106 is responsive to an output of the detection switch 105, to move a first slider 107 in an arrow direction 107A. A slide link lever 109 is kept movable about a pivot pin 110. A second slider 108 is connected by the slide link lever 109 to the first slider 107. Also, the first slider 107 supports the first pivot lever 100 in a cantilever manner. When the first slider 107 moves back, the second slider 108 advances in an arrow direction 108A.

A cam follower pin 100$b$ is guided by a cam groove 107$a$ of the first slider 107 upon moving back of the first slider 107. The first pivot lever 100 rotates about a rotational center 100$c$ in an arrow direction 100B. The contact pin 100$a$ at the end of the first pivot lever 100 contacts and moves the disk D toward pad pins 111$a$ and 111$b$ in a positioning pad 111. Then the second pivot lever 103 rotates together with the first pivot lever 100. The holding pin 103$a$ rotates in the arrow direction 103A while supporting the disk D. The disk D reaches the chuck position of contacting the pad pins 111$a$ and 111$b$ of the positioning pad 111. After this, the holding pin 103$a$ moves away slightly from the disk D. See FIG. 56.

A chuck head 112 is movable up and down, and chucks the disk D set in the chuck position. A spindle motor 114 has an output shaft. A turntable 113 is fixed on the output shaft. The chuck head 112 is a part of a unit including the turntable 113. Also, there is a movable frame (not shown) on which the spindle motor 114 is supported. The movable frame is moved up and down by a vertical shifter.

For the purpose of unloading of the disk D, the loading mechanism operates in a sequence reverse to the above-described sequence of the loading. In the state of FIG. 56, a command signal for moving out of the disk D is entered. The driving mechanism 106 operates in the reverse direction. The first slider 107 advances in an arrow direction 107B. In response, the second slider 108 starts moving back in an arrow direction 108B. The disk D is supported by the contact pin 100$a$ and the holding pin 103$a$, and moved out of the optical disk drive.

Generally used types of optical disks are two types, namely a small disk of 8 cm and a large disk of 12 cm. The large disk is more widely used. For compatibility to the two types, a problem arises in the slot-in type of the optical disk drive. Plural movable arms are used for supporting and guiding a peripheral edge of the small disk or large disk. The movable arms are contained in a somewhat small space in the disk drive. There is a limit in raising rigidity of each of the movable arms. So mechanical load applied to the movable arms must be reduced to a low level in consideration of their structural feature. Another requirement lies in that the small disk should be pinched or grasped by a user manually at the time of unloading the small disk being 8 cm across. An amount of projecting a proximal end of the small disk from an insertion slot should be great. An angle of pivotal movement of an arm must be great for pressing out the small disk. At the time of completion of unloading of the small disk, an end of the arm is disposed at an end of the insertion slot because of the great angle of the pivotal movement. Failure is likely to occur in entry of the small disk in this state, the small disk may be unable to press the end of the arm according to a direction of pressing the small disk. The arm cannot turn on the detection switch. No automatic loading of a loading mechanism is possible for the small disk.

SUMMARY OF THE INVENTION

In view of the foregoing problems, an object of the present invention is to provide a disk device capable of automatic loading of any of two disks which are difference in the diameter.

Another object of the present invention is to provide a disk device which has a disk support arm for starting automatic loading, and in which the disk support arm can receive a small disk reliably irrespective of an insertion direction of the small disk through an insertion slot.

In order to achieve the above and other objects and advantages of this invention, a disk device has a case and an insertion slot formed in a front of the case, for disk loading and disk unloading of a disk of any one of two types different in a diameter. Plural arms contact a peripheral edge of the disk to guide the disk. A disk support arm supports the peripheral edge of the disk, and moves the disk, the disk support arm being shifted back for the disk loading, and then shifted forwards for the disk unloading. An arm driving component drives the disk support arm, to shift back the disk support arm by a predetermined distance after the disk unloading, so as to enable reception of the disk of any one of the two types entered through the insertion slot.

Preferably, a disk device has a case and an insertion slot formed in a front of the case, for disk loading and disk unloading of a disk of any one of two types different in a diameter. The disk device includes a chuck head, disposed in a middle of the case, for chucking and rotating the disk loaded in a chuck position. Plural arms contact a peripheral edge of the disk to guide the disk, the arms guiding the disk toward the chuck position for the disk loading upon partial entry of the disk in the case through the insertion slot, the arms guiding the disk for the disk unloading from the chuck position toward an ejection position where the disk partially protrudes through the insertion slot to appear externally. A disk support arm is movable pivotally, for supporting the peripheral edge of the disk, the disk support arm being set in a ready position for the disk loading, for receiving the peripheral edge of the disk entered through the insertion slot, the disk support arm being shifted back with the disk when the disk moves to the chuck position, wherein the disk support arm, upon completion of the disk loading, is kept in a separate position away from the peripheral edge of the disk in the chuck position, and is then shifted from the separate position to an advance position for the disk unloading, to press and move the disk toward the ejection position. An arm driving component pivotally shifts the disk support arm and the arms, the arm driving component being actuated when the disk support arm shifts back by a predetermined distance from the ready position for the disk loading, for shifting the disk support arm to the separate position pivotally, wherein the arm driving component is actuated for the disk unloading, for shifting the disk support arm pivotally from the separate position to the advance position, and for shifting back the disk support arm to the ready position that is offset toward the chuck head by the predetermined distance.

The disk support arm includes an end portion for supporting the peripheral edge, and a proximal portion supported on a shaft positioned laterally in the case.

The disk support arm has a holder, disposed at the end portion, and having a holder groove for receiving entry of the peripheral edge.

The arm driving component includes a loading motor. A loading slider is operated for sliding by rotation of the loading motor, and moves the arms. A link arm, in connection with the loading slider, pivotally shifts the disk support arm.

The arm driving component includes a gear tooth disk disposed on the proximal portion of the disk support arm. A rack sliding mechanism is meshed with the gear tooth disk, for moving forwards in the disk loading, and for moving backwards in the disk unloading. A return mechanism moves the rack sliding mechanism forwards by a predetermined distance after the disk unloading, to return the disk support arm from the advance position to the ready position by rotating the gear tooth disk. An arm length adjuster adjusts a length of the link arm while the rack sliding mechanism returns by the predetermined distance.

The return mechanism includes a slide plate, pressed by the rack sliding mechanism at a final step in the disk unloading, for moving back. A biasing structure biases the slide plate forwards.

The arm length adjuster includes first and second link arm members for constituting the link arm, the second link arm member being kept slidable on the first link arm member in connection. A locking mechanism keeps the link arm shortened when in a locked state, the link arm being in the locked state at an intermediate step in the disk loading, and being in an unlocked state when the disk support arm reaches the advance position, wherein when in the unlocked state, the second link arm member slides on the first link arm member for allowing the return mechanism to advance the rack sliding mechanism and to rotate the gear tooth disk.

The locking mechanism includes a lock spring structure secured to the second link arm member, wherein one end of the lock spring structure is retained on the first link arm member when in the locked state, and being removed from the first link arm member when in the unlocked state.

Furthermore, a torsion coil spring biases a first arm included in the plural arms, with force to direct an arm end of the first arm toward the chuck head, so as to regulate the disk of a smaller one of the types passing through the insertion slot with reference to a lateral direction inside the case, wherein the force increases with a peak at a middle point within a pivotal moving range of the arm end of the first arm.

Accordingly, the disk device of the invention is capable of automatic loading of any of two disks which are difference in the diameter. Also, the disk support arm can receive a small disk reliably irrespective of an insertion direction of the small disk through an insertion slot, so automatic loading can start.

BRIEF DESCRIPTION OF THE DRAWINGS

The above objects and advantages of the present invention will become more apparent from the following detailed description when read in connection with the accompanying drawings, in which:

FIGS. 38A-38D are explanatory views illustrating operation of arms in steps of a sequence where the large disk is moved;

FIGS. 40A-40F are explanatory views illustrating operation of a loading slider and a follower pin;

FIGS. 41A and 41B are explanatory views illustrating a lock lever;

FIG. 51A is a plan illustrating the link arm in a locked state;

FIG. 51B is a plan illustrating the link arm in a released state;

DETAILED DESCRIPTION OF THE PREFERRED EMBODIMENT(S) OF THE PRESENT INVENTION

Figure 1:
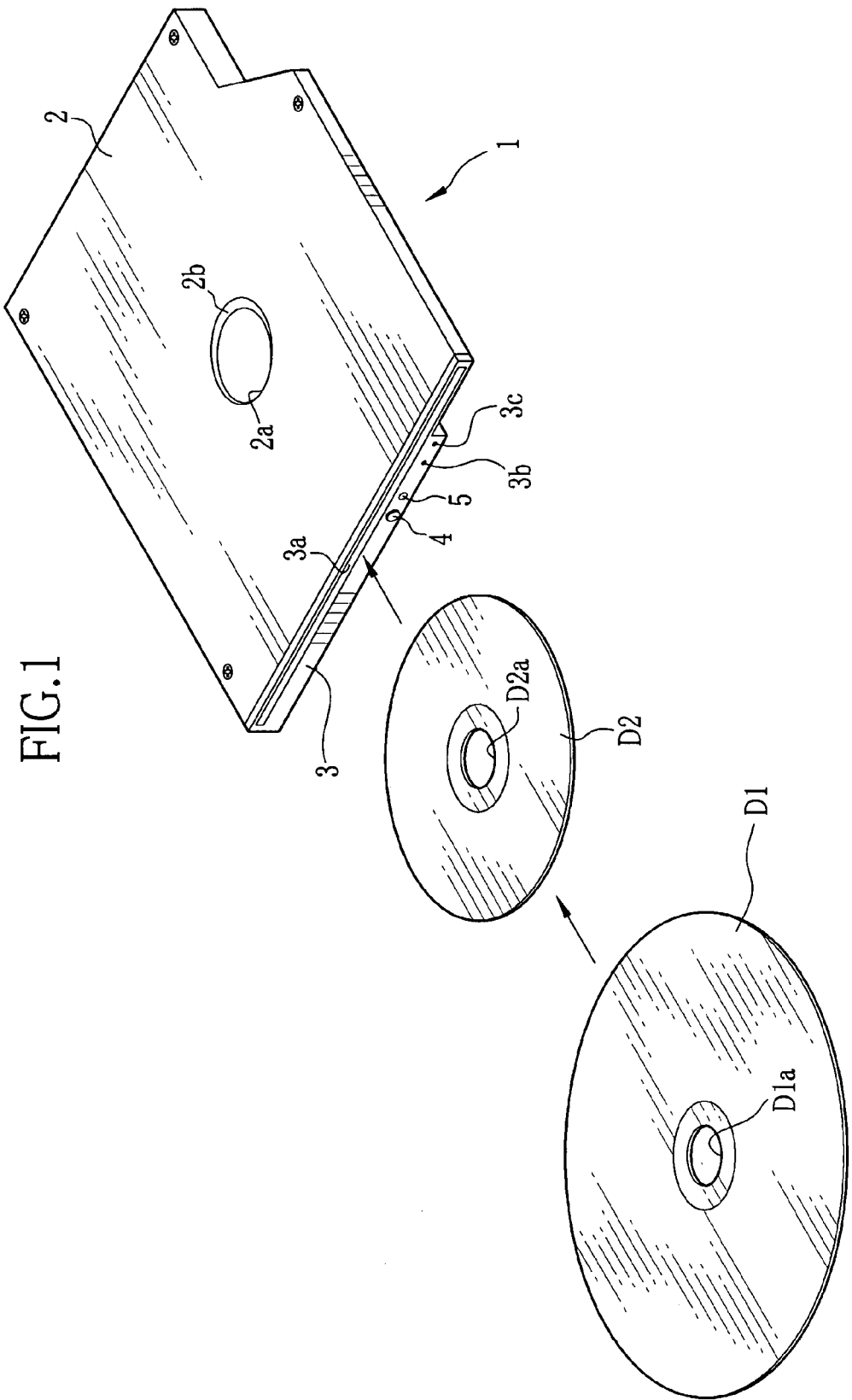
FIG. 1 is a perspective view illustrating an optical disk drive of a slot-in type.

In FIG. 1, an optical disk drive 1 or player as optical disk device of a slot-in type is illustrated. A case chassis 2 of the optical disk drive 1 is constructed in a shielded state. Elements are contained in the case chassis 2, including a loading mechanism for a disk, a recording/playback device for the disk, and the like. A center opening 2a is formed in the top panel of the case chassis 2. A projection 2b projects from the inside of the center opening 2a. A front bezel 3 is secured to a front opening of the case chassis 2. An insertion slot 3a and through holes 3b and 3c are formed in the front bezel 3. The insertion slot 3a is used for inserting a large disk D1 with a diameter of 12 cm, and a small disk D2 with a diameter of 8 cm. The through holes 3b and 3c are used for fail-safe unloading at the time of emergency. An ejection pushbutton 4 is disposed on the front bezel 3 for moving out the large or small disks D1 or D2 through the insertion slot 3a. A loading indicator 5 is secured to the front bezel 3 for indicating the status of the optical disk drive 1.

Figure 2:
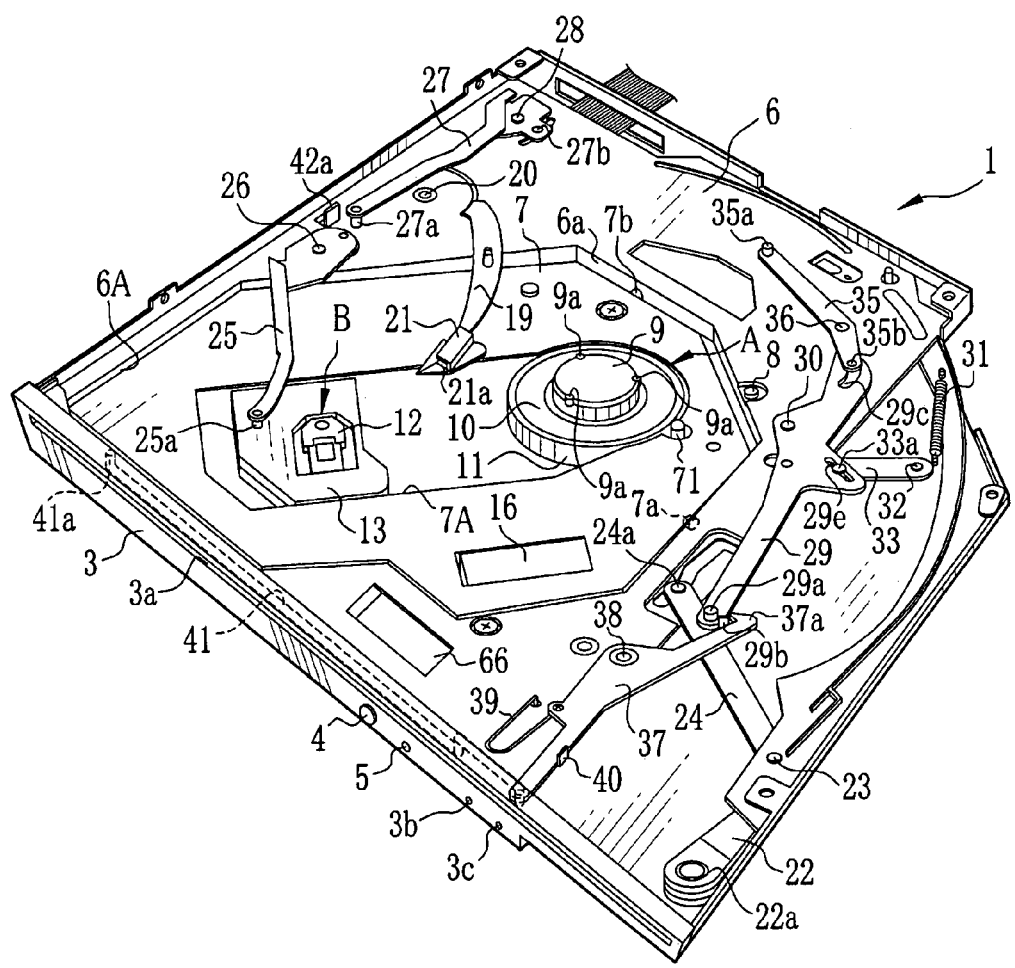
FIG. 2 is a perspective view illustrating the optical disk drive of which an upper panel is eliminated.

In FIG. 2, a state of the optical disk drive 1 of which the top panel is removed is illustrated. A base panel 6 is disposed horizontally to split the inside of the case chassis 2. An opening 6A is formed in the base panel 6 and extends downwards from the center with an inclination. A movable lifting frame 7 is disposed in the opening 6A. A cushioning support mechanism or pad 8 of a known structure secures the lifting frame 7 to the base panel 6 at plural points to keep the lifting frame 7 movable up and down at the center of the optical disk drive 1. A portion of the lifting frame 7 near to the front bezel 3 is a support portion for pivotally moving the lifting frame 7. Also, an aperture 7A is formed in the lifting frame 7 and extends downwards from the center with an inclination.

A disk driving unit A is disposed at an end of the lifting frame 7 and located in the aperture 7A. The disk driving unit A includes a spindle motor 11, a turntable 10 and a chuck head 9. The spindle motor 11 is secured to an end of the lifting frame 7. The turntable 10 is fixed on an output shaft of the spindle motor 11. The chuck head 9 is a protruding portion on the turntable 10. When the lifting frame 7 moves up, chuck claws 9a of the chuck head 9 chuck the large or small disk D1 or D2 loaded in the chuck position. After the chucking, the spindle motor 11 drives the large or small disk D1 or D2 to rotate, for writing or reading information. When the lifting frame 7 is moved down, a release pin 71 releases and removes the large or small disk D1 or D2 from the chuck head 9. In short, the chuck head 9 constitutes a spindle of the disk driving unit A.

Figure 3:
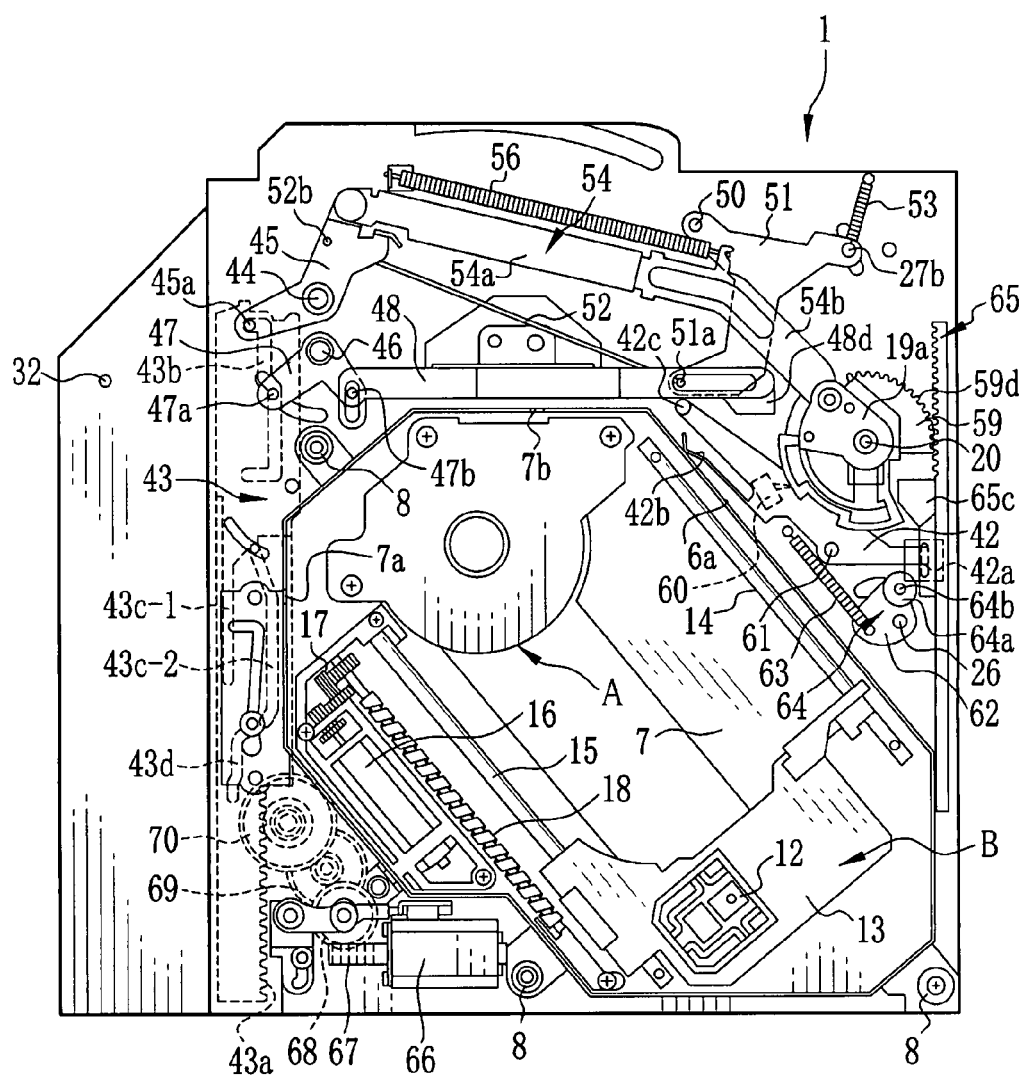
FIG. 3 is a bottom plan illustrating the optical disk drive as viewed from the bottom of a base panel.

An optical pickup unit B is secured to the lifting frame 7, and includes an optical pickup head 12 and a carriage 13. The optical pickup head 12 is disposed in the aperture 7A of the lifting frame 7. The carriage 13 is movable and supports the optical pickup head 12. Guide shafts 14 and 15 support the carriage 13 to move the optical pickup head 12 inside the aperture 7A in a radial direction of a large or small disk D1 or D2. In FIG. 3, the guide shafts 14 and 15 have end portions fixed to the rear of the lifting frame 7. A gear train 17 is mechanically connected with a screw shaft 18. A pickup moving motor 16 rotates back and forth, and causes the gear train 17 and the screw shaft 18 to move back and forth the carriage 13.

The loading mechanism for moving the large and small disks D1 and D2 includes plural arms arranged on the base panel 6 in the periphery of the lifting frame 7. An arm driving component is disposed behind the base panel 6, and actuates the loading mechanism. A disk support arm 19 is included in those arms to move a disk in and out, is rotationally movable about a rivet pin 20. A holder 21 is disposed at an end of the disk support arm 19. A holder groove 21a of the holder 21 holds a peripheral edge of a large or small disk D1 or D2 to keep the disk position in the vertical direction.

A loading arm 22 is disposed to move a large disk D1 into the optical disk drive 1. A link lever 24 is connected by a pivot pin 23 with the loading arm 22, which is caused by the link lever 24 to swing. A loading roller 22a is secured to an end of the loading arm 22. A lateral edge of a proximal end half of the large disk D1 is pressed by the loading roller 22a to move the large disk D1 into the optical disk drive 1.

A pivot pin 26 is secured to the base panel 6 in a rotatable manner. A guide arm 25 moves pivotally about the pivot pin 26. A holding pin 25a is fixedly retained on the guide arm 25 to extend downwards, and supports a peripheral edge of the small disk D2 for movement to the chuck position. There is a rivet pin 28, about which a guide arm 27 rotates. A holding pin 27a is fixedly retained on the guide arm 27 to extend downwards. The holding pin 27a supports a peripheral edge of the large or small disk D1 or D2 for movement to the chuck position. A pin 27b is fixedly retained on a proximal end of the guide arm 27. The pin 27b passes a groove in the base panel 6 and protrudes through a rear surface of the base panel 6. A pivot lever 51 has an end where the pin 27b is secured. A tension coil spring 53 has one end retained on the pin 27b.

A guide arm 29 is movable pivotally about a rivet pin 30. A holding pin 29a protrudes from the guide arm 29. The holding pin 29a supports a peripheral edge of the large or small disk D1 or D2 to move to the chuck position. A tension coil spring 31 biases a link lever 33, which swings about a rivet pin 32. A lever pin 33a protrudes from the link lever 33. A slot 29e is formed in the guide arm 29, and receives the lever pin 33a in engagement. An end of the guide arm 29 is biased toward the center or toward the chuck head 9 by means of the lever pin 33a and the slot 29e. A guide arm 35 has a follower pin 35b or arm pin. A guide groove 29c is formed in the guide arm 29, and receives the follower pin 35b in engagement. There is a rivet pin 36 about which the guide arm 35 moves pivotally. A holding pin 35a protrudes from the guide arm 35, and supports a peripheral edge of the large or small disk D1 or D2 to move to the chuck position.

A lock lever 37 moves pivotally about a rivet pin 38. An angle portion or hook 37a is an end of the lock lever 37. A tongue 29b protrudes from the guide arm 29, and is retained by the angle portion or hook 37a. A wire spring 39 biases the angle portion or hook 37a of the lock lever 37 constantly in a direction toward the center. A stopper 40 regulates the movement of the lock lever 37.

A lead wire 41 is disposed to extend on a lower side of the front bezel 3, and has an end connected with the rear end of the lock lever 37. A retaining end 41a of the lead wire 41 is bent in an erect shape, and extends toward the insertion slot 3a of the front bezel 3. When the large disk D1 is entered through the insertion slot 3a, the lead wire 41 shifts horizontally in parallel with the front bezel 3, because the peripheral edge of the large disk D1 presses the retaining end 41a. The lock lever 37 is driven to swing the angle portion or hook 37a in the outward direction. The tongue 29b of the guide arm 29 is free from being captured. In insertion of the small disk D2, the lead wire 41 does not move. The angle portion or hook 37a remains positioned so as to retain the tongue 29b. There is a lever arm 42. See FIG. 3. A retaining tongue 42a is a portion of the lever arm 42, and regulates the position of the guide arm 27.

Guide arms are disposed on the base panel 6. In FIG. 3, the arm driving component is disposed on the rear of the base panel 6, and drives the guide arms. A loading slider 43 is indicated by the phantom line, and is a main element of the arm driving component, and extends inside a side wall of the optical disk drive 1. The loading slider 43 slides back and forth to control all the arms related to moving large and small disks D1 and D2.

Figure 4:
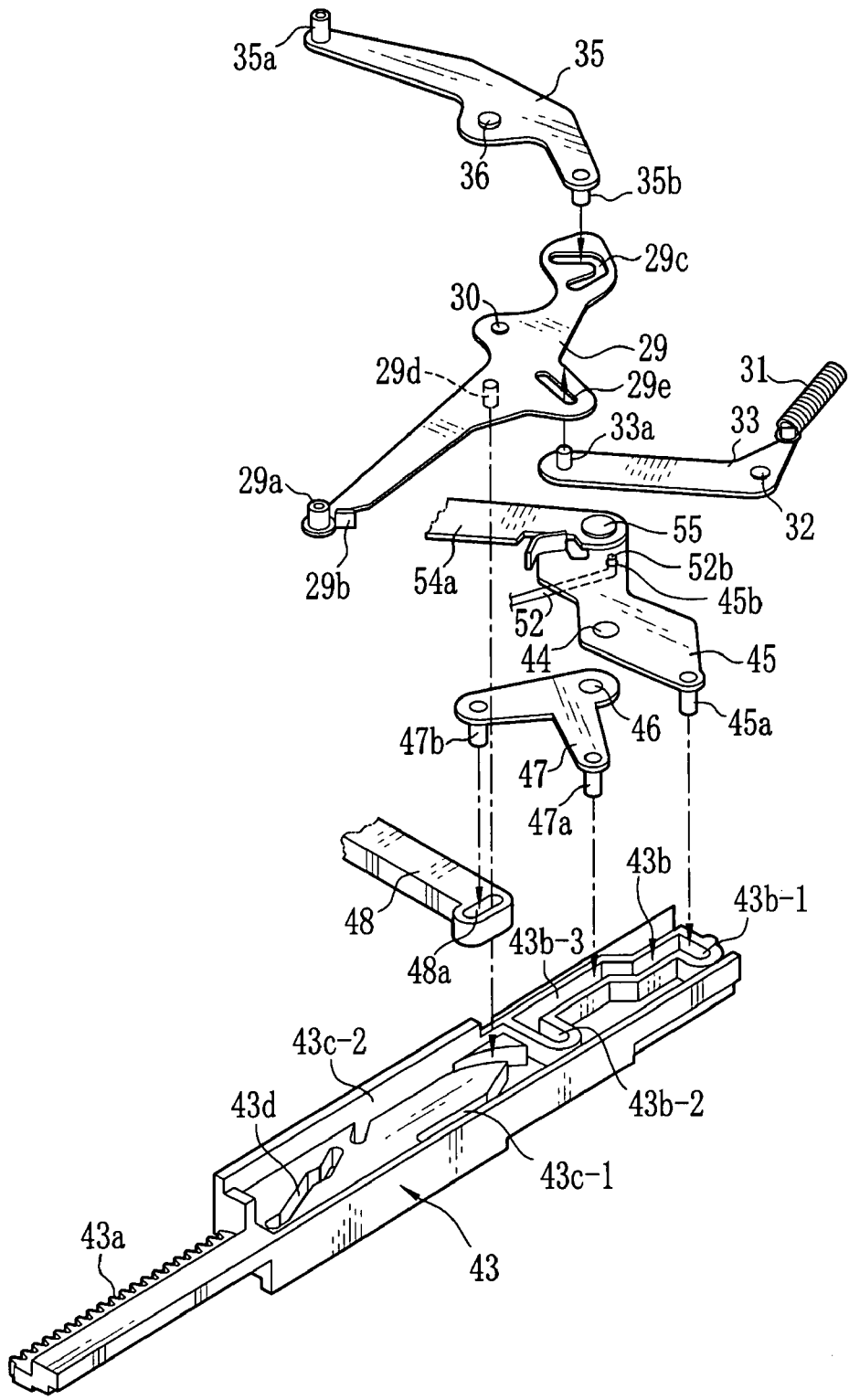
FIG. 4 is an exploded perspective illustrating a loading slider.

In FIG. 4, the loading slider 43 and other relevant elements are illustrated. The loading slider 43 has a long shape. A rack gear 43a is formed at a front end portion of the loading slider 43. A guide groove 43b is formed in a rear end portion of the loading slider 43, and includes a first groove end region 43b-1, a second groove end region 43b-2, and a longitudinal region 43b-3. A stepped portion is formed in the middle of the longitudinal region 43b-3.

A follower pin 45a or lever pin protrudes from a first pivot lever 45, and is inserted in the first groove end region 43b-1. There is a rivet pin 44 about which the first pivot lever 45 rotates. A follower pin 47a or lever pin protrudes from a second pivot lever 47, and is inserted in the longitudinal region 43b-3. There is a rivet pin 46 about which the second pivot lever 47 rotates. A slot 48a is formed in a slider 48. A driving pin 47b of the second pivot lever 47 is inserted in the slot 48a.

Guide grooves 43c-1 and 43c-2 are formed in the middle of the loading slider 43. An inclination is formed at the rear end of the guide groove 43c-1. An inclination is formed at each of the rear and front ends of the guide groove 43c-2. A follower pin 29d or arm pin of the guide arm 29, while the loading slider 43 remains advanced in the foremost position, is positioned at an open portion of the rear inclined end of the guide groove 43c-2.

Figure 5:
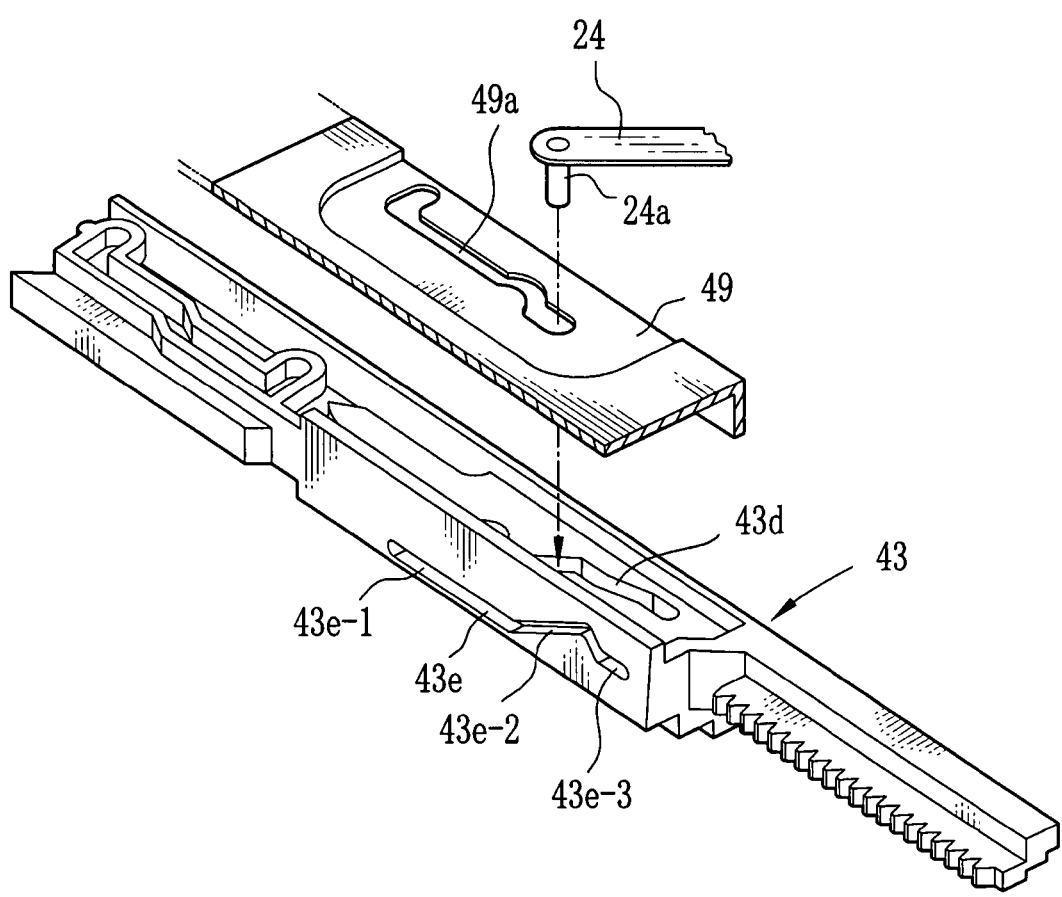
FIG. 5 is an exploded perspective illustrating the loading slider and a guide plate.

A guide groove 43d drives the link lever 24 to shift the loading arm 22 in response to moving of the large disk D1. In FIG. 5, a guide plate 49 is secured to the base panel 6 to overlap on the guide groove 43d. A guide slot 49a is formed in the guide plate 49. A follower pin 24a or lever pin is formed at an end of the link lever 24, and is inserted in the guide slot 49a and the guide groove 43d. The follower pin 24a is controlled for operation by a cooperation of the guide groove 43d moving back and forth and the guide slot 49a being stationary.

A cam groove 43e is formed in the loading slider 43. A follower pin 7a protrudes from the lifting frame 7. The cam groove 43e faces on the lifting frame 7, and moves up and down the follower pin 7a by engagement. The cam groove 43e in a combined shape includes a lower cam end 43e-1, an inclined region 43e-2, and an upper cam end 43e-3. The lower cam end 43e-1 is used to keep the lifting frame 7 positioned low. The inclined region 43e-2 moves the lifting frame 7 up or down. The upper cam end 43e-3 is used to keep the lifting frame 7 positioned high.

Figure 6:
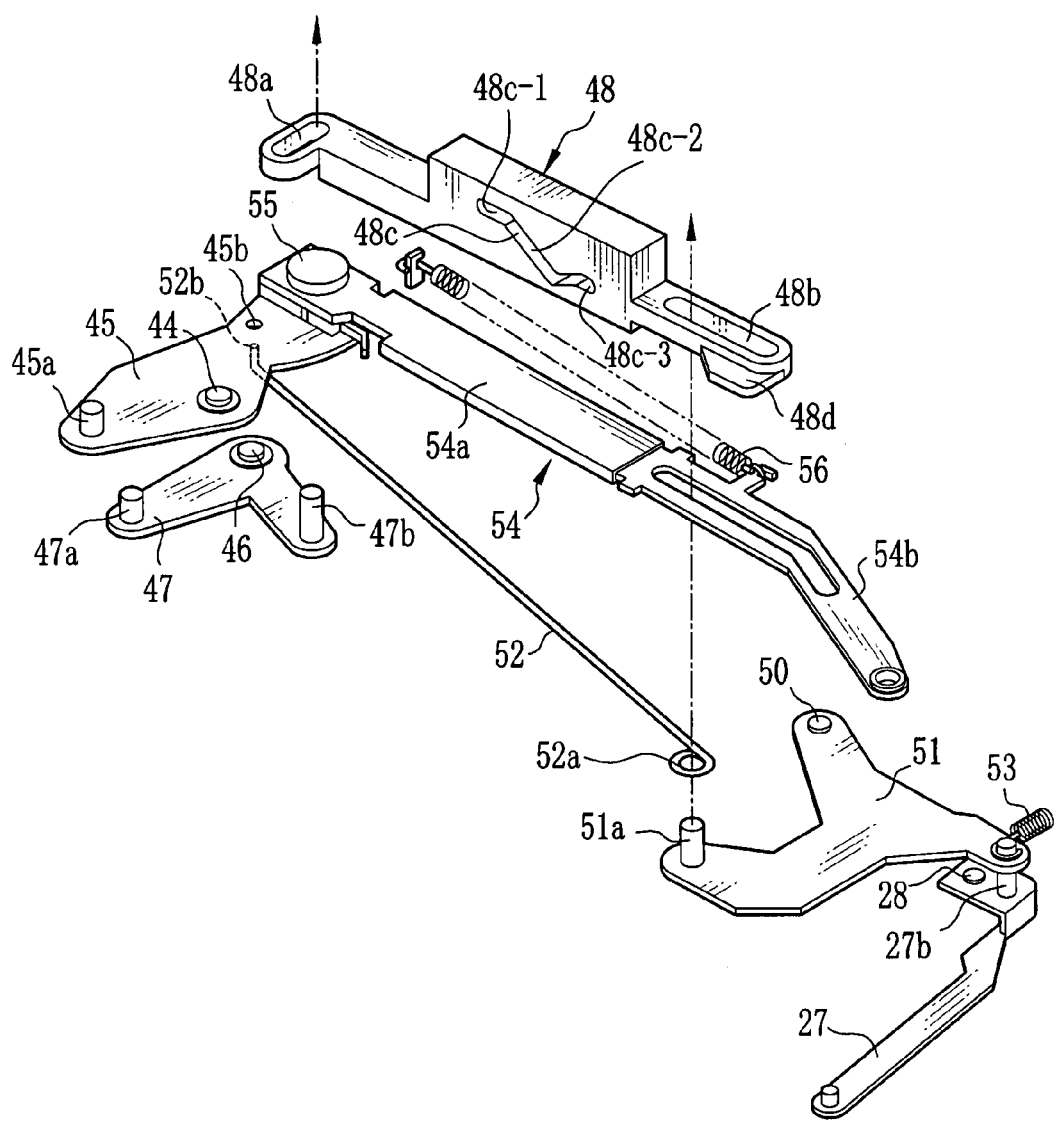
FIG. 6 is an exploded perspective illustrating a transmission mechanism as viewed from the bottom of the base panel.

In FIG. 6, a follower pin 7b protrudes from the lifting frame 7. A cam groove 48c of the slider 48 receives the follower pin 7b for controlling moving up and down the lifting frame 7. The cam groove 48c includes a lower cam end 48c-1, an inclined region 48c-2 and an upper cam end 48c-3. The lower cam end 48c-1 sets the lifting frame 7 in a low position. The inclined region 48c-2 moves up or down the lifting frame 7. The upper cam end 48c-3 sets the lifting frame 7 in a high position.

An end pin 51a protrudes from the pivot lever 51. A slot 48b is formed in the slider 48, and receives the end pin 51a. A link wire 52 has a wire end 52a, which is secured to the end pin 51a. A hole 45b is formed in the first pivot lever 45. A remaining wire end 52b of the link wire 52 is fitted and retained in the hole 45b. The pivot lever 51 is biased by the tension coil spring 53 in the counterclockwise direction. A cam portion 48d is formed on a side of the slot 48b for actuating the lever arm 42.

An extendable link arm 54 is connected between a gear tooth disk 59 and the first pivot lever 45. Two link arm members 54a and 54b constitute the extendable link arm 54 as arm length adjuster. A fastener 55 connects the link arm member 54a to the first pivot lever 45. A tension coil spring 56 biases the link arm member 54b, which is kept slidable on the link arm member 54a. Elongation and shortening of the extendable link arm 54 enables the disk support arm 19 to move from the advance position to the ready position while the loading slider 43 is stopped after the moving out of the disk on the loading slider 43 is completed. Even when the small disk D2 advances into the insertion slot 3a with an inclination, automatic loading is possible because the disk support arm 19 contacts and receives the peripheral edge of the small disk D2.

Figure 7:
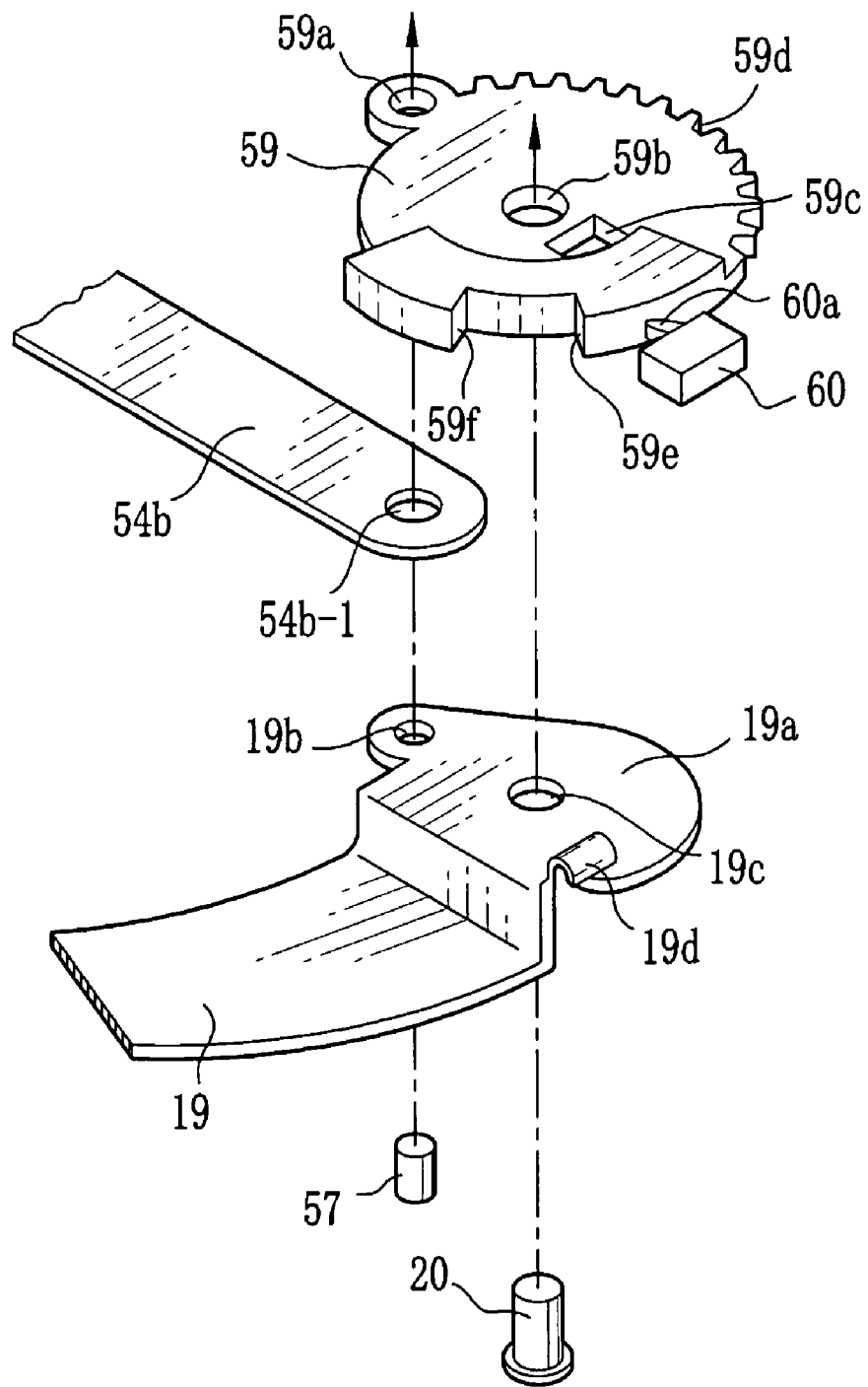
FIG. 7 is an exploded perspective illustrating a gear tooth disk.

In FIG. 7, a through hole 54b-1 is formed in the link arm member 54b. A through hole 19b is formed in a rotational proximal portion or arm plate 19a of the disk support arm 19. A through hole 59a is formed in the gear tooth disk 59. A pivot pin 57 is inserted in the through holes 54b-1, 19b and 59a for rotationally supporting the link arm member 54b, the disk support arm 19, and the gear tooth disk 59. A center hole 19c is formed in the proximal portion 19a of the disk support arm 19. A center hole 59b is formed in the gear tooth disk 59. The rivet pin 20 on the base panel 6 is inserted in the center holes 19c and 59b to support the disk support arm 19 and the gear tooth disk 59. Also, a retaining projection 19d protrudes from the proximal portion 19a. A retaining opening 59c is formed in the gear tooth disk 59, and receives insertion of the retaining projection 19d firmly to fit the proximal portion 19a on the gear tooth disk 59.

Gear teeth 59d are formed on a portion of the gear tooth disk 59 opposed to a side of the case chassis 2. Switch driving surfaces 59e and 59f are formed with the gear tooth disk 59 in a region distinct from the gear teeth 59d. A switching projection 60a of a limit switch 60 is disposed for access by the switch driving surfaces 59e and 59f so as to turn on and off the limit switch 60. A circuit board (not shown) is disposed on a lower surface of the case chassis 2, and connected with the limit switch 60.

In FIG. 3, there is a rivet pin 61 about which the lever arm 42 is kept rotatable. The lever arm 42 has the retaining tongue 42a, which protrudes through an opening of the base panel 6. See FIG. 2. A spring portion 42b is formed with the lever arm 42. An inner wall 6a is included in the base panel 6. An end of the spring portion 42b contacts the inner wall 6a. An end roller 42c of the lever arm 42 is biased by the combination of the spring portion 42b with the inner wall 6a, in the outward direction away from the chuck head 9. The slider 48 slides to press the end roller 42c with the cam portion 48d. The lever arm 42 rotates about the rivet pin 61, to move the retaining tongue 42a in the outward direction.

Figure 8:
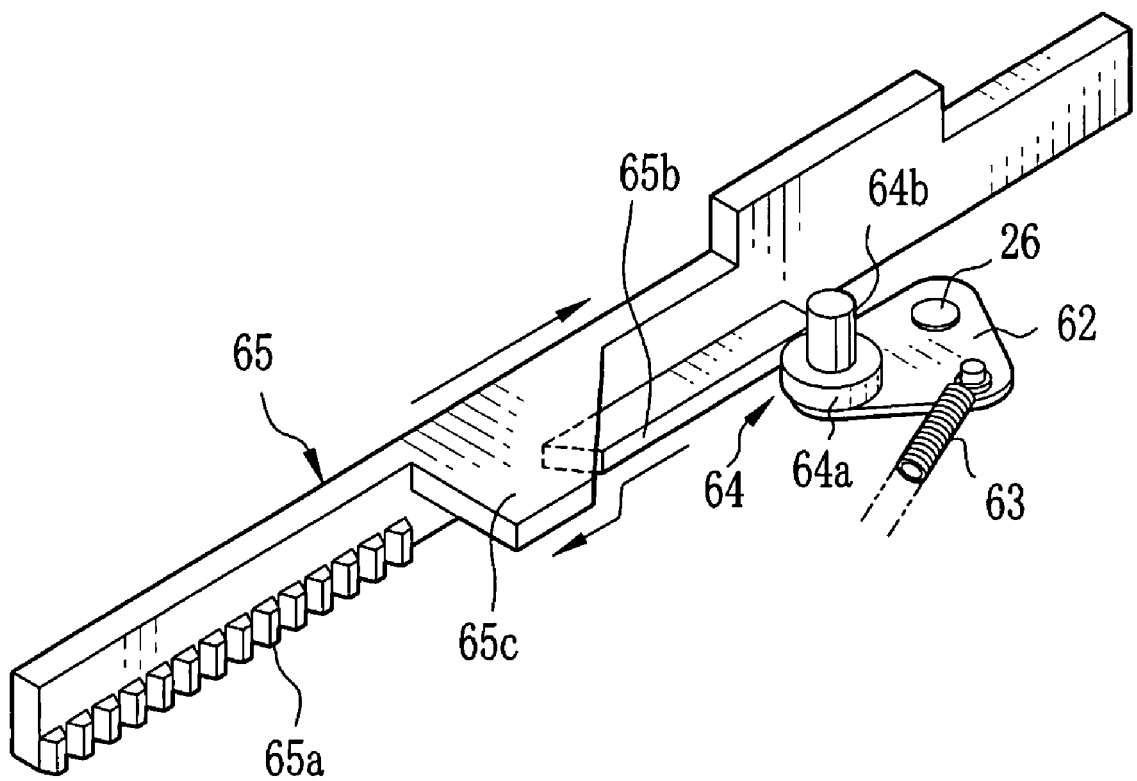
FIG. 8 is a perspective view illustrating a rack sliding mechanism as viewed from the bottom of the base panel.

A structure for swinging the guide arm 25 is described by referring to FIGS. 2 and 3. The guide arm 25 is secured to an upper end of the pivot pin 26 which extends through the base panel 6 in a rotatable manner. A roller support 62 is disposed behind the base panel 6, and is secured to a lower end of the pivot pin 26. In FIG. 8, a double roller 64 is secured to the roller support 62, and includes a great diameter roll 64a and a small diameter roll 64b. A rack sliding mechanism 65 has guide regions. A tension coil spring 63 biases the double roller 64 in a direction to contact the guide regions. As the guide arm 25 rotates together with the roller support 62, the tension coil spring 63 biases in a direction to swing the guide arm 25 toward the center.

The rack sliding mechanism 65 extends inside a side wall of the case chassis 2. A rack gear 65a is formed on the rack sliding mechanism 65 and is meshed with the gear teeth 59d of the gear tooth disk 59. The rack sliding mechanism 65 is moved back and force by rotation of the gear tooth disk 59. Also, the rack sliding mechanism 65 includes a low position guide region 65b and a high position guide region 65c. The low position guide region 65b guides the great diameter roll 64a of the double roller 64. The high position guide region 65c guides the small diameter roll 64b.

Those elements are actuated by back and forth movement of the loading slider 43. The various elements are contained in a corner space of the rear inside the optical disk drive 1. See FIG. 3. A loading motor 66 rotates for sliding the loading slider 43 for the purpose of automatic loading. A worm gear 67 is fastened on an output shaft of the loading motor 66. Double gears 68 and 69 transmit rotation of the worm gear 67 to a double gear 70. As a small gear in the double gear 70 is meshed with the rack gear 43a of the loading slider 43, speed of rotation of the loading motor 66 is reduced while the movement is transmitted to the loading slider 43, which moves back and forth.

The optical disk drive 1 is used to move both of the large and small disks D1 and D2. FIGS. 9-22 are referred to in relation with moving the large disk D1. Then FIGS. 23-34 are referred to in relation with moving the small disk D2. In FIGS. 9-15, the loading mechanism is depicted as viewed from the upside of the base panel 6. Elements of the loading mechanism on the front surface of the base panel 6 are indicated with solid lines. Elements on the rear surface are indicated with phantom lines. In FIGS. 16-22, the arm driving component is depicted as viewed from the rear side of the base panel 6. Elements of the loading mechanism on the front surface of the base panel 6 are indicated with phantom lines. In FIGS. 9-15, the cam grooves 43e and 48c and the follower pins 7a and 7b are depicted for the purpose of understanding although invisible in an actual state.

Figure 9:
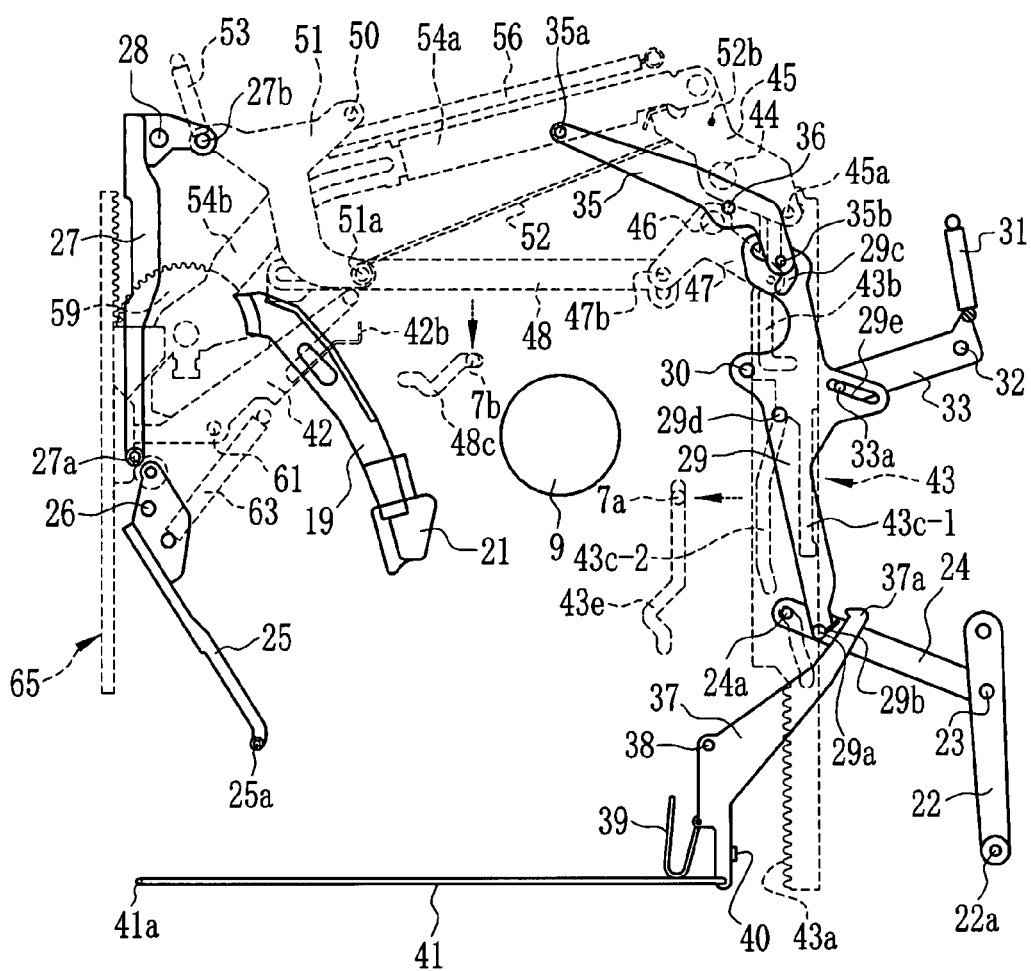
FIG. 9 is a plan illustrating a loading mechanism before entry of a disk as viewed from the top of the base panel.
Figure 16:
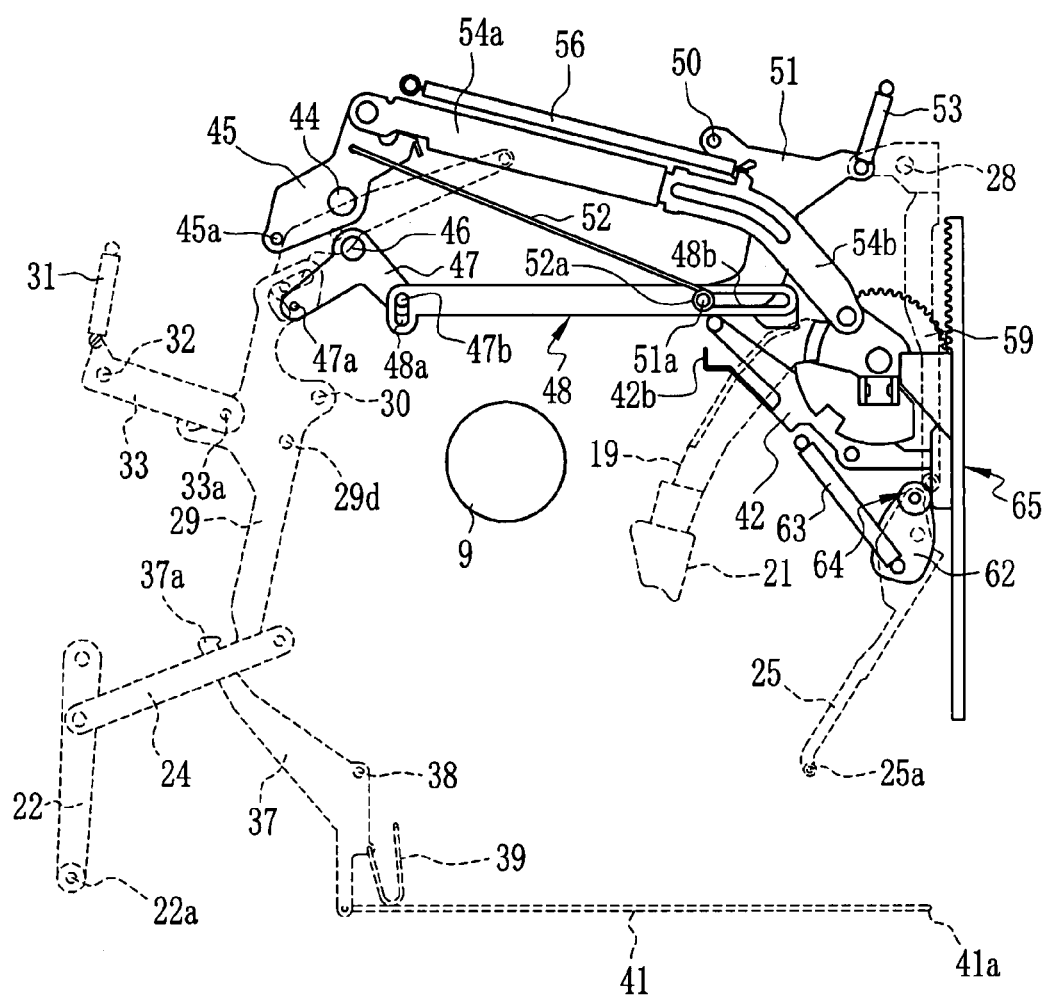
FIGS. 16-22 are bottom plans illustrating an arm driving component in steps of a sequence where the large disk is moved as viewed from the bottom of the base panel.

In FIGS. 9 and 16, the optical disk drive 1 is ready for insertion of a disk. In the roller support 62, the great diameter roll 64a of the double roller 64 contacts the low position guide region 65b of the rack sliding mechanism 65. See FIG. 8. Thus, the guide arm 25 remains stopped in a position which is offset from an innermost arm position close to the center.

Let the optical disk drive 1 stand by for insertion of a disk in a stopped state of the guide arm 25 positioned the nearest to the center. If the small disk D2 is entered in a laterally offset state on the left side inside the optical disk drive 1, the small disk D2 presses the holding pin 25a toward the center. However, the contact between the low position guide region 65b and the double roller 64 on the roller support 62 keeps the guide arm 25 from rotating in the direction toward the center. Should the small disk D2 press the holding pin 25a toward the center, the guide arm 25 will break. In view of this, the guide arm 25 is retracted and set in one position that is offset outwards at a predetermined amount from the position the nearest to the center. The small disk D2 is enabled to pass the holding pin 25a safely.

Also, the disk support arm 19 is stopped in a ready position that is offset toward the chuck head 9 at a predetermined amount back from the advance position of the time after the disk ejection. The holder 21 is enabled reliably to receive even a small disk D2.

The guide arm 27 is biased by the tension coil spring 53 in a direction to swing the holding pin 27a toward the center. However, the pivot lever 51 in connection with the pin 27b is stopped in its position. The guide arm 27 is stopped in the state of FIG. 9. This is because the link wire 52 is a stopper between the first pivot lever 45 and the end pin 51a of the pivot lever 51 to prevent pivotal movement of the pivot lever 51.

Figure 35A:
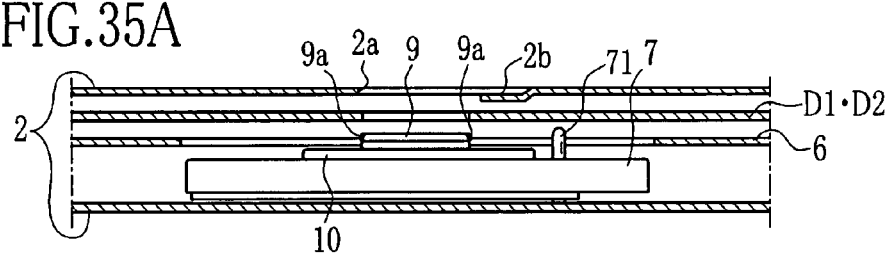
FIGS. 35A-35E are sections illustrating the optical disk drive in which a movable frame is moving up.

The follower pin 7a of the loading slider 43 is located in the lower cam end 43e-1 of the cam groove 43e. The follower pin 7b of the lifting frame 7 is located in the lower cam end 48c-1 of the cam groove 48c of the slider 48. The lifting frame 7 stands shifted the lowest as illustrated in FIG. 35A.

Figure 10:
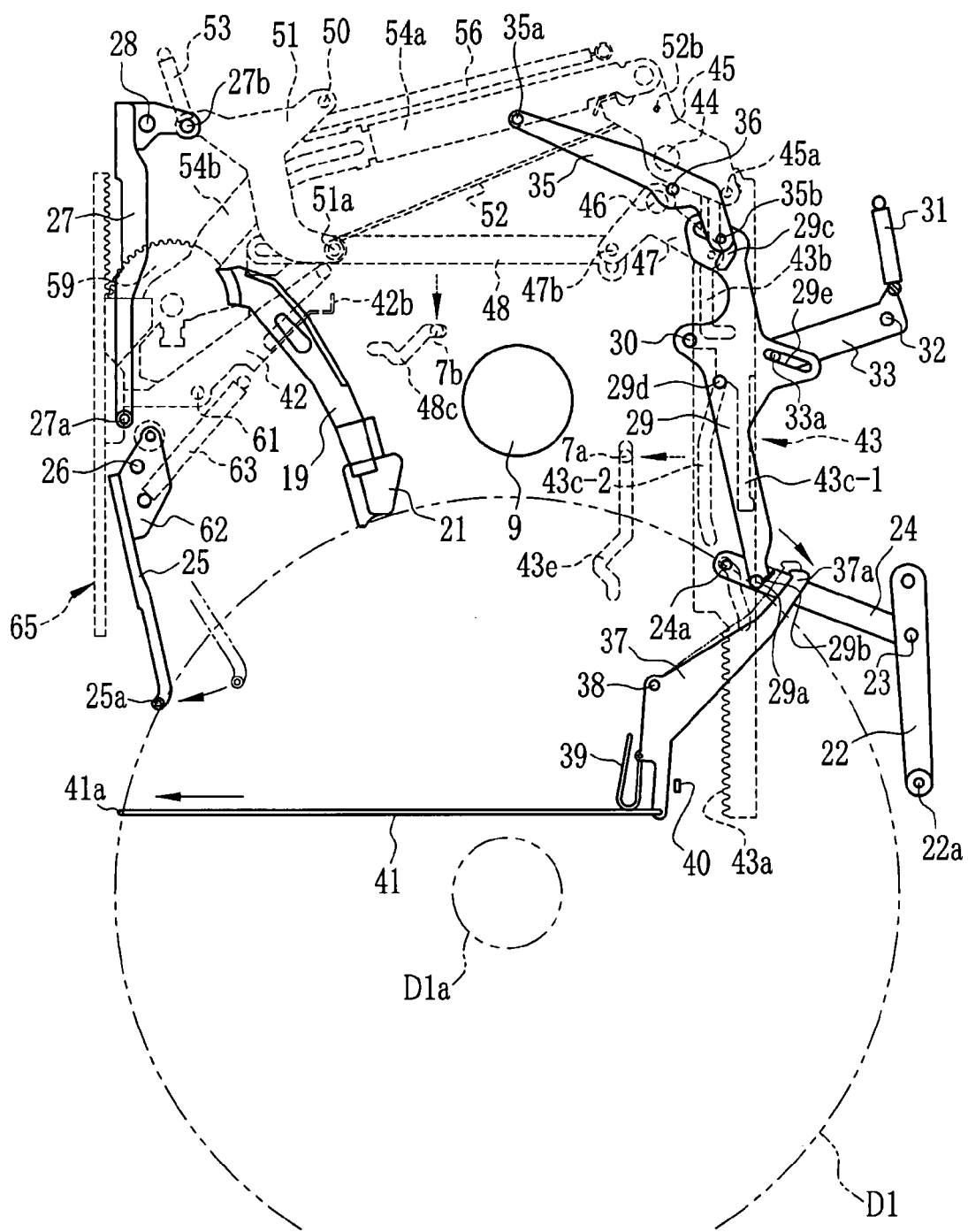
FIGS. 10-15 are plans illustrating the loading mechanism in steps of a sequence where a large disk is moved.
Figure 17:
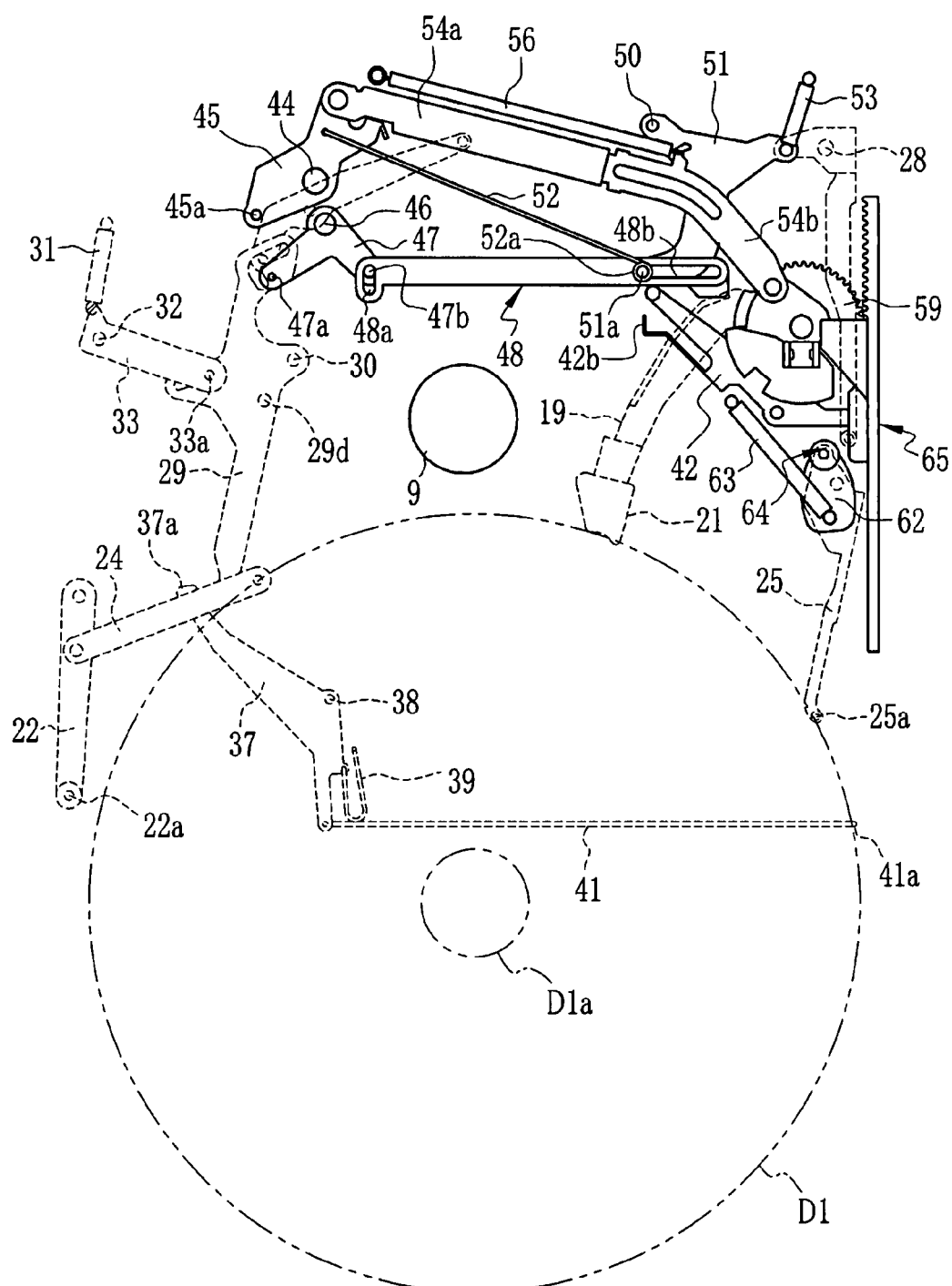

In FIGS. 10 and 17, the large disk D1 is entering the insertion slot 3a of the front bezel 3. A distal end of the large disk D1 advances and contacts the holder 21 of the disk support arm 19 and the holding pin 29a of the guide arm 29. As the large disk D1 presses the holding pin 25a at the end of the guide arm 25, the guide arm 25 swings from the position of the phantom line toward an outer position in FIG. 10. Also, a lateral edge of the large disk D1 presses the retaining end 41a of the lead wire 41, to move the lead wire 41 in the direction of the arrow. As the lock lever 37 is driven with the lead wire 41, the angle portion or hook 37a swings in the arrow direction, and the tongue 29b of the guide arm 29 is free from being captured.

Figure 11:
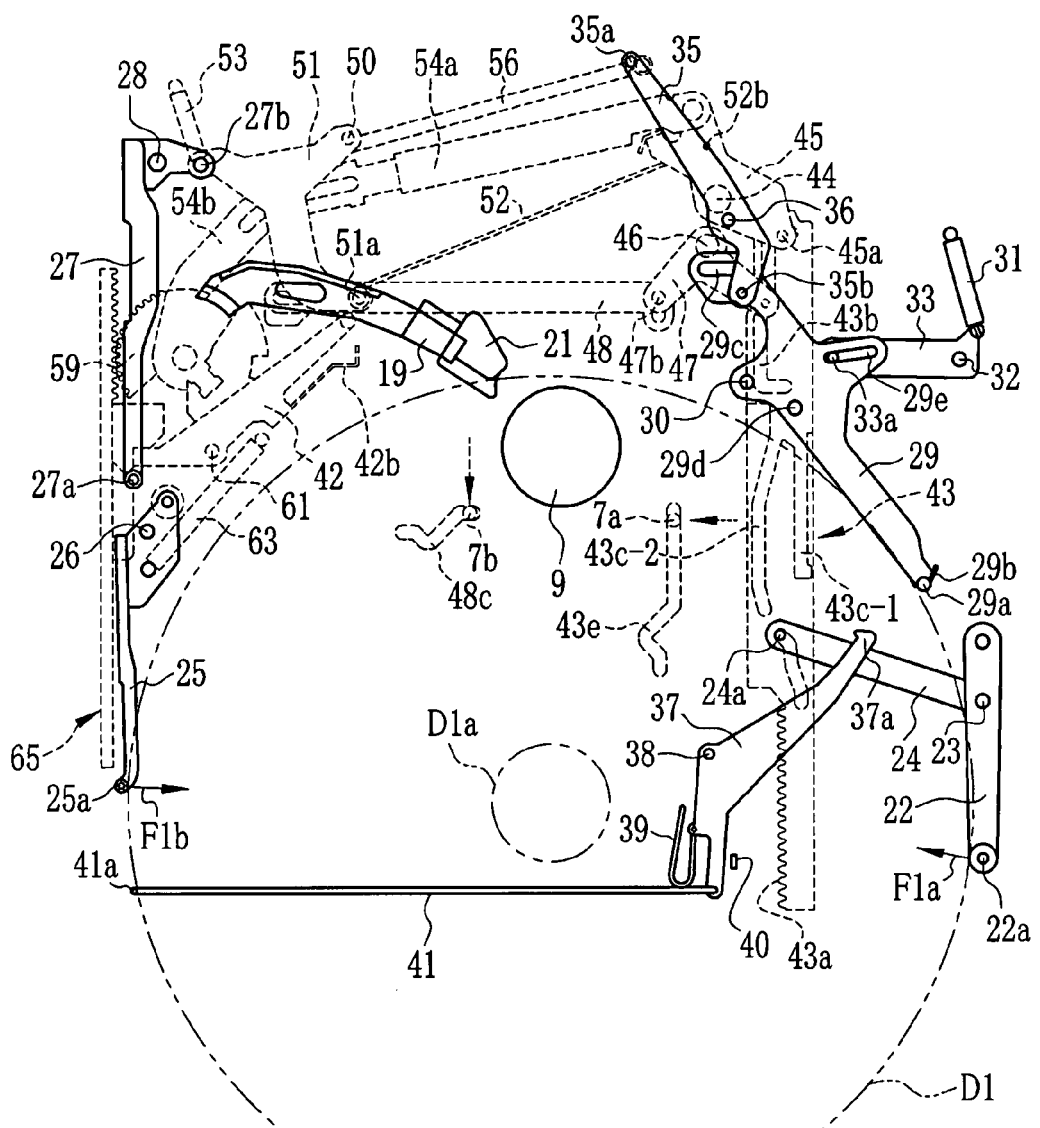
Figure 18:
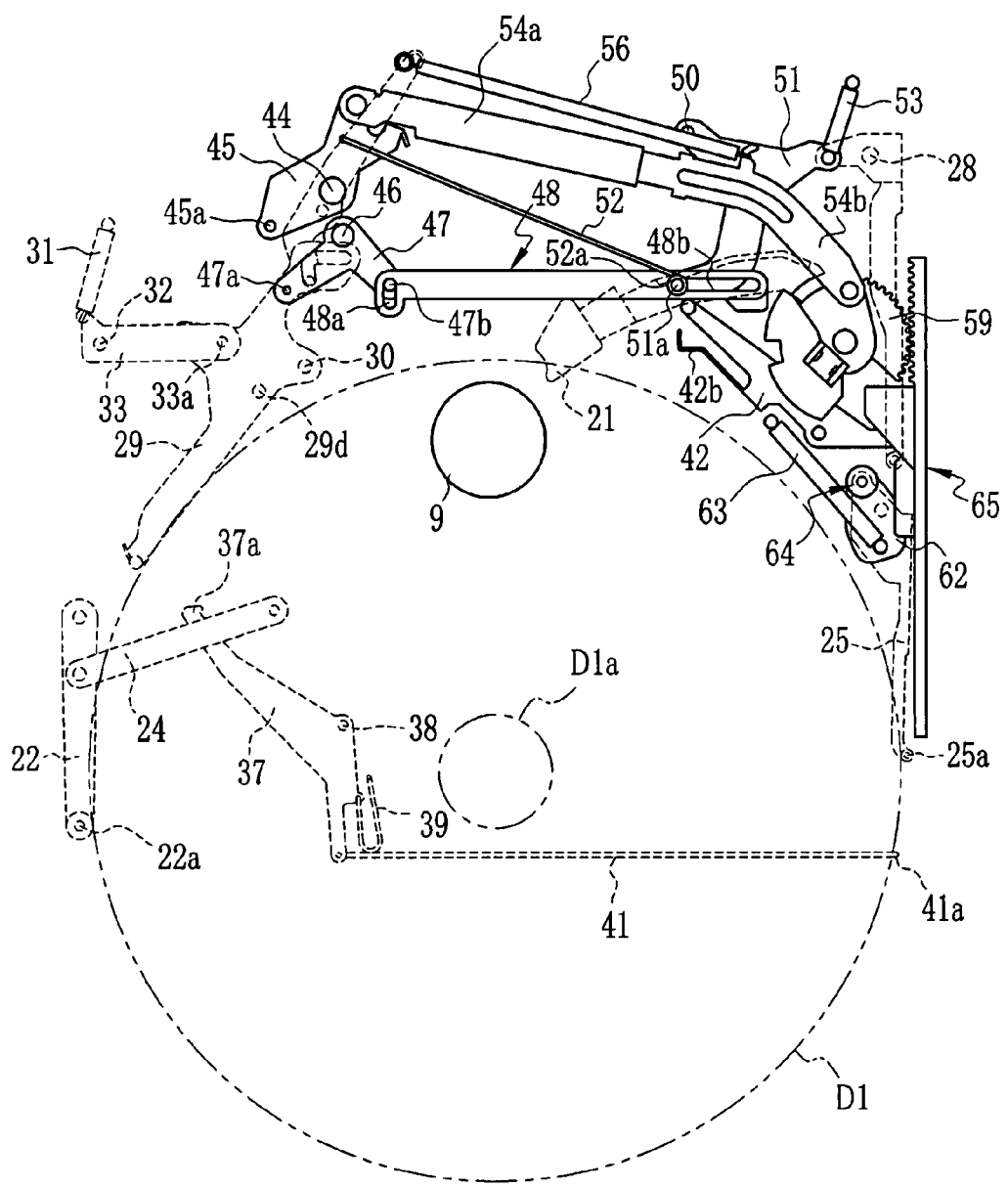

In FIGS. 11 and 18, the large disk D1 is entered further from the above-described state. The disk support arm 19 and the guide arms 25 and 29 are moved pivotally by the large disk D1 outwards. The proximal portion or arm plate 19a of the disk support arm 19 rotates about the rivet pin 20 from the state of FIG. 37A to the state of FIG. 37B. The limit switch 60 is shifted by the switch driving surface 59e of the gear tooth disk 59. The rack sliding mechanism 65 meshed with the gear tooth disk 59 advances slightly.

When the limit switch 60 is shifted by the switch driving surface 59e, a motor control circuit (not shown) connected with the limit switch 60 applies a low voltage to the loading motor 66. The loading motor 66 is supplied with a low power, and comes to rotate slowly. The loading slider 43 moves back slowly to move the link lever 24. The loading arm 22 is moved pivotally to the position of FIGS. 11 and 18. The loading roller 22a of the loading arm 22 contacts the peripheral edge of the large disk D1 to stop the loading arm 22.

In an initial phase of the loading, breakage is likely to occur in a moving mechanism if considerable torque is generated in the loading motor 66 by applying a high voltage. In FIG. 11, the loading roller 22a and the holding pin 25a of the guide arm 25 diametrically squeeze the large disk D1. A sum of the force component F1a of the loading arm 22 and force component F1b of the holding pin 25a is considerably small. No force sufficient for moving in of the large disk D1 occurs. Also, in FIG. 11, the holding pin 29a of the guide arm 29 is pressing the lateral edge of the distal end half of the large disk D1.

When a high voltage is applied to the loading motor 66 in this state, the loading arm 22 stops with the large disk D1 held thereon. As the operation of moving in is stopped, it is likely that the loading motor 66 is burned out and broken and the gear train is broken. However, in order to prevent this problem, a small current is caused to flow in the loading motor 66 in the initial phase of the loading operation.

While a low voltage is applied to the loading motor 66, the moving in of the large disk D1 with the loading arm 22 is impossible only by the loading motor 66. Manual force for shifting in the large disk D1 is combined with force of driving of the loading motor 66, so that the large disk D1 is moved in.

Figure 12:
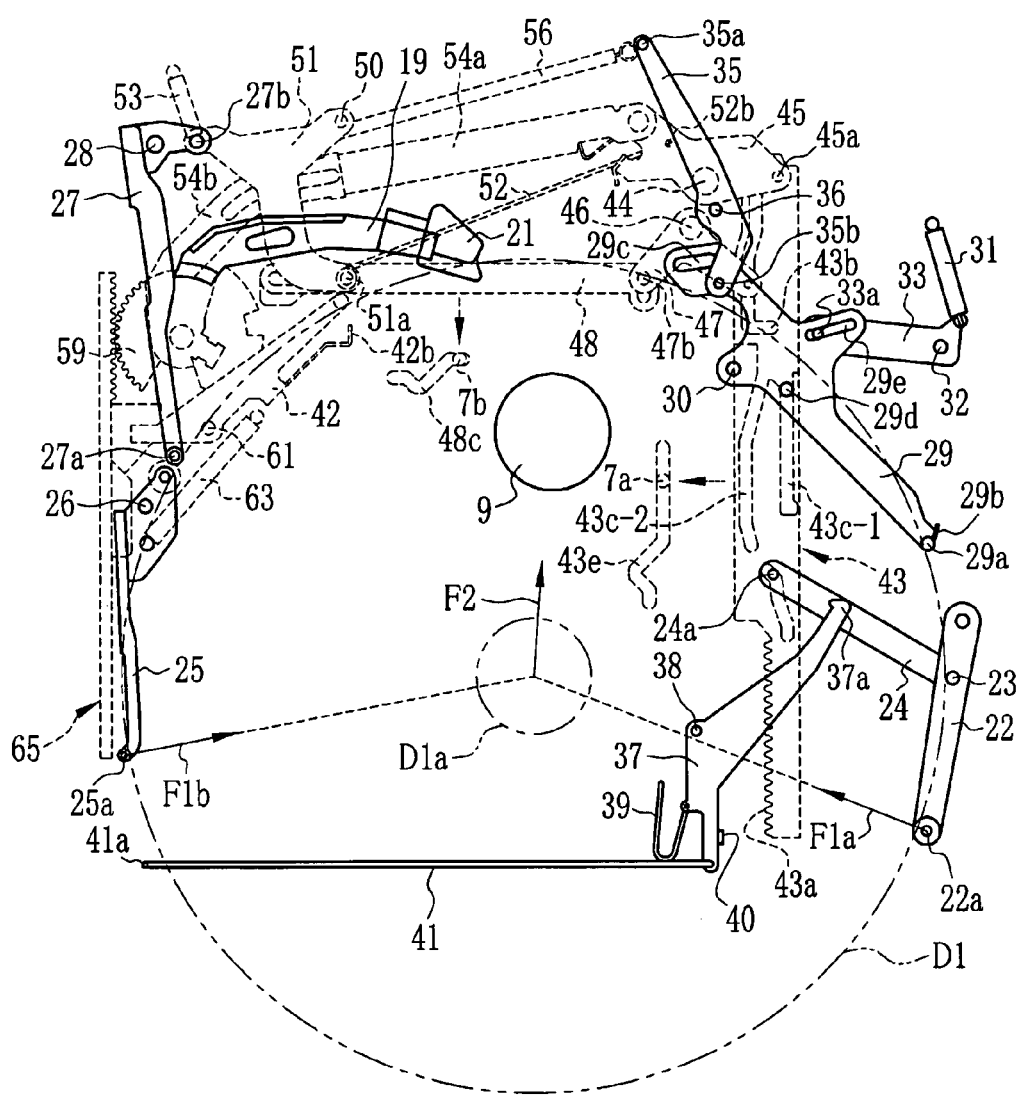
Figure 19:
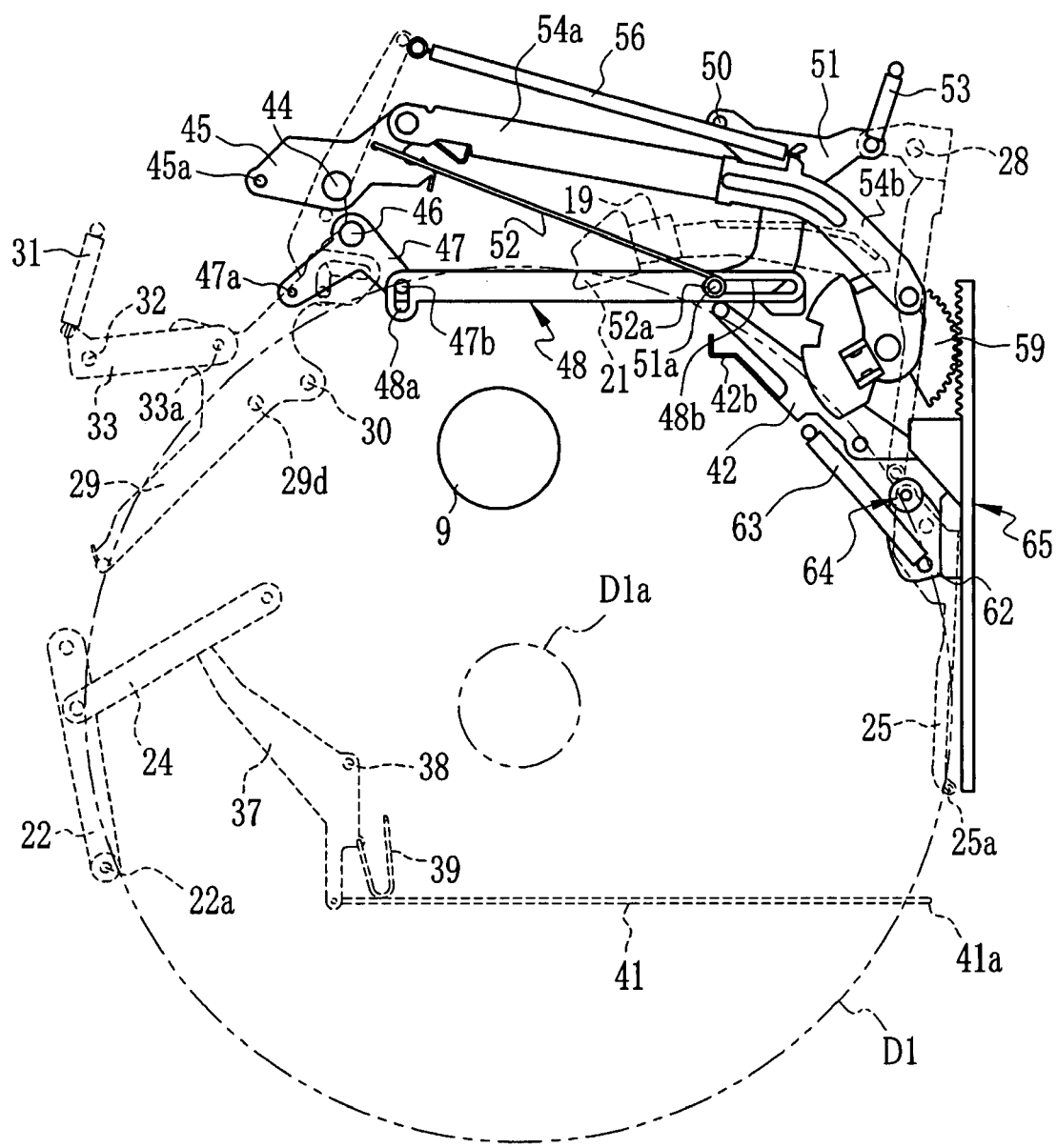

In FIGS. 12 and 19, a state of the large disk D1 is illustrated after being further pressed into the optical disk drive 1 by manual operation. Movement of the large disk D1 causes the gear tooth disk 59 of the disk support arm 19 to rotate further. The extendable link arm 54 is driven to move. The first pivot lever 45 swings about the rivet pin 44 to move back the follower pin 45a. Also, the loading motor 66 moves back the loading slider 43.

In this phase of the operation, the guide arm 29 swings toward the outside to shift the holding pin 29a away from the large disk D1. This is because the follower pin 29d of the guide arm 29 receives force on an inclined surface on the end of the guide groove 43c-1 of the loading slider 43.

The pivot lever 51 regulated by the link wire 52 is caused by the tension coil spring 53 to swing about a rivet pin 50 when the first pivot lever 45 swings. The guide arm 27 moves toward the center. The holding pin 27a of the guide arm 27 supports the lateral edge of the distal end half of the large disk D1. As the loading slider 43 moves back, the link lever 24 is driven. The loading arm 22 swings toward the center, so that the loading roller 22a contacts and supports the lateral edge of the proximal end half of the large disk D1. Note that the lifting frame 7 is in the position of FIG. 35A, as the follower pin 7a of the lifting frame 7 moves horizontally on in the lower cam end 43e-1 of the cam groove 43e.

Figure 37A:
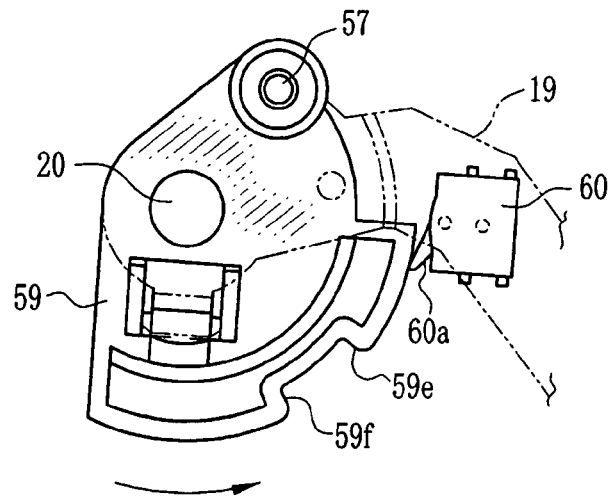
FIGS. 37A-37C are explanatory views illustrating operation of the gear tooth disk.
Figure 37B:
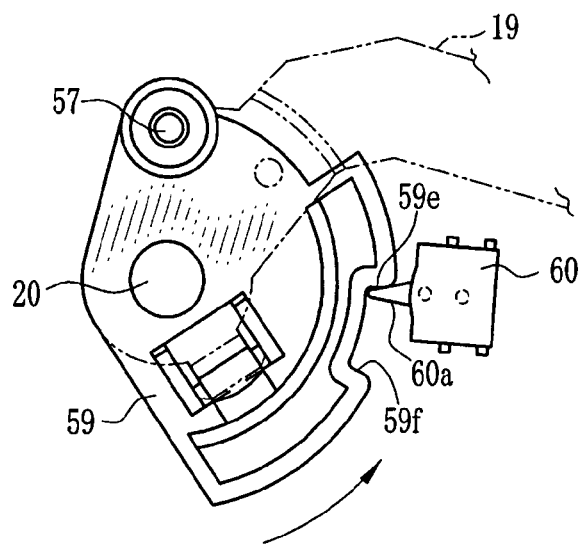
Figure 37C:
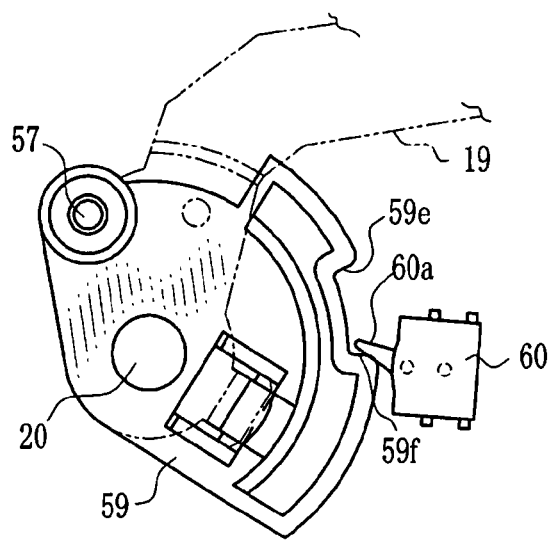
Figure 39A:
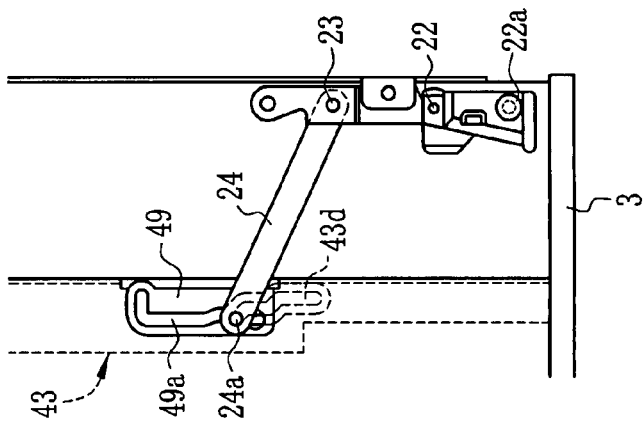
FIGS. 39A-39D are explanatory views illustrating operation of a loading arm.
Figure 39B:
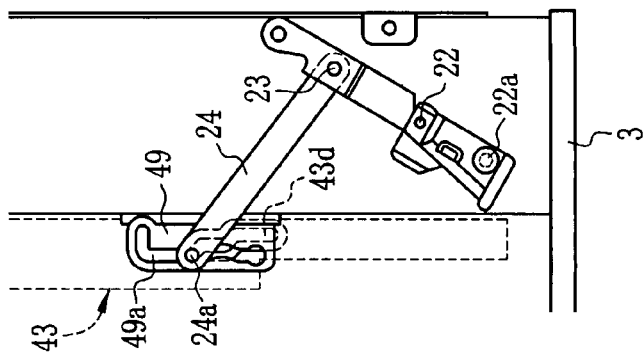
Figure 39C:
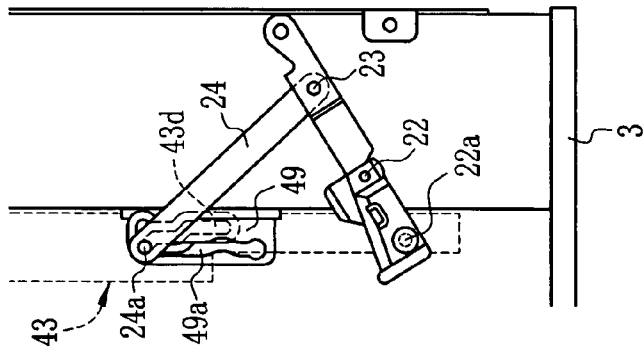
Figure 39D:
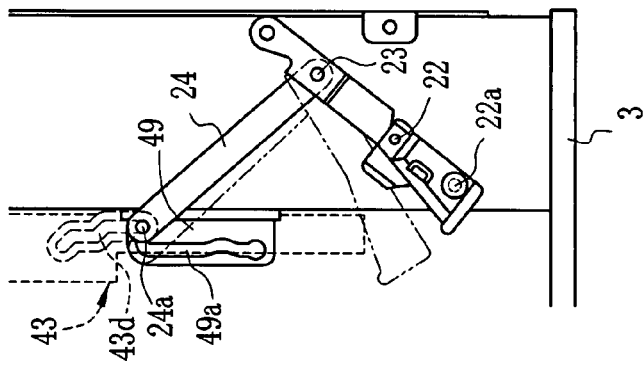
Figure 40E:
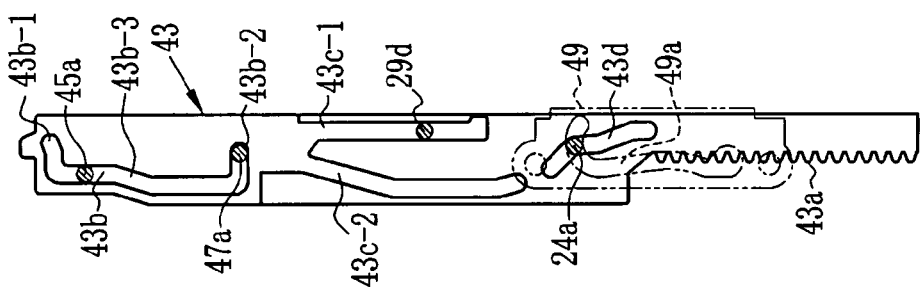
Figure 40F:
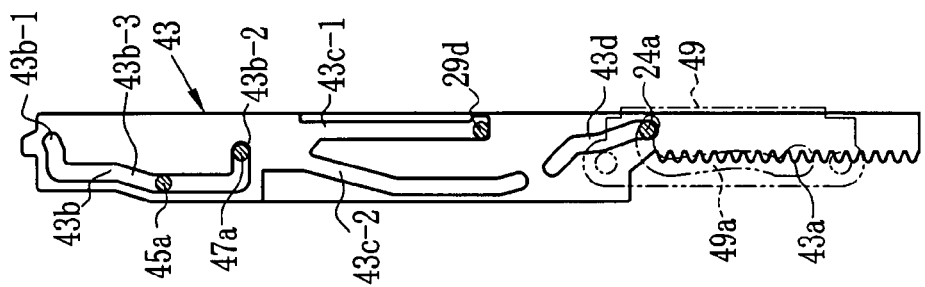

The gear tooth disk 59 of the disk support arm 19 rotates to the position of FIG. 37C. The switch driving surface 59f shifts the switching projection 60a of the limit switch 60 to a second position distinct from the first position. A signal is generated by the limit switch 60, to cause the motor control circuit to apply a high voltage to the loading motor 66. A high torque sufficient for moving in of the large disk D1 is generated. The force component F1a exerted by the loading roller 22a increases. The force component F1b exerted by the holding pin 25a of the guide arm 25 increases. A sum of force F2 occurs as a result of addition of those force components. The automatic loading is started by the loading motor 66.

Figure 13:
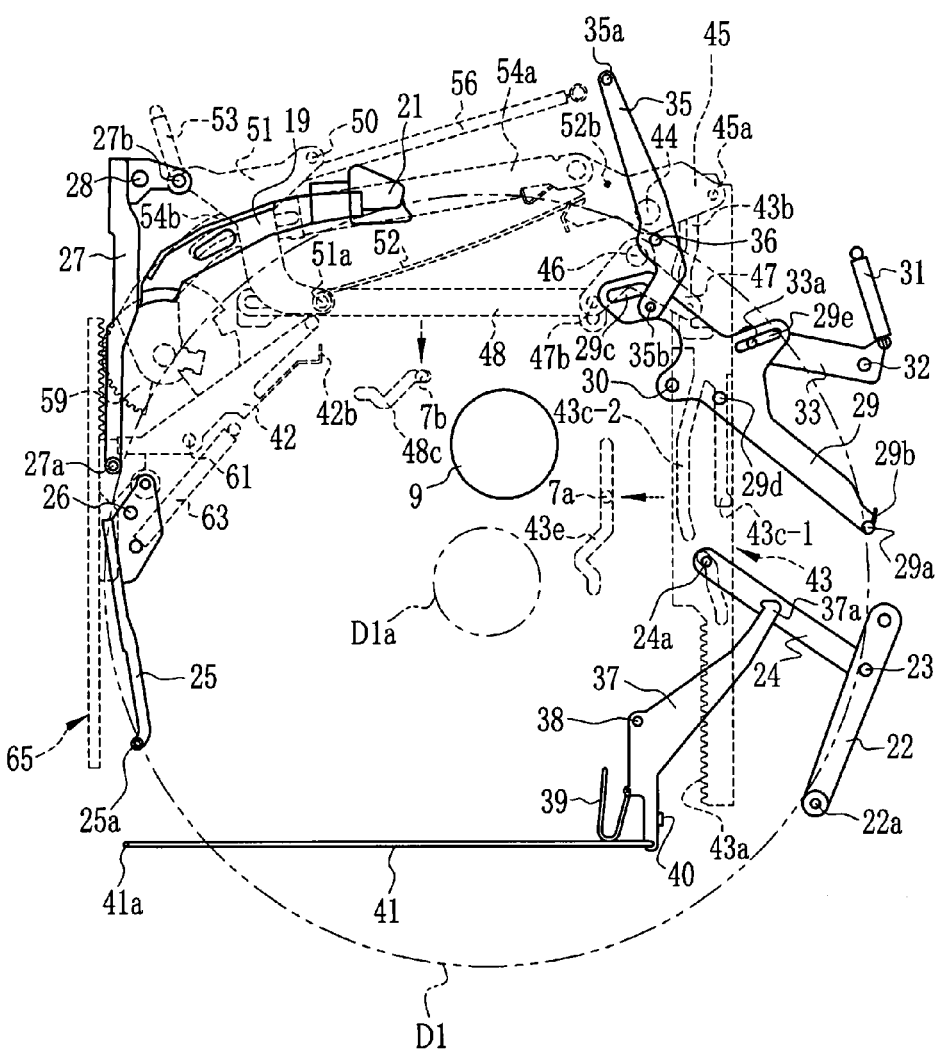
Figure 20:
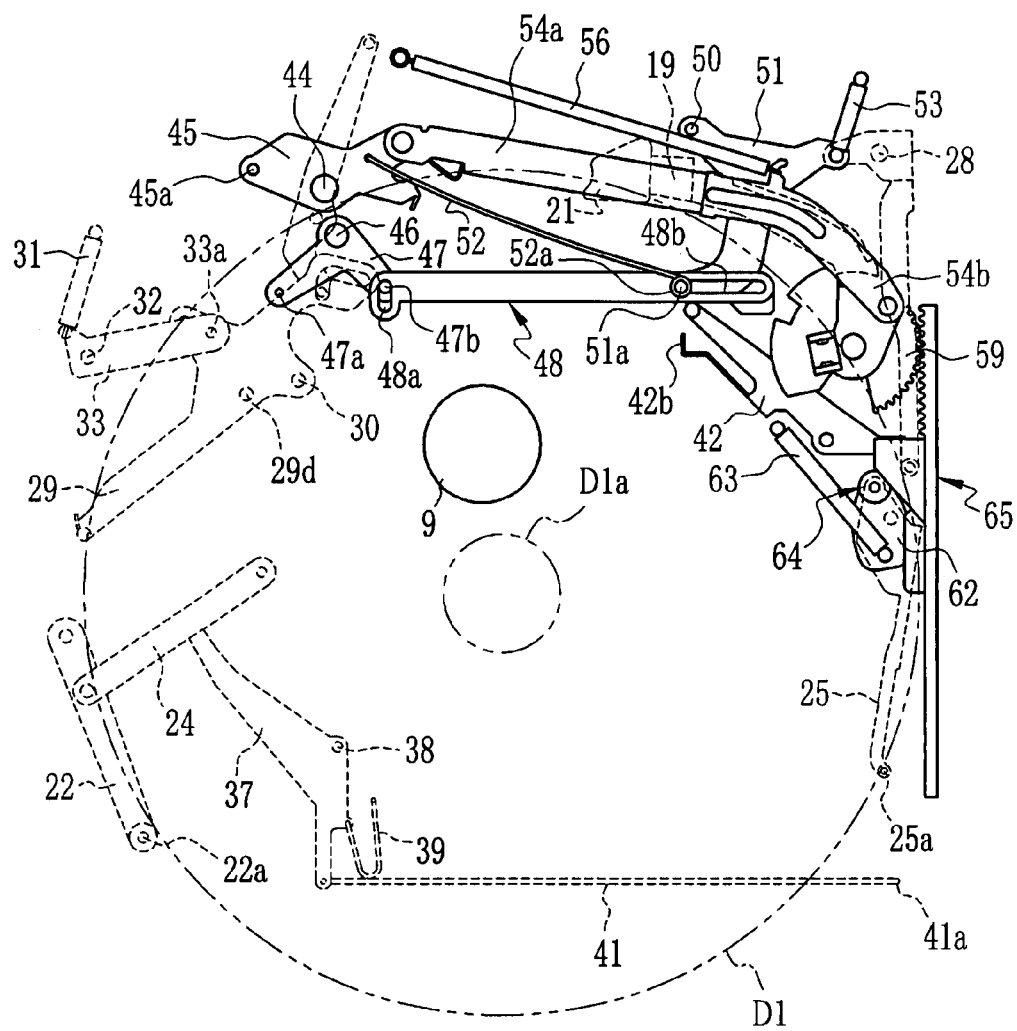

In FIGS. 13 and 20, a start of automatic loading with the loading motor 66 is illustrated. The loading slider 43 moves back further from the state of FIG. 12. The follower pin 29d of the guide arm 29 shifts from the inclined region of the loading slider 43 to the guide groove 43c-1. Thus, the guide arm 29 swings toward the outside further, to set the holding pin 29a away from the peripheral edge of the large disk D1. In FIGS. 38A, 38B, 38C and 38D, steps of moving the guide arm 29 in sequence are illustrated.

Sliding back of the loading slider 43 drives the link lever 24, to start the loading arm 22 to swing toward the center. In FIGS. 39A, 39B, 39C and 39D, the state of swing of the loading arm 22 is consecutively depicted. The state of FIG. 12 for the loading arm 22 is associated with shifting from the state of FIG. 39A to that state of FIG. 39B.

The follower pin 24a at the end of the link lever 24 is inserted in the guide groove 43d of the loading slider 43 and the guide slot 49a of the guide plate 49. When the loading slider 43 moves back, the follower pin 24a is squeezed between a rear inclined surface of the guide groove 43d and the wall of the guide slot 49a. Thus, the follower pin 24a moves back upon moving back of the loading slider 43. The link lever 24 swings to move the loading arm 22 pivotally.

During the period until the loading slider 43 slides back to the position of FIG. 13, the first groove end region 43b-1 of the guide groove 43b presses up the follower pin 45a of the first pivot lever 45 which is swung about the rivet pin 44. The gear tooth disk 59 is rotated by use of the extendable link arm 54, to swing the disk support arm 19 toward the outside. The holder 21 supporting the distal end of the large disk D1 moves back upon moving in of the large disk D1. The follower pin 47a of the second pivot lever 47 is sliding in the longitudinal region of the guide groove 43b. The second pivot lever 47 and also the slider 48 remain stopped.

During the period from the state of FIG. 12 to the state of FIG. 13, the holding pin 27a of the guide arm 27 biased by the tension coil spring 53 is moved back by moving in of the large disk D1. See FIG. 13. The guide arm 27 is stopped by contact with the retaining tongue 42a of the lever arm 42. As the pivot lever 51 moves pivotally to a small extent, the end pin 51a moves toward the center inside the slot 48b of the slider 48. The link wire 52 is loosened by reduction of tension.

In contrast, the holding pin 25a of the guide arm 25 supports a lateral edge of the proximal end half of the large disk D1. The high position guide region 65c of the rack sliding mechanism 65 advanced by the gear tooth disk 59 is away from the small diameter roll 64b of the double roller 64. The follower pin 7a of the lifting frame 7 is moving horizontally in the lower cam end 43e-1 of the cam groove 43e. The lifting frame 7 remains positioned as depicted in FIG. 35A as the slider 48 is stopped.

Figure 14:
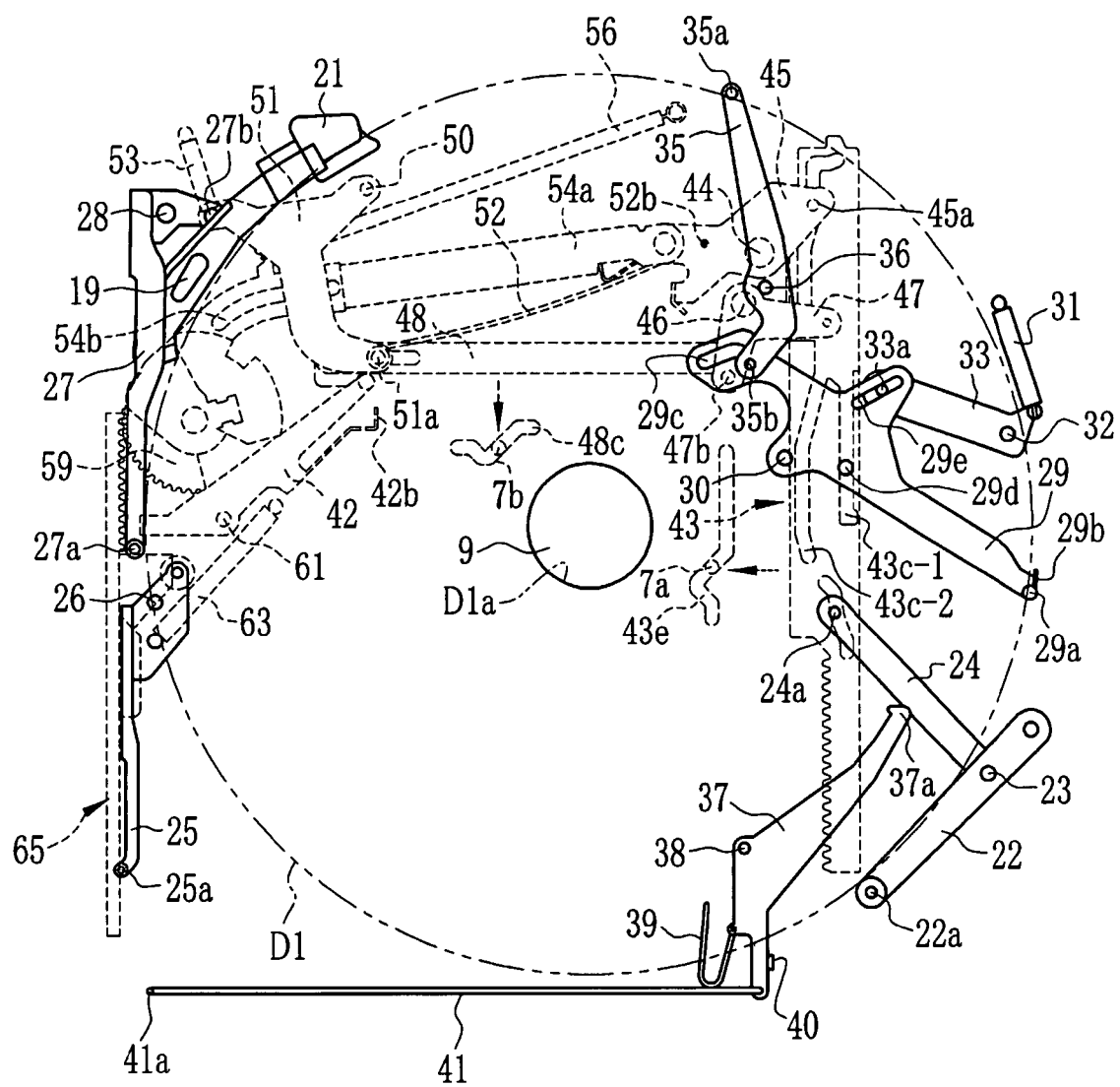
Figure 21:
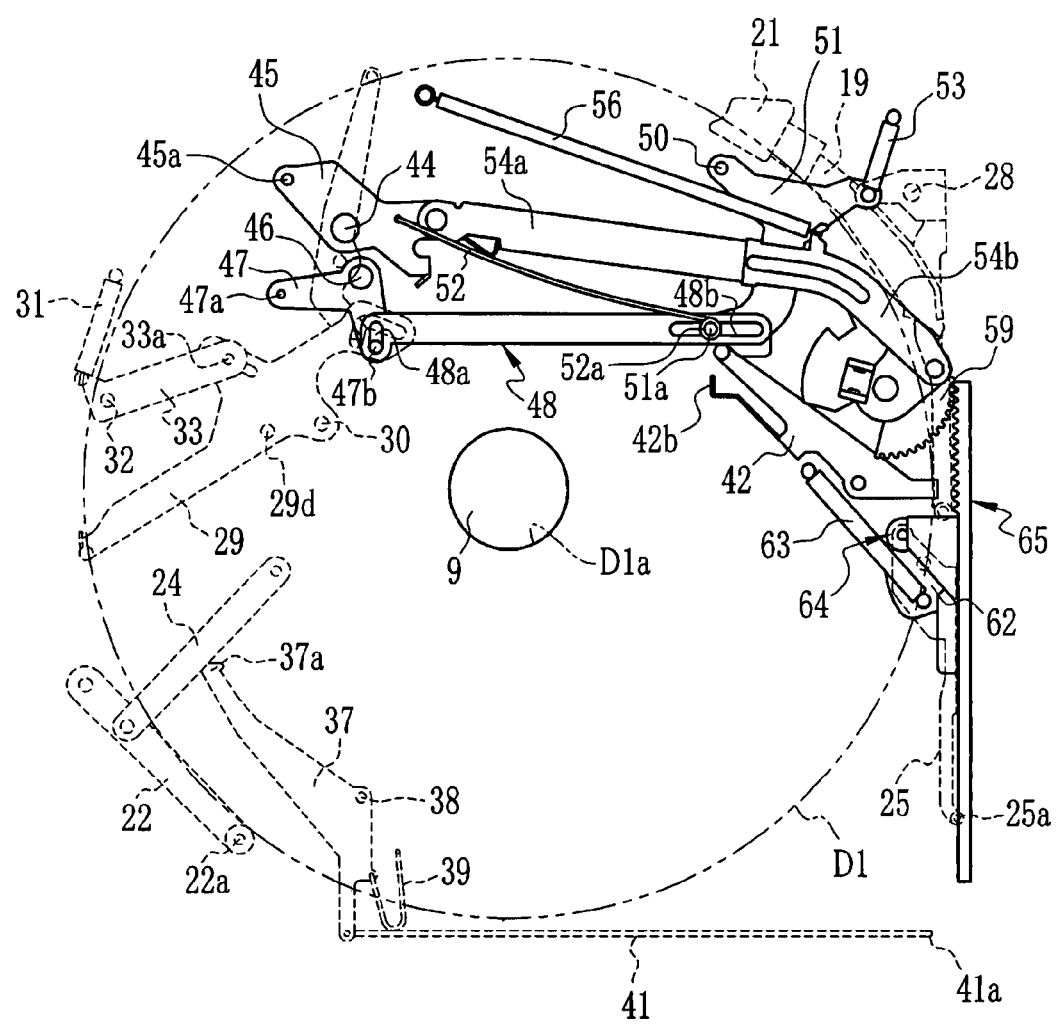

In FIGS. 14 and 21, the large disk D1 is set in the chuck position where the center hole D1a is positioned at the center of the chuck head 9. As the follower pin 29d of the guide arm 29 is movable straight in the guide groove 43c-1 of the loading slider 43. The guide arms 29 and 35 remain stopped in the position of FIG. 14. The center hole D1a of the large disk D1 is exactly set at the chuck head 9 by positioning the peripheral edge of the large disk D1 with the holding pins 29a and 35a.

As the loading slider 43 slides back, the follower pin 45a of the first pivot lever 45 is pressed up by the first groove end region 43b-1, and shifts to the longitudinal region 43b-3. The first pivot lever 45 moves to the position of FIG. 14. The gear tooth disk 59 rotates to cause the disk support arm 19 to move toward the outside rotationally. As the rotation of the gear tooth disk 59 advances the rack sliding mechanism 65 further, the small diameter roll 64b of the double roller 64 becomes engaged with the high position guide region 65c. The guide arm 25 moves to a large extent rotationally, for the holding pin 25a to come away from the peripheral edge of the large disk D1 to terminate supporting. The guide arm 25 moves away from the lifting frame 7 laterally. Consequently, the lifting frame 7 moving up can be free from collision on the guide arm 25.

The large disk D1 presses the holding pin 27a of the guide arm 27. As the holding pin 27a is kept stopped by contact with the retaining tongue 42a of the lever arm 42, a center of the large disk D1 is set to coincide with the center of the chuck head 9 in the horizontal direction. With reference to the vertical direction, a center of the large disk D1 is set to coincide with the center of the chuck head 9 by the holder 21 of the disk support arm 19 stopped as illustrated in FIG. 14, and by the loading roller 22a of the loading arm 22.

The plural arms, therefore, support the peripheral edge of the large disk D1 upon the start of the automatic loading of the large disk D1, and move the same into the optical disk drive 1. The large disk D1 is set in the chuck position where the center hole D1a is ready for clamping of the chuck head 9.

In the transition from the state of FIG. 13 to that of FIG. 14, the follower pin 7a of the lifting frame 7 is caused by moving back of the cam groove 43e of the loading slider 43 to shift from the lower cam end 43e-1 to the inclined region 43e-2, and moves up along the inclined region 43e-2. Also, the follower pin 47a of the second pivot lever 47 shifts from the longitudinal region 43b-3 to the second groove end region 43b-2 of the loading slider 43, so that the second pivot lever 47 swings toward the outside. As the driving pin 47b moves the slider 48 horizontally, the cam groove 48c also moves. The follower pin 7b of the lifting frame 7 shifts up from the lower cam end 48c-1 to the inclined region 48c-2, to start moving up the lifting frame 7. See FIG. 35B.

Figure 15:
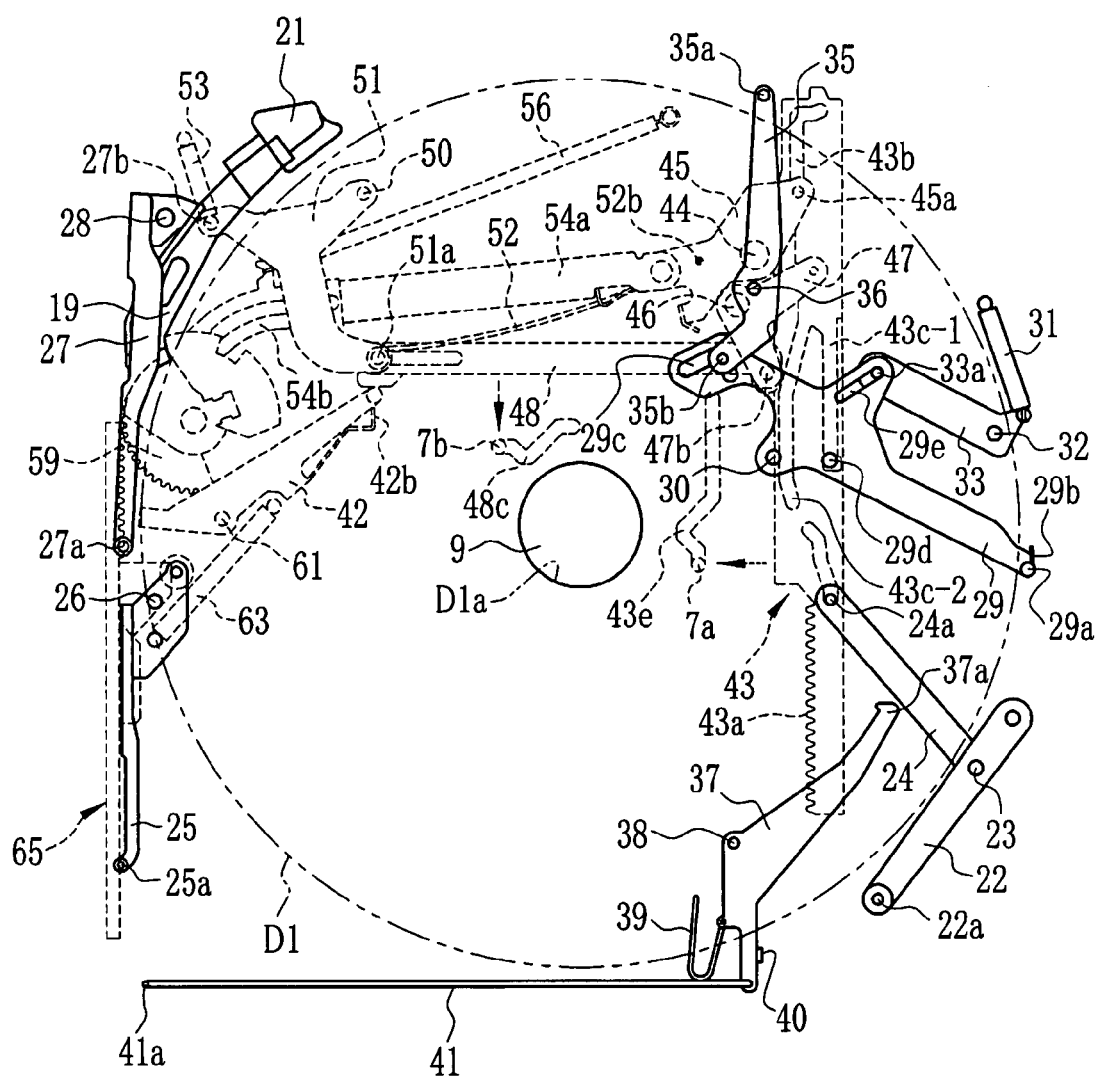
Figure 22:
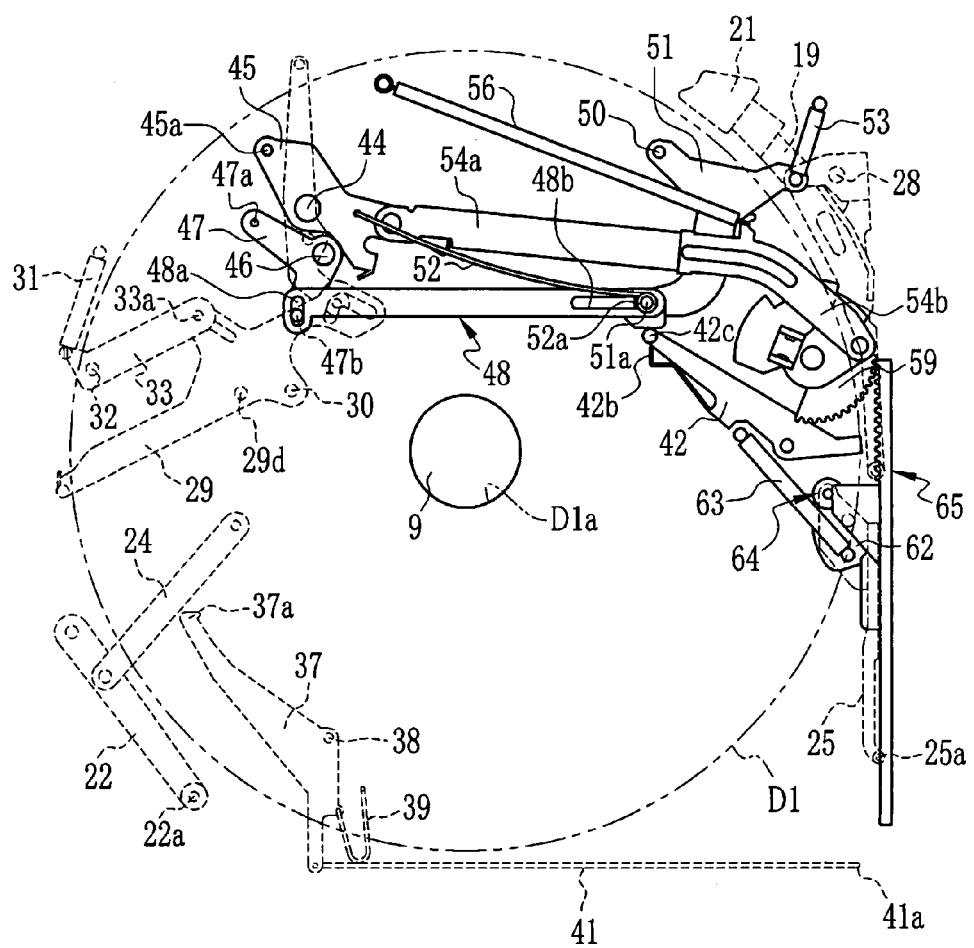

In FIGS. 15 and 22, a final phase of the loading of the large disk D1 is illustrated. The disk support arm 19, the loading arm 22, the guide arm 27 are structurally swung to such an extent as to come away from the large disk D1 to enable the same for rotation.

While the loading slider 43 remains positioned back from the state of FIG. 14, the follower pin 24a of the link lever 24 is pressed in a horizontal groove at the rear end of the guide slot 49a by the eccentric portion of the guide groove 43d disposed in its rear. The link lever 24 shifts to a small extent in reverse to its first moving direction. See FIG. 39D. The loading arm 22 swings toward the outside, to come away from the peripheral edge of the large disk D1.

At the same time, the follower pin 45a of the first pivot lever 45 is slightly swung by an inclined region of the longitudinal region 43b-3 of the guide groove 43b. The swing is transmitted by the extendable link arm 54 to the gear tooth disk 59. The disk support arm 19 is rotated toward the outside and reaches a separate position. The disk support arm 19 in the separate position is away from the large disk D1.

The second groove end region 43b-2 of the guide groove 43b of the loading slider 43 pushes up the follower pin 47a of the second pivot lever 47 to a large extent. Then the driving pin 47b swings toward the outside. The slider 48 slides horizontally for the slot 48b to drive the end pin 51a of the pivot lever 51. As the pivot lever 51 swings to a small extent, the cam portion 48d pushes up the end roller 42c of the lever arm 42. The retaining tongue 42a of the lever arm 42 moves back. The guide arm 27 swings toward the outside and away from the peripheral edge of the large disk D1.

An end of the guide groove 43c-1 of the loading slider 43 presses the follower pin 29d of the guide arm 29, which swings slightly. The holding pin 29a of the guide arm 29 rotates toward the outside, and comes away from the peripheral edge of the large disk D1. Also, the guide arm 35 swings in connection with the guide arm 29 by means of the guide groove 29c and the follower pin 35b. The holding pin 35a rotates outwards and comes away from the large disk D1.

During the period from the state of FIG. 14 to the state of FIG. 15, the slider 48 slides horizontally upon moving back of the loading slider 43. The follower pin 7a of the lifting frame 7 moves from the inclined region 43e-2 to the upper cam end 43e-3 in the cam groove 43e of the loading slider 43. Also, the follower pin 7b moves from the inclined region 48c-2 to the upper cam end 48c-3 in the cam groove 48c of the slider 48.

Figure 35B:
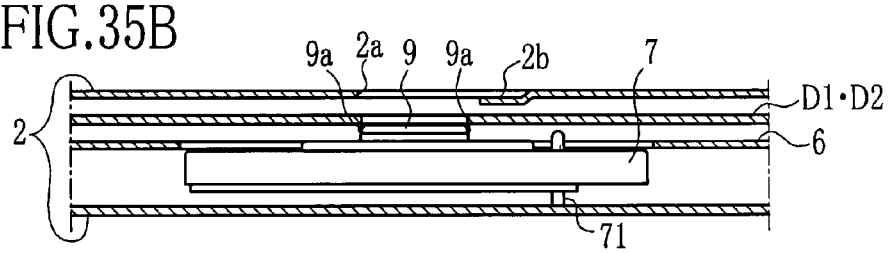
Figure 35C:
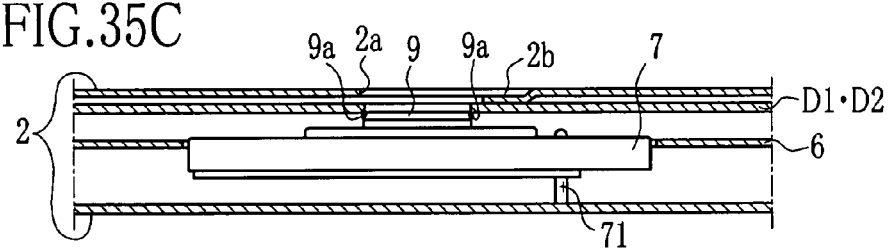

In this sequence, the lifting frame 7 moves up as the follower pins 7a and 7b are moved up by the inclined regions 43e-2 and 48c-2. In FIG. 35C, the chuck claws 9a of the chuck head 9 press up the large disk D1 in contact with the center hole D1a, of which an inner edge contacts the projection 2b of the case chassis 2.

Figure 35D:
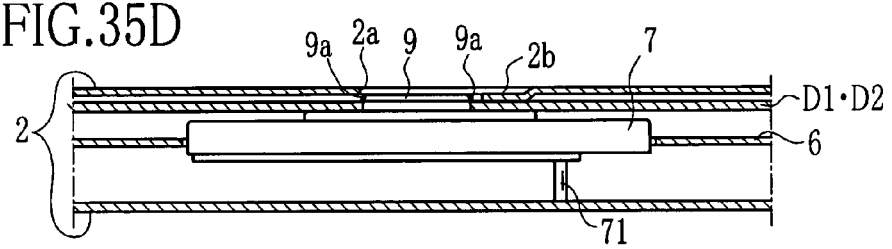

When the follower pins 7a and 7b reach the tops of respectively the inclined regions 43e-2 and 48c-2, the chuck claws 9a chuck fully as illustrated in FIG. 35D upon entry of the chuck head 9 in the center hole D1a of the large disk D1. In the disk driving unit A, the large disk D1 becomes positioned on the turntable 10. Then the follower pins 7a and 7b reach respectively the upper cam ends 43e-3 and 48c-3. The lifting frame 7 moves down to the position of FIG. 35E, and becomes ready for driving of the large disk D1.

A limit switch (not shown) is turned on by the rear end of the loading slider 43 as the large disk D1 becomes ready for rotation. In response to an output of the limit switch, the motor control circuit turns off the loading motor 66. The spindle motor 11 is energized to rotate the large disk D1. Also, the pickup moving motor 16 rotates to move the optical pickup head 12 in the disk radial direction. Writing and reading of information with the large disk D1 are performed by the optical pickup head 12.

Moving out of the large disk D1 is described now. At first, the ejection pushbutton 4 is depressed. The spindle motor 11 is stopped. The pickup moving motor 16 rotates in a backward direction, to move back the optical pickup head 12 to the initial position of FIG. 3. Then the motor control circuit rotates the loading motor 66 backwards, and advances the loading slider 43 to start unloading of the large disk D1. In response to the advance of the loading slider 43, the various mechanical elements operate in reverse manners to those described above for the loading. In FIGS. 35A-35E, the lifting frame 7 moves up at first, and then moves down to the initial position. The large disk D1 is moved up by the release pin 71 as illustrated in FIG. 36C, and removed from the chuck head 9.

Before releasing of the chucking of the large disk D1, the disk support arm 19, the loading arm 22 and the guide arm 27 start moving toward the center, to support the peripheral edge of the large disk D1. See FIG. 14. Force of swing of the disk support arm 19 toward the center moves out the large disk D1. A proximal end of the large disk D1 is moved to appear in the outside of the insertion slot 3a of the front bezel 3, to move the large disk D1 to the ejection position. At this time, the limit switch (not shown) is turned on by the end of the loading slider 43. The motor control circuit responsively turns off the loading motor 66, to complete the unloading.

The large disk D1 of which the proximal end has emerged outside is grasped by fingers of a user, and pulled away from the insertion slot 3a. In FIGS. 40A, 40B, 40C, 40D, 40E and 40F, steps of movement of the follower pins 24a, 29d, 45a and 47a are illustrated during sliding back of the loading slider 43.

Loading of the small disk D2 is described next, by referring to FIGS. 23-28 and FIGS. 29-34 associated with those. In FIGS. 23-28, the cam grooves 43e and 48c and the follower pins 7a and 7b are illustrated.

Figure 23:
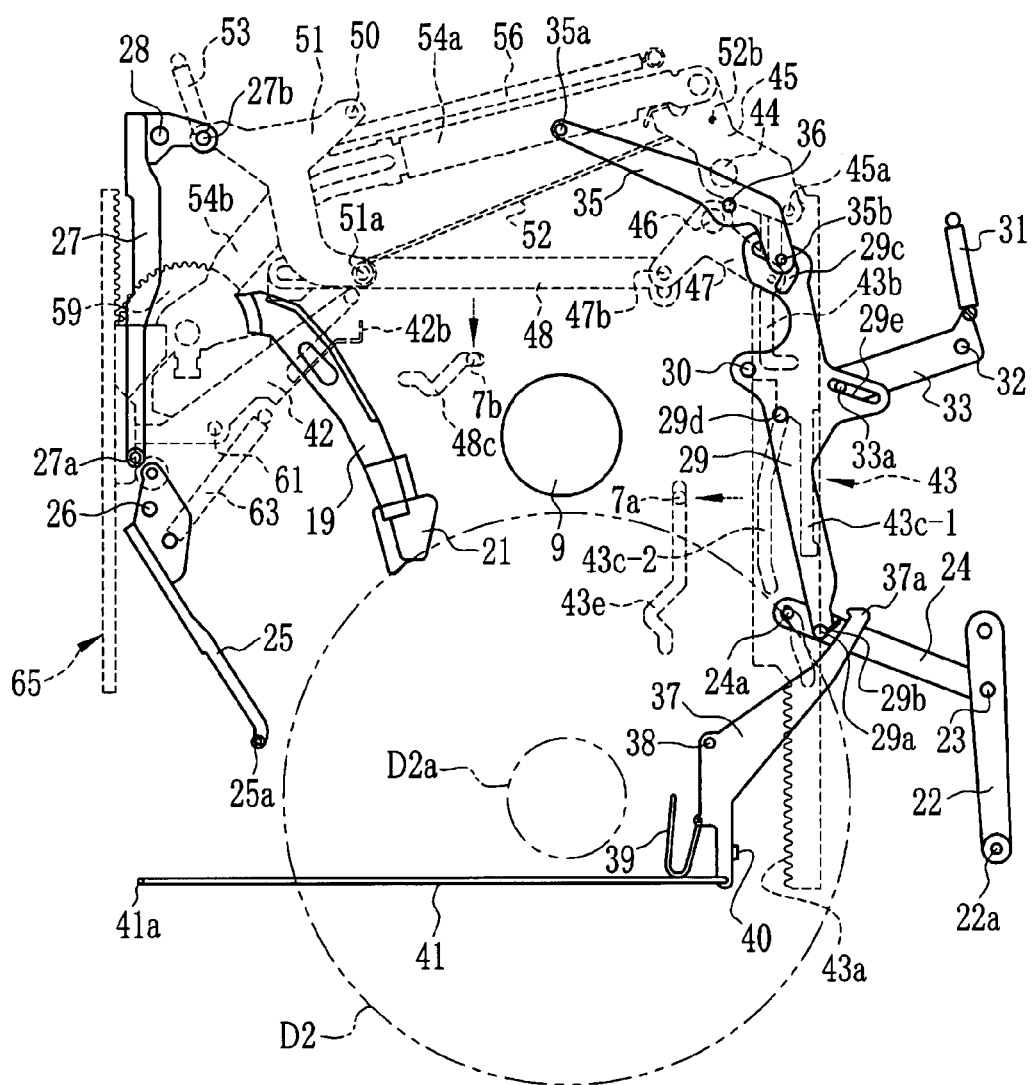
FIGS. 23-28 are plans illustrating the loading mechanism in steps of a sequence where a small disk is moved.
Figure 24:
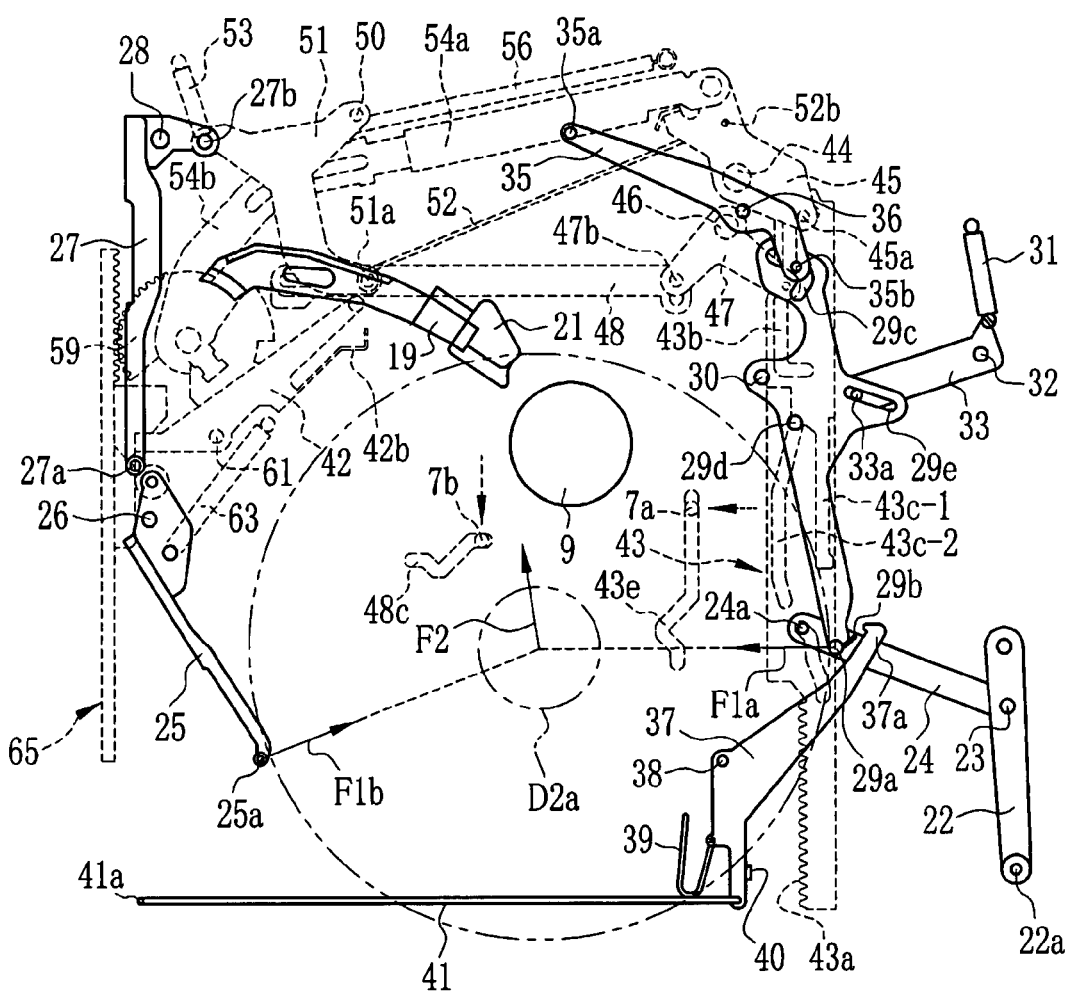
Figure 31:
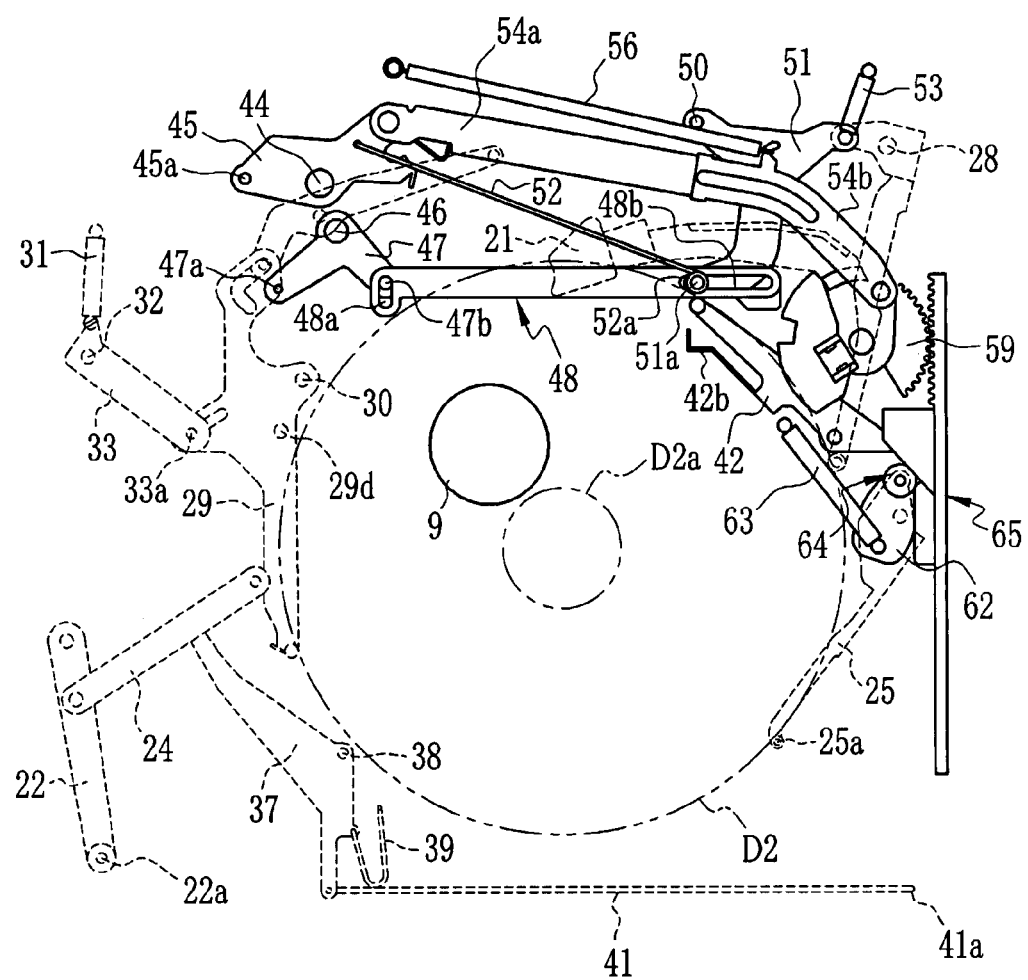

The parts of the loading mechanism are in the position of FIGS. 9 and 16 before loading of the small disk D2. In FIGS. 24 and 31, the small disk D2 is moved in through the insertion slot 3a of the front bezel 3. A distal end of the small disk D2 is received by the holder 21 of the disk support arm 19 set in the ready position. If the small disk D2 is moved in an offset state toward the left in FIG. 23 during the entry through the insertion slot 3a, the left lateral edge of the proximal end half of the small disk D2 contacts the holding pin 25a of the guide arm 25 and pushed back toward the right. Thus, the small disk D2 is kept on the moving path without drop.

For insertion of the small disk D2, a right lateral edge of the distal end half of the small disk D2 is likely to press the holding pin 29a of the guide arm 29 as illustrated in FIG. 41A. The tongue 29b is retained by the angle portion or hook 37a of the lock lever 37 as illustrated in FIG. 41B. Thus, the guide arm 29 is kept positioned without moving pivotally. The small disk D2 is guided by the holding pin 25a of the guide arm 25 and the holding pin 29a of the guide arm 29, and caused to move to the center of the optical disk drive 1.

Figure 30:
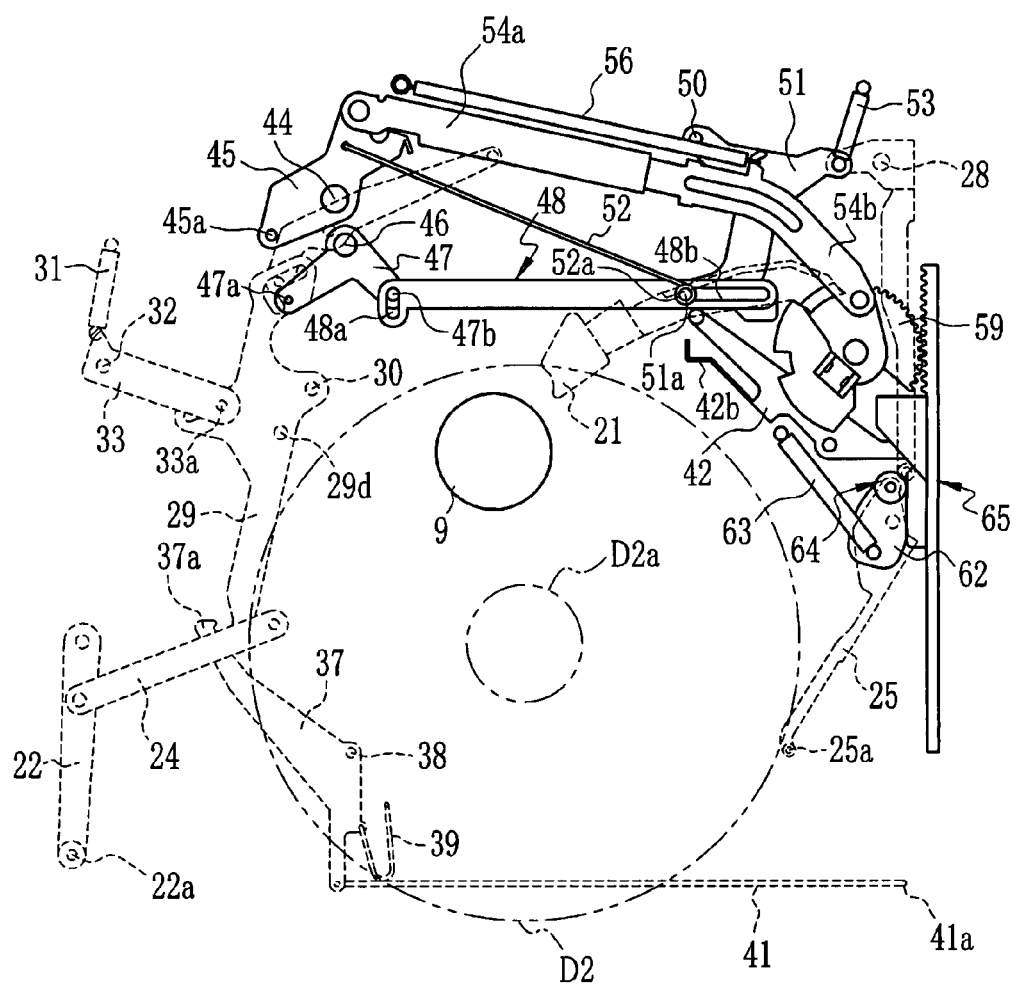

In FIGS. 24 and 30, the small disk D2 is moved in further in the insertion. The disk support arm 19 is swung toward the outside by the small disk D2. In response, the holding pin 25a of the guide arm 25 and the holding pin 29a of the guide arm 29 come in contact with the peripheral edge of the small disk D2. The small disk D2 becomes held at three points of the holding pins 25a and 29a and the holder 21 of the disk support arm 19.

The disk support arm 19 rotates from the position of FIG. 37A to the position of FIG. 37B about the rivet pin 20. The limit switch 60 is actuated by the switch driving surface 59e of the gear tooth disk 59. The motor control circuit is responsive to a signal from the limit switch 60, and applies low voltage to the loading motor 66 for rotation at a low torque. A force component F1a is exerted by pressing of the holding pin 29a of the guide arm 29. The force component F1b is exerted by the holding pin 25a of the guide arm 25 biased by the tension coil spring 63. As the small disk D2 is pressed in the inward direction with the sum of the force F2 in addition of the force components F1a and F1b, automatic loading with the loading motor 66 is started.

Figure 25:
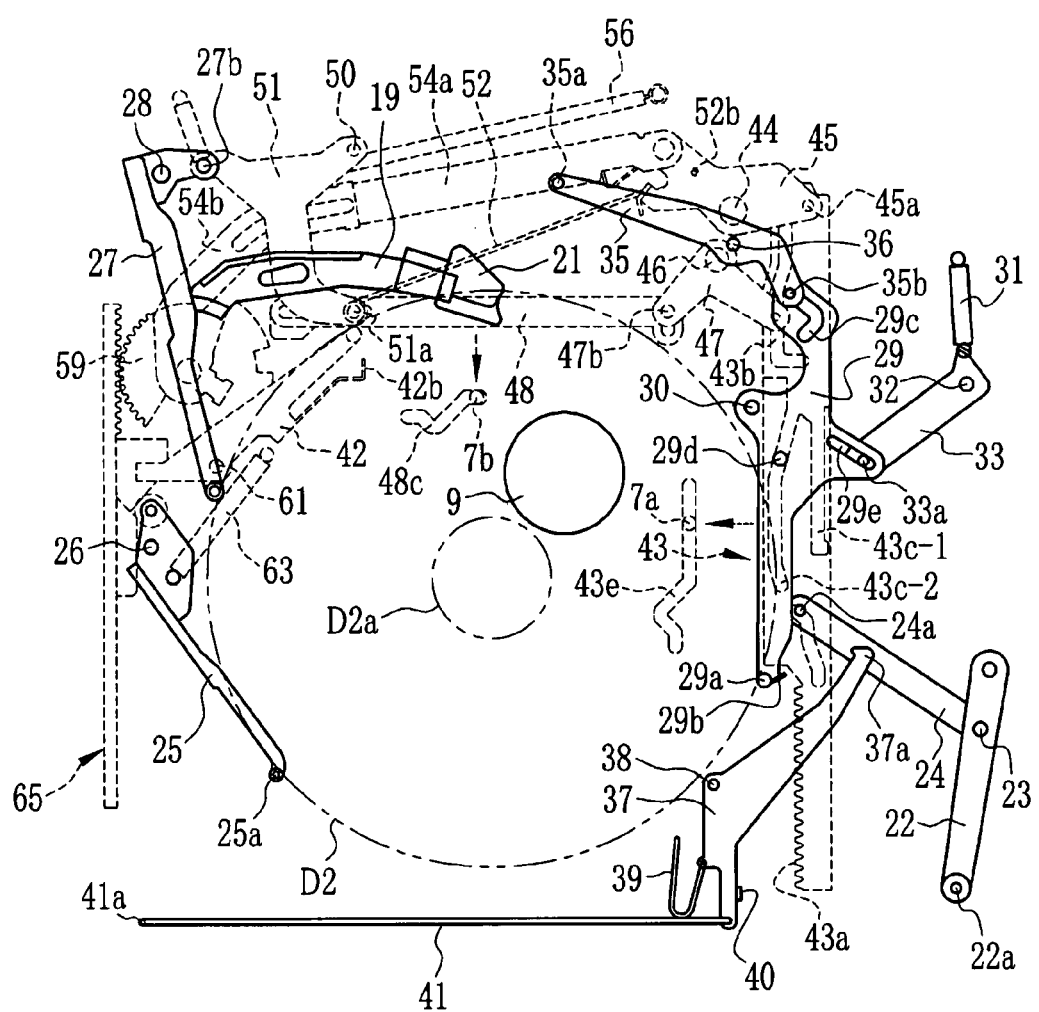

In FIGS. 25 and 31, the start of automatic loading with the loading motor 66 is illustrated. The loading slider 43 moves back from the state of FIG. 24. The follower pin 29d of the guide arm 29 moves into the guide groove 43c-2 of the loading slider 43. The inclined region of the guide groove 43c-2 guides and moves the follower pin 29d at a distance of the size of the inclined region. The small disk D2 is moved in. The holding pin 29a moves pivotally to the position of FIG. 25. The tension coil spring 63 moves the guide arm 25 pivotally to the position of FIG. 25 while the small disk D2 is moved in. The gear tooth disk 59 of the disk support arm 19 rotates to the position of FIG. 37C, so that the switching projection 60a of the limit switch 60 is shifted by the switch driving surface 59f. The loading motor 66 generates a high torque as the motor control circuit applies high voltage to the loading motor 66.

While the loading slider 43 moves to the position of FIG. 25, the first groove end region 43b-1 of the guide groove 43b presses up the follower pin 45a of the first pivot lever 45. The first pivot lever 45 swings about the rivet pin 44 and causes the extendable link arm 54 to rotate the gear tooth disk 59. The disk support arm 19 moves pivotally toward the outside. The holder 21 supporting the distal end of the small disk D2 moves back. As the follower pin 47a of the second pivot lever 47 slides in the longitudinal region of the guide groove 43b, the second pivot lever 47 remains stopped. The slider 48 also remains stopped.

The pivot lever 51 is pivotally moved by the tension coil spring 53 in response to the movement of the first pivot lever 45. The guide arm 27 rotates about the rivet pin 28. The holding pin 27a of the guide arm 27 contacts and presses the peripheral edge of the small disk D2. The follower pin 7a of the lifting frame 7 is moving in the lower cam end 43e-1 of the cam groove 43e. The slider 48 remains stopped. The lifting frame 7 is still in the state of FIG. 35A.

Figure 26:
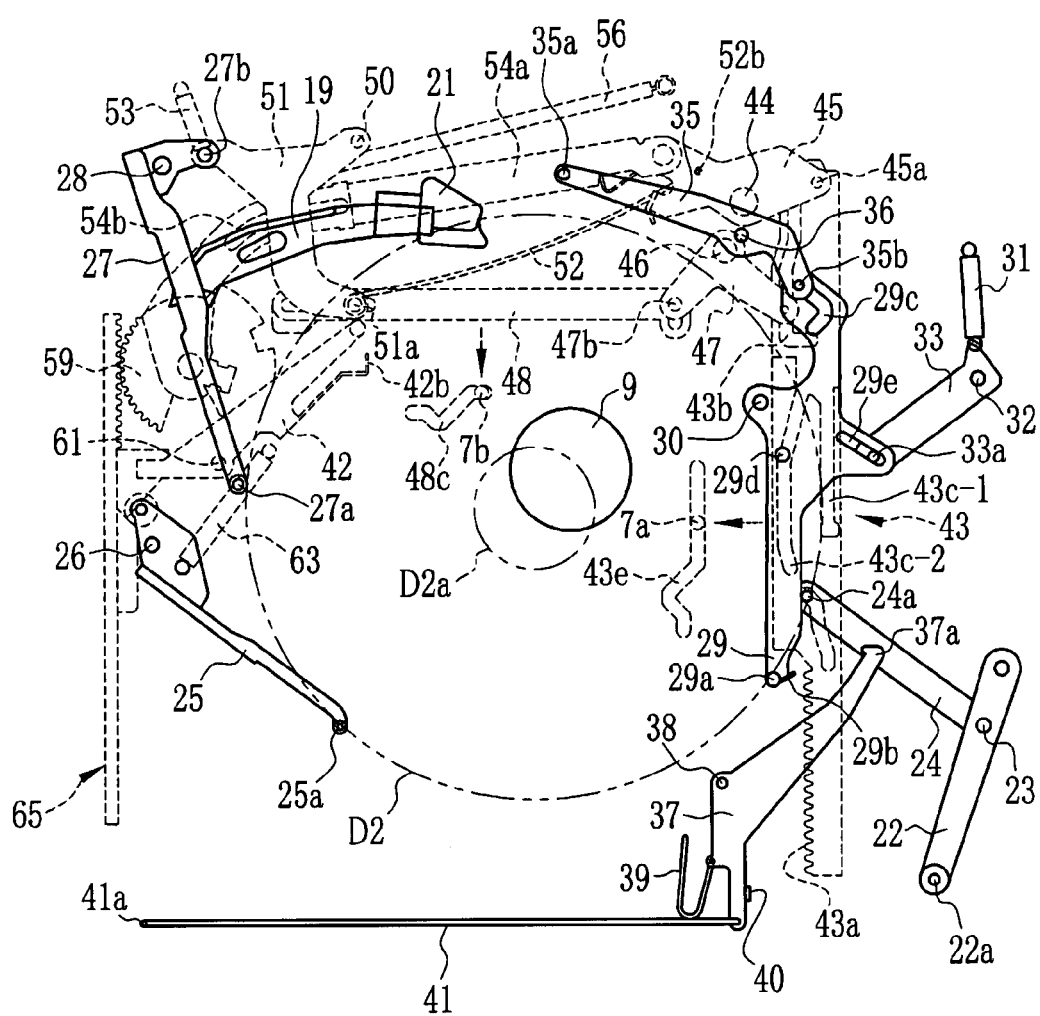
Figure 32:
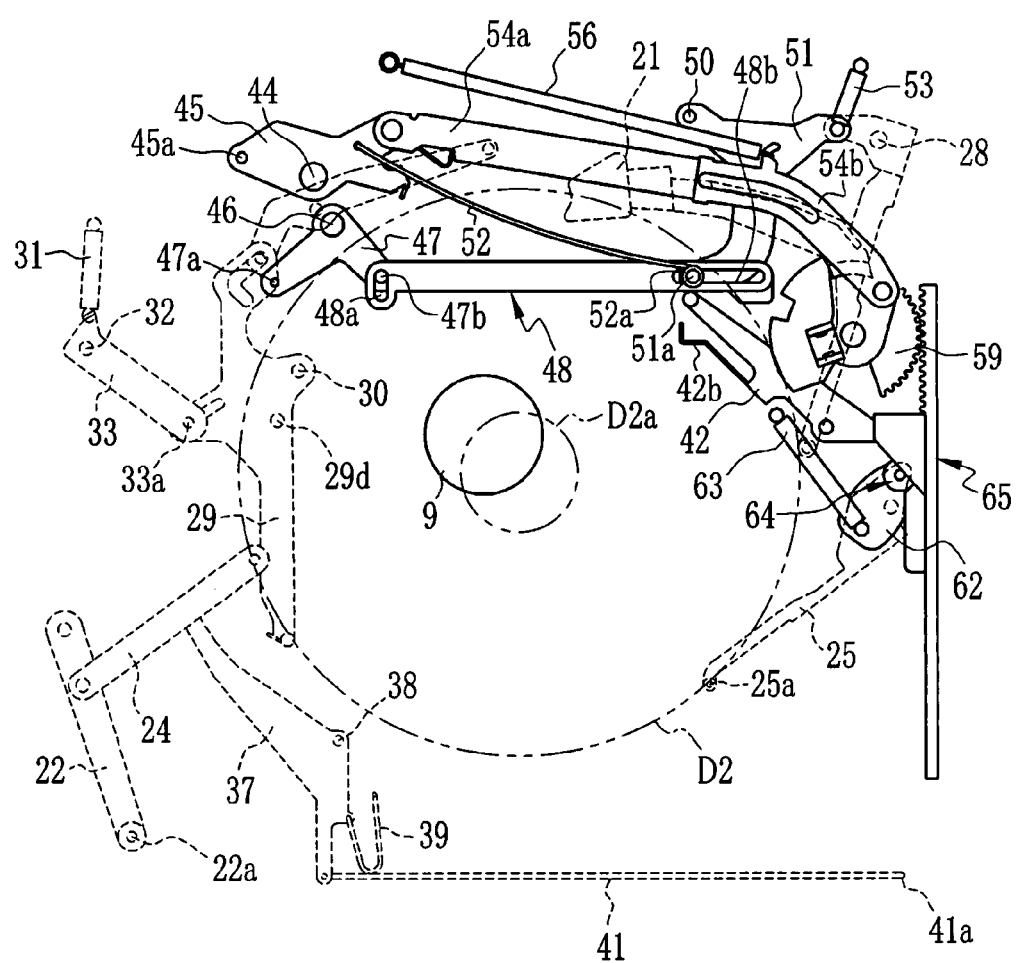

In FIGS. 26 and 32, the loading slider 43 is further moved back, to continue moving in of the small disk D2. Though the guide arm 29 is stopped, the disk support arm 19 swings outwards together with the small disk D2 according to the slide of the loading slider 43. Also, the guide arms 25 and 27 swing toward the center.

Figure 27:
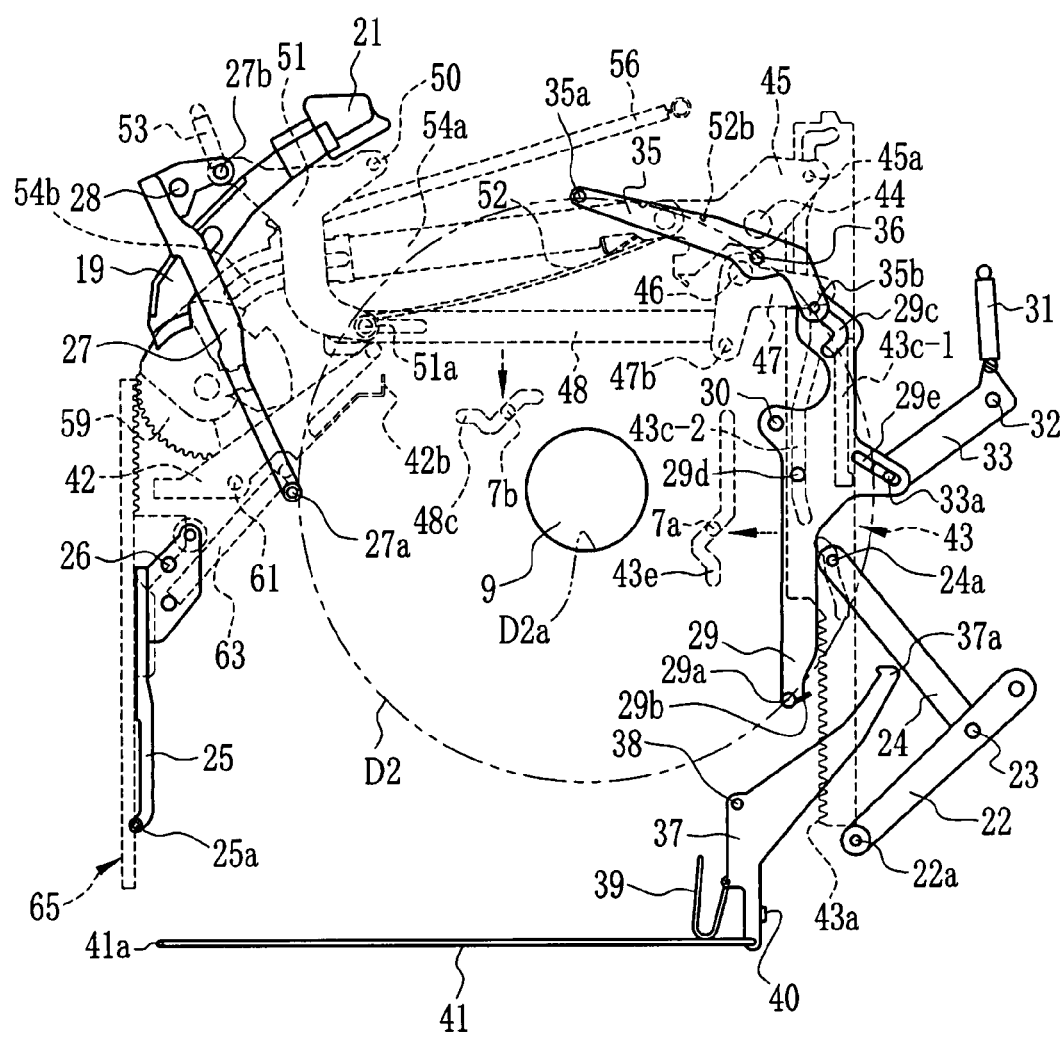
Figure 33:
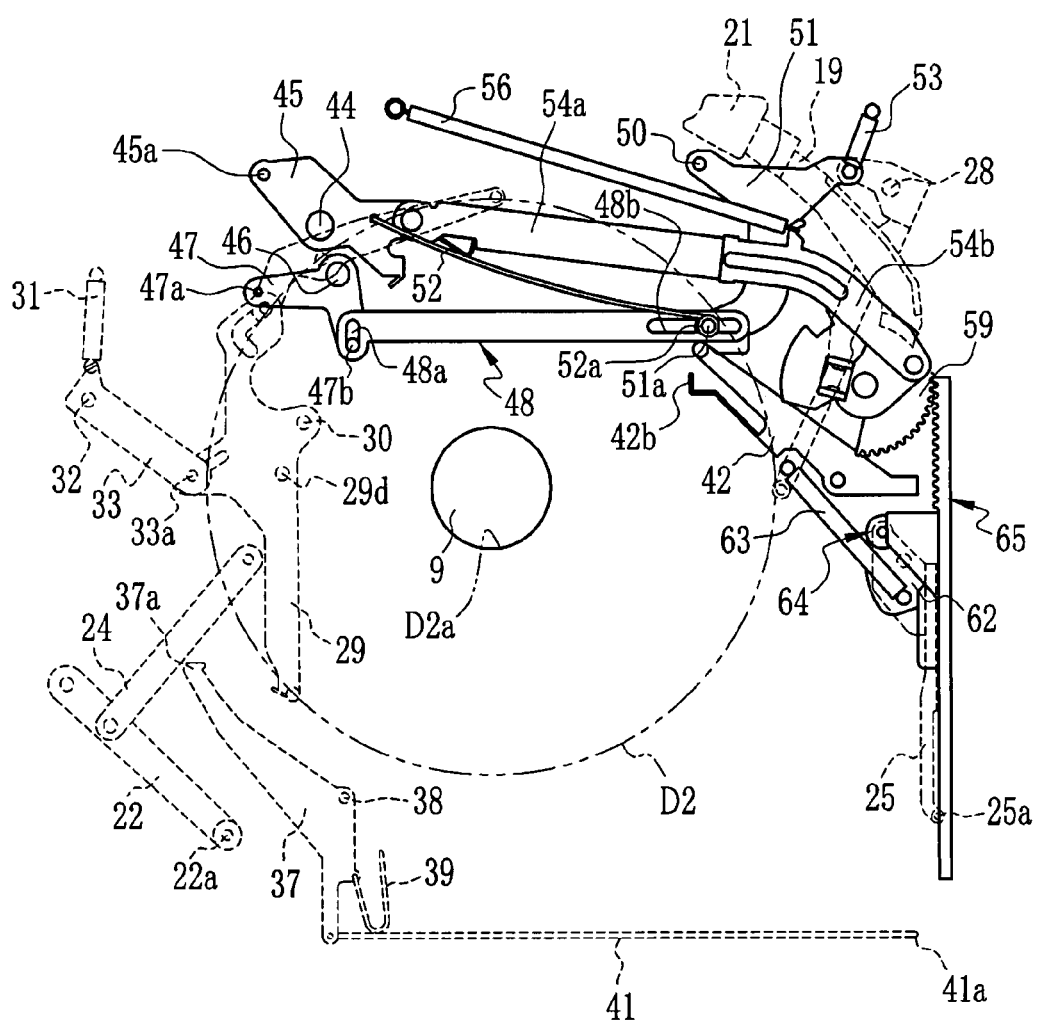

In FIGS. 27 and 33, the small disk D2 is set in the chuck position. A step preceding to the state depicted in those is described. When the loading slider 43 slides back, the disk support arm 19 pivotally moves outwards to come away from the peripheral edge of the small disk D2. The disk support arm 19 causes the gear tooth disk 59 to drive the rack sliding mechanism 65 for advance. The small diameter roll 64b of the double roller 64 becomes engaged with the high position guide region 65c of the rack sliding mechanism 65. Thus, the guide arm 25 is swung in the outward direction, and comes away from the peripheral edge of the small disk D2. The guide arm 25 retreats beside the lifting frame 7 and does not overlap on the lifting frame 7. The peripheral edge of the small disk D2 is supported at three points, namely by the holding pin 27a of the guide arm 27, the holding pin 29a of the guide arm 29, and the holding pin 35a of the guide arm 35.

During the period from the state of FIG. 26 to the state of FIG. 27, the cam groove 43e of the loading slider 43 moves back. The follower pin 7a of the lifting frame 7 is caused by the cam groove 43e to shift from the lower cam end 43e-1 to the inclined region 43e-2. Also, the follower pin 47a of the second pivot lever 47 shifts from the longitudinal region 43b-3 to the second groove end region 43b-2 in the loading slider 43. So the second pivot lever 47 rotates clockwise in FIG. 33. As the slider 48 moves to the left in FIG. 33, the driving pin 47b moves horizontally in the cam groove 48c. The follower pin 7b of the lifting frame 7 shifts from the lower cam end 48c-1 to the inclined region 48c-2. In FIG. 35B, the lifting frame 7 starts moving up.

Figure 28:
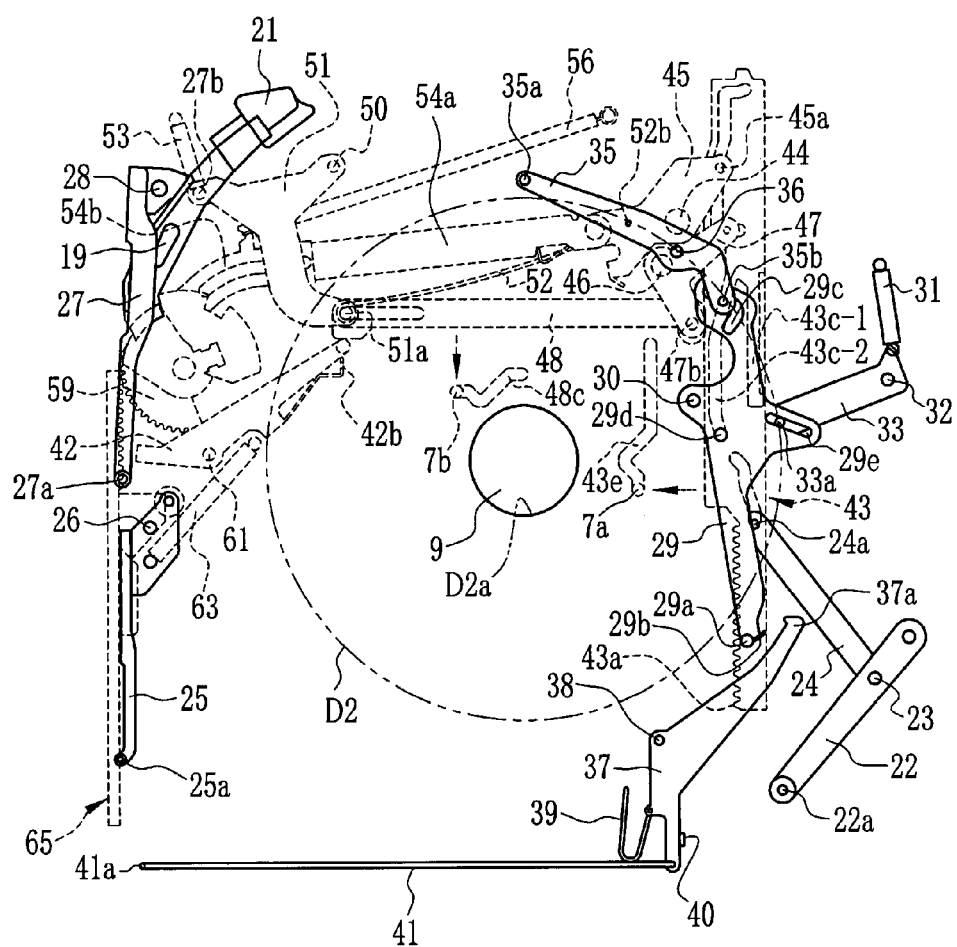
Figure 29:
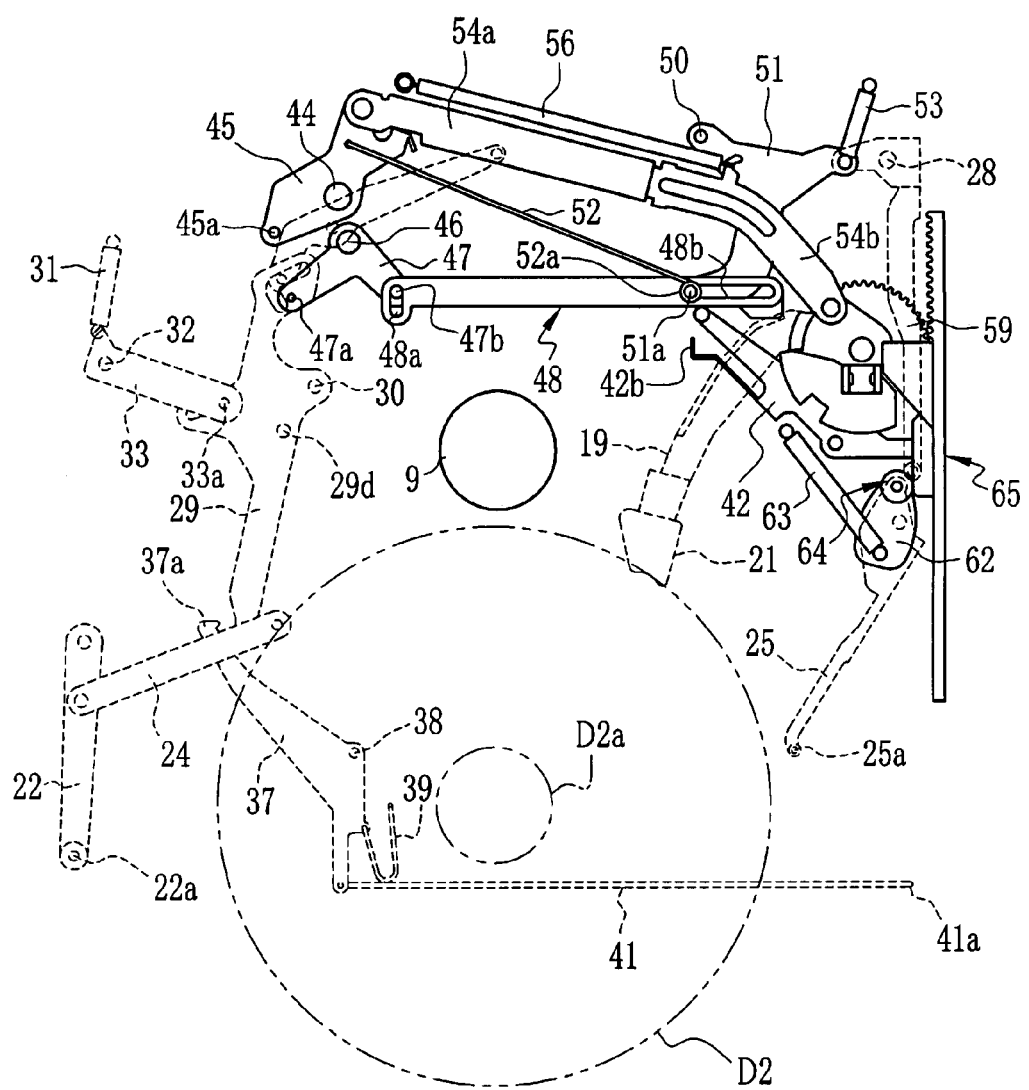
FIGS. 29-34 are bottom plans illustrating the arm driving component in steps of a sequence where the small disk is moved.
Figure 34:
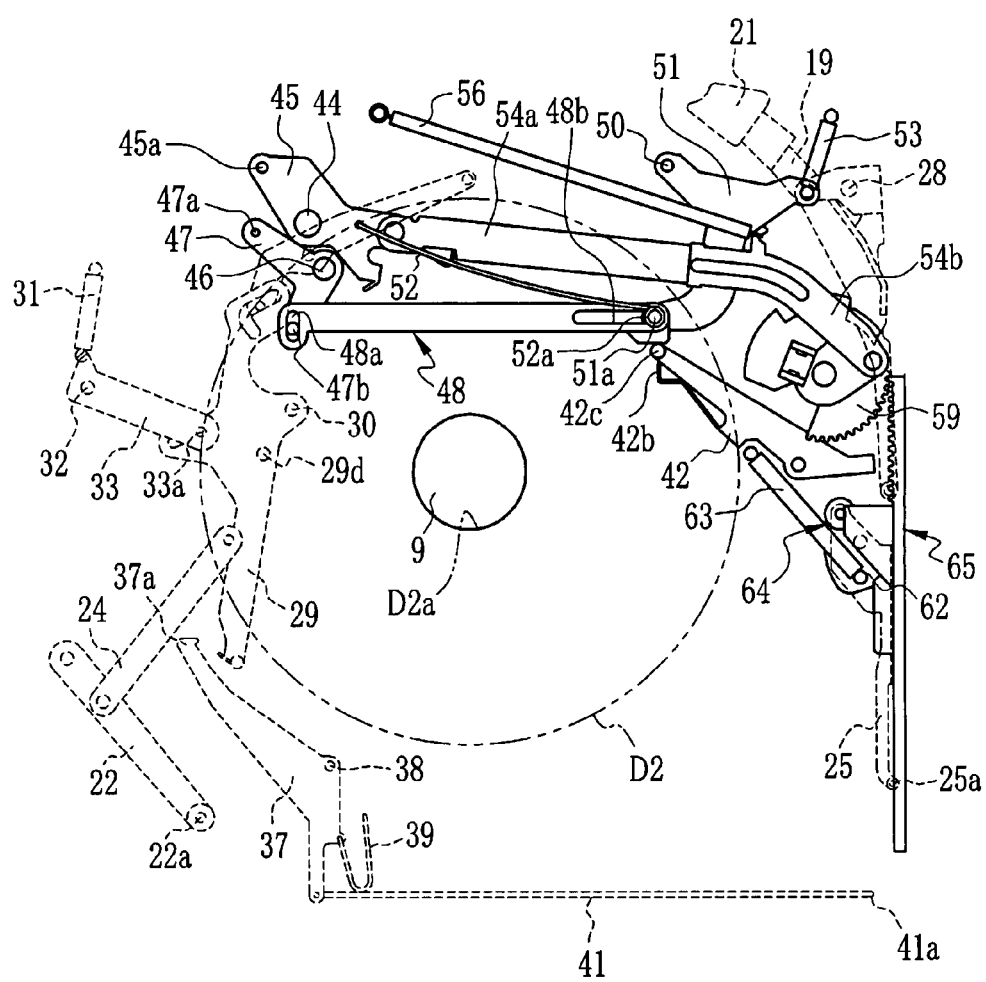

In FIGS. 28 and 34, a final state of driving the small disk D2 is illustrated in chucking of the chuck head 9 for the center hole D2a of the small disk D2. The loading slider 43 is stopped after moving back from the position of FIG. 27. The follower pin 47a is pushed up by the second groove end region 43b-2, to rotate the second pivot lever 47 in clockwise direction. The end pin 51a is driven in engagement with the slot 48b of the slider 48. The pivot lever 51 rotates clockwise in FIG. 34. The guide arm 27 is swung toward the outside, and comes not to support the small disk D2.

The follower pin 29d of the guide arm 29 is positioned in the inclined region at the end of the guide groove 43c-2 of the loading slider 43. The guide arm 29 rotates toward the outside to a small extent. The holding pin 29a comes away from the small disk D2 to terminate supporting. The swing of the guide arm 29 causes the guide arm 35 to swing toward the outside by cooperation of the guide groove 29c and the follower pin 35b. The guide arm 35 swings toward the outside, and comes away from the small disk D2 to terminate supporting.

During the period from the state of FIG. 27 to that of FIG. 28, the slider 48 moves horizontally in response to the backward slide of the loading slider 43. The follower pin 7a of the lifting frame 7 shifts from the inclined region 43e-2 to the upper cam end 43e-3 in the cam groove 43e of the loading slider 43. Also, the follower pin 7b shifts from the inclined region 48c-2 to the upper cam end 48c-3 of the cam groove 48c of the slider 48.

In operation, the lifting frame 7 is moved up by engagement of the inclined regions 43e-2 and 48c-2 with the follower pins 7a and 7b. In FIG. 35C, the chuck claws 9a of the chuck head 9 contact the center hole D2a to push up the small disk D2. The peripheral edge of the center hole D2a contacts the projection 2b of the case chassis 2.

When the follower pins 7a and 7b reach respectively the top of the inclined regions 43e-2 and 48c-2, the chuck head 9 in FIG. 35D becomes inserted in the center hole D2a of the small disk D2. The chuck claws 9a chuck the small disk D2 finally. The small disk D2 is retained on the turntable 10. Then the follower pins 7a and 7b shift to respectively the upper cam ends 43e-3 and 48c-3, to move down the lifting frame 7 to the position of FIG. 35E. The small disk D2 is ready to be driven.

Figure 35E:
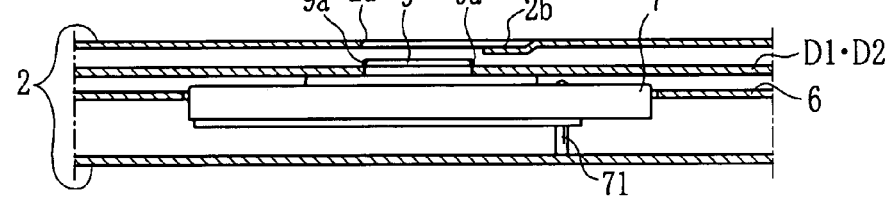
Figure 36A:
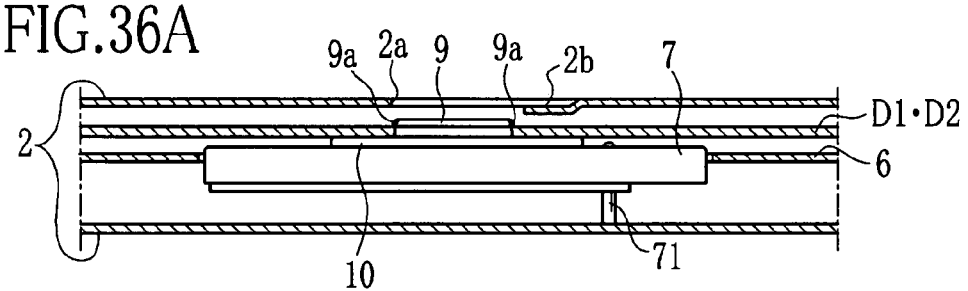
FIGS. 36A-36E are sections illustrating the optical disk drive in which a movable frame is moving down.
Figure 36B:
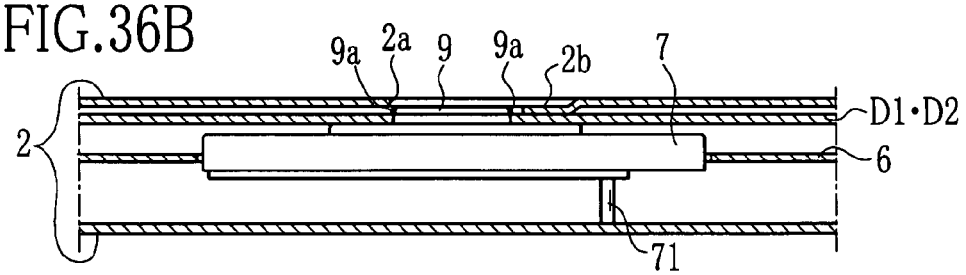
Figure 36C:
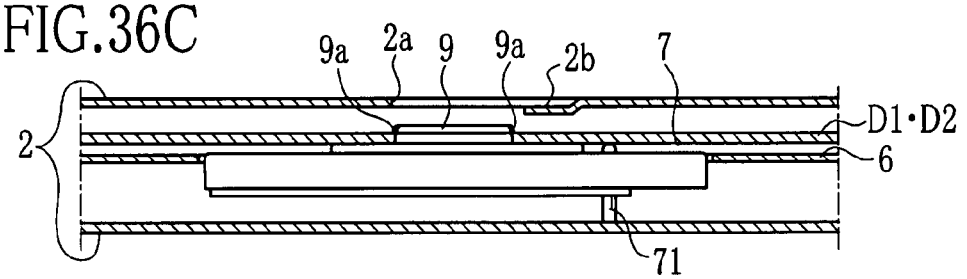
Figure 36D:
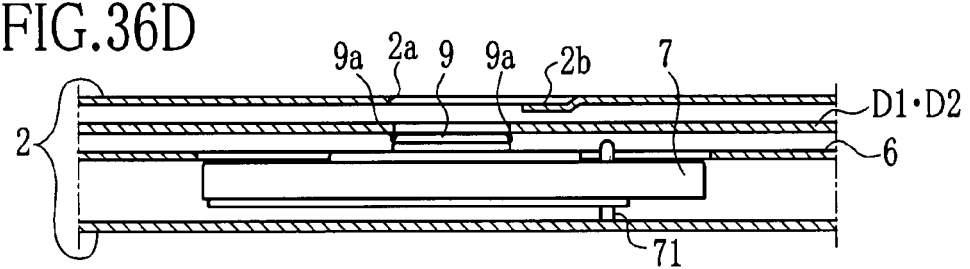
Figure 36E:
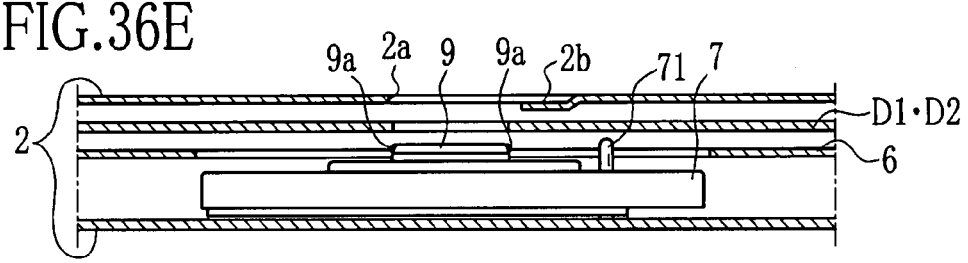

When the lifting frame 7 moves down to the position of FIG. 35E, the end of the loading slider 43 turns on the limit switch, to stop the loading motor 66. The spindle motor 11 rotates as described above, to enable writing to and reading from the small disk D2.

To remove the small disk D2, the ejection pushbutton 4 is depressed. In the similar manner to the large disk D1, the loading motor 66 rotates in reverse, to slide forwards the loading slider 43. Upon the start of the loading slider 43, the lifting frame 7 shifts sequentially in the manner of FIGS. 36A, 36B, 36C, 36D and 36E. At first, the lifting frame 7 moves up, and then moves down to the initial position. In FIG. 38C, the small disk D2 during this sequence is pushed up by the release pin 71 and released from chucking with the chuck head 9.

Before release of the small disk D2 from chucking, the guide arms 25, 27 and 29 move pivotally toward the center as illustrated in FIG. 27, and are ready for holding the peripheral edge of the small disk D2. Then the operation is in a sequence reverse to the above described order related to FIGS. 23-26. In the shift of the disk support arm 19 to the advance position, a proximal end of the small disk D2 is shifted to the ejection position defined outside the insertion slot 3a of the front bezel 3 by moving out the small disk D2. At the same time as this, the front end of the loading slider 43 turns on the limit switch to stop the loading motor 66.

Consequently, it is possible in the optical disk drive 1 of the invention to load disks automatically even with different diameters, because the three points of large and small disks D1 and D2 are supported with plural arms operating upon moving back and forth of the loading slider 43.

To start automatic loading, the disk support arm 19 is required to receive a disk reliably upon entry of the disk through the insertion slot 3a of the front bezel 3. The guide arm 29 guides the disk toward the disk support arm 19. However, stress may concentrate in an end portion of the guide arm 29 having the holding pin 29a, specifically when the small disk D2 enters. The guide arm 29 is likely to deform or break.

Occurrence of the mechanical load is described now. In FIG. 23, if the small disk D2 is located with a deviation to the left for insertion through the insertion slot 3a of the front bezel 3, the holding pin 25a of the guide arm 25 presses back the left lateral edge of the proximal end half of the small disk D2, and keeps the small disk D2 on its moving path without offsetting. In contrast to this, in FIG. 41A, the right lateral edge of the distal end half of the small disk D2 presses the holding pin 29a of the guide arm 29 and swings the same toward the outside. In FIG. 41B, the tongue 29b is retained by the angle portion or hook 37a of the lock lever 37. Thus, the guide arm 29 can move back the small disk D2 into the moving path.

There is no resiliently supporting mechanism, as the guide arm 29 is prevented forcibly in a mechanical manner by the angle portion or hook 37a of the lock lever 37 from swinging outwards. When the holding pin 29a of the guide arm 29 is pressed by insertion of the small disk D2, mechanical load occurs to the tongue 29b and the angle portion or hook 37a of the lock lever 37. A contact portion between the tongue 29b and the angle portion or hook 37a may break or deform upon a considerable shock due to concentration of stress or the mechanical load, because the tongue 29b contacts the angle portion or hook 37a in a point-contact manner. The mechanical load may be also transmitted to other elements in connection with the guide arm 29 and the lock lever 37. Failure is very likely to occur in automatic disk loading, because a great error in the precision may occur as a result of total influence the mechanical load.

In the present construction, there is no use of the lock lever 37 as illustrated in FIG. 41, for the purpose of preventing mechanical load to the guide arm 29 upon insertion of the small disk D2. However, the guide arm 29 should have a structure for regulating the position of the small disk D2 in the lateral direction to prevent offsetting upon insertion into the insertion slot 3a.

In view of this, a spring for biasing the guide arm 29 characteristically has a great strength instead of using the lock lever 37. The small disk D2 is supported in a cushioned manner with the spring, and is kept positioned in the moving path without offsetting. Various elements in connection with the guide arm 29 may operate very smoothly if the strength of the spring on the guide arm 29 is too great. The bias applied to the guide arm 29 should be determined in a suitably high range in entry of the small disk D2. A further preferred embodiment to satisfy this requirement will be described below.

Figure 42:
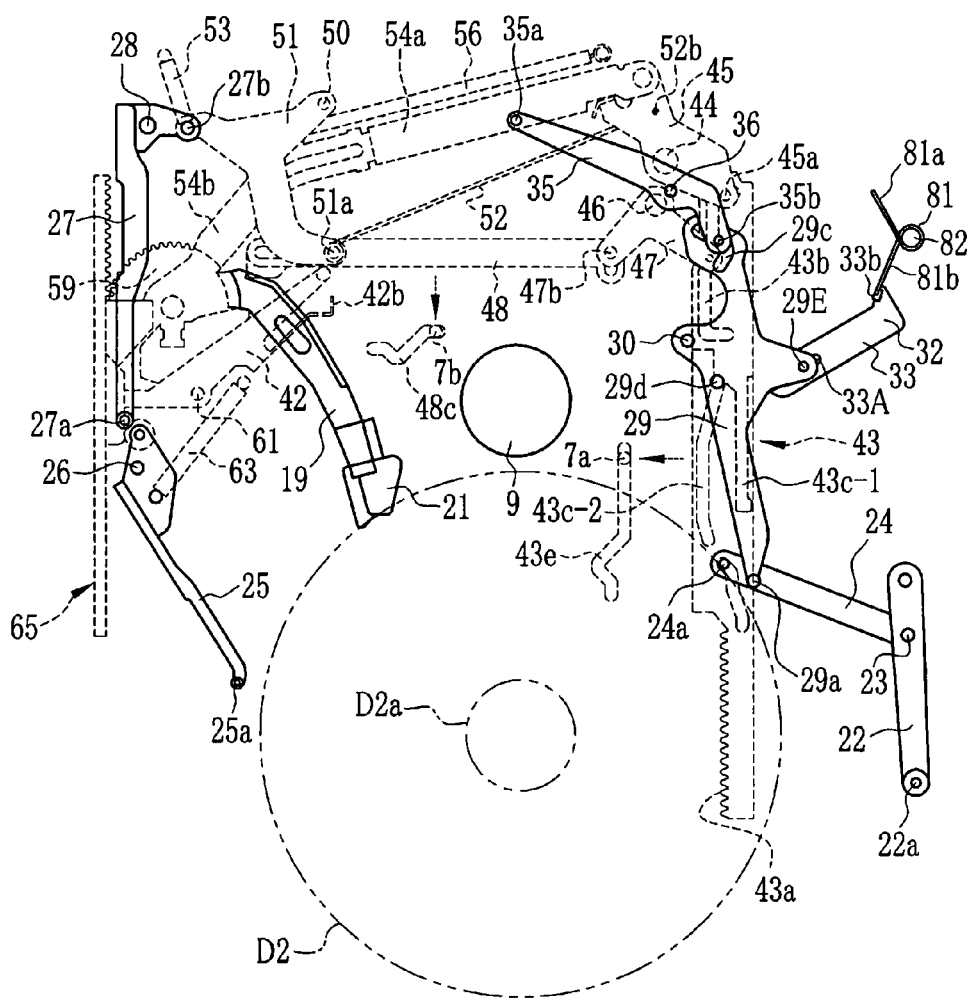
FIG. 42 is a plan illustrating the loading mechanism of which the lock lever is eliminated.
Figure 43:
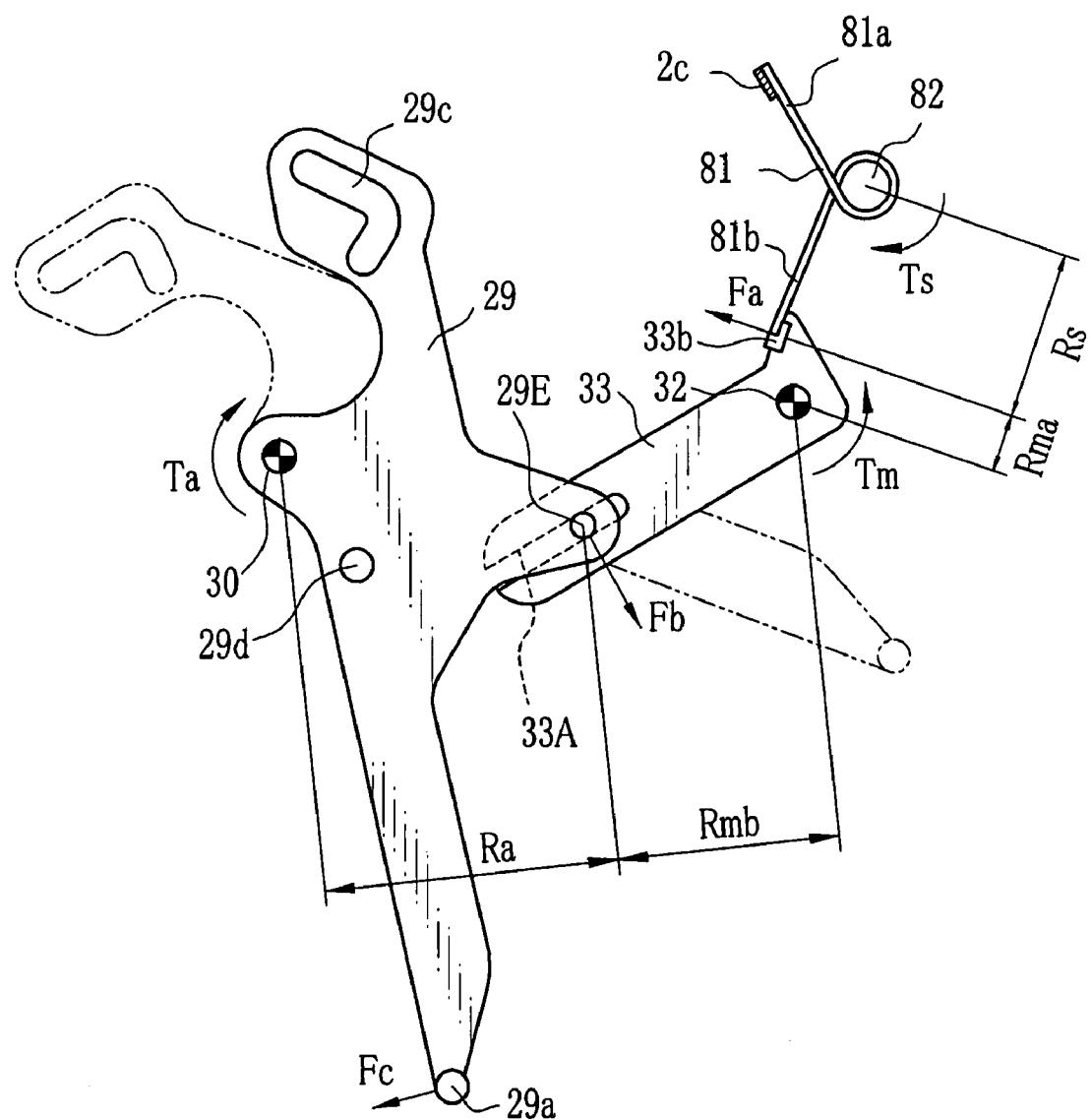
FIG. 43 is an explanatory view illustrating a main portion of the loading mechanism of FIG. 42.

In FIG. 42, a torsion coil spring 81 is used in place of the tension coil spring 31 for biasing the link lever 33 connected with the guide arm 29. An arm pin 29E is formed on the guide arm 29. A lever groove 33A is formed in the link lever 33, and receives insertion of the arm pin 29E. In FIG. 43, the guide arm 29, the link lever 33 and the torsion coil spring 81 are illustrated in enlargement. A rivet pin 82 protrudes from the case chassis 2, and supports a coil portion of the torsion coil spring 81. The torsion coil spring 81 includes spring end portions 81a and 81b. The spring end portion 81a is retained on a stopper 2c formed with the case chassis 2. The spring end portion 81b is connected with a retaining claw 33b at the rear end of the link lever 33. Note that the spring end portion 81b should be slidable on the link lever 33 without firmly attaching to the link lever 33.

Force Fa of the bias with resiliency of the torsion coil spring 81 is transmitted by the link lever 33 to the guide arm 29 as force Fb. In the guide arm 29, force Fc of the bias toward the center is exerted at the end of the guide arm 29. The force Fa is proportional to the torque Ts of the torsion coil spring 81. The force Fb is proportional to the torque Tm generated by the link lever 33 about the rivet pin 32. The force Fc is proportional to the torque Ta generated by the guide arm 29 about the rivet pin 30. Note that the lever groove 33A of the link lever 33 is retained by the arm pin 29E of the guide arm 29. The guide arm 29 is stopped in the state of FIG. 43.

Torques Tm and Ta are determined according to the known formula in mechanics as science. On the condition without considering the angle of applied force in the longitudinal direction, torque T is found as T=R.F where R is a length from a rotational center to a point of exertion of force, and F is force. On the basis of the equation, the torque Tm of the link lever 33 is determined as $$Tm=(Ts/Rs).Rma$$

In the equation, Ts is torque applied by the torsion coil spring 81, and Rs is a radius of a retaining point of the spring end portion 81b from the center of the torsion coil spring 81. Rma is a length from the retaining point of the spring end portion 81b to the center of the rivet pin 32.

The torque Ta of the guide arm 29 is obtained according to the equation of $$Ta=(Tm/Rmb).Ra=(Rma.Ra/Rmb.Rs).Ts$$

In the equation, Rmb is a distance from the center of the rivet pin 32 to the arm pin 29E. Ra is a distance from the center of the arm pin 29E to the center of the rivet pin 30. Let d be a distance from the center of the rivet pin 30 to the holding pin 29a at the end of the guide arm 29. The length d is constant, so that the torque is Ta=d.Fc. Therefore, the force Fc=Ta/d, namely is changeable according to the torque Ta.

Figure 44:
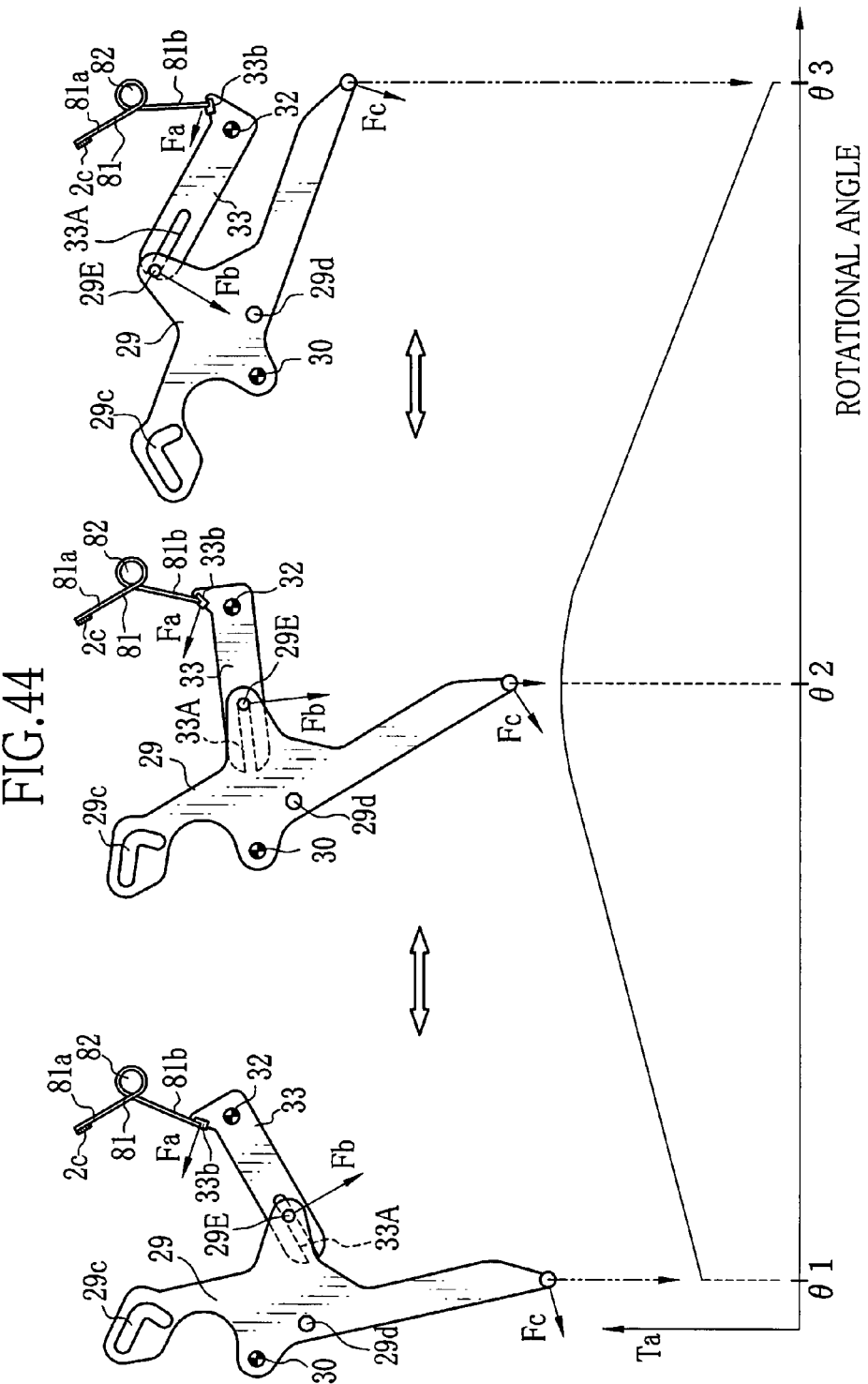
FIG. 44 is an explanatory view illustrating correlation of elements in the main portion of the loading mechanism.
Figure 45:
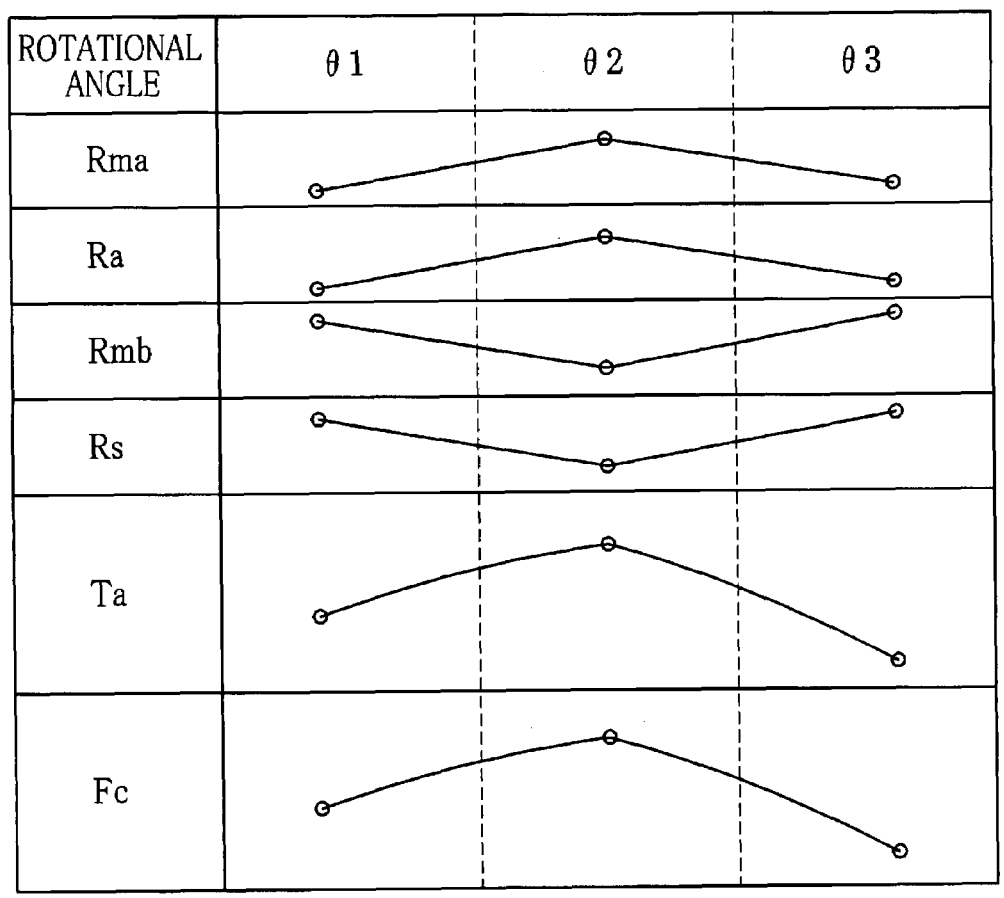
FIG. 45 is an explanatory view illustrating changes in torque.

In FIG. 45, changes in the lengths Rma, Ra, Rmb and Rs are indicated schematically and associated with states depicted in FIG. 44. Heights of the plotted positions in the columns express values of the lengths Rma, Ra, Rmb and Rs. The length values of the Rma, Ra, Rmb and Rs are considered in combination with the equation Ta=(Rma.Ra/Rmb.Rs).Ts. When the rotational angle of the guide arm 29 changes from θ1 to θ2, the torque Ta increases. When the rotational angle of the guide arm 29 is θ2, the torque Ta is the highest. Also, the force Fc of biasing is the highest. When the rotational angle of the guide arm 29 changes from θ2 to θ3, the torque Ta decreases. While the guide arm 29 swings, the divisor Rmb.Rs in the fraction expression changes in reverse to the change in the dividend Rma. Ra. Thus, the change in the torque Ta is abrupt.

When the guide arm 29 is positioned at the rotational angle θ1, the force Fc of the bias at its end is relatively small. When the guide arm 29 swings toward the outside, the force Fc increases gradually. When the guide arm 29 is at the rotational angle θ2, the force Fc of the bias becomes the highest at a peak, and regulates the position of the small disk D2 in the lateral direction.

Figure 46:
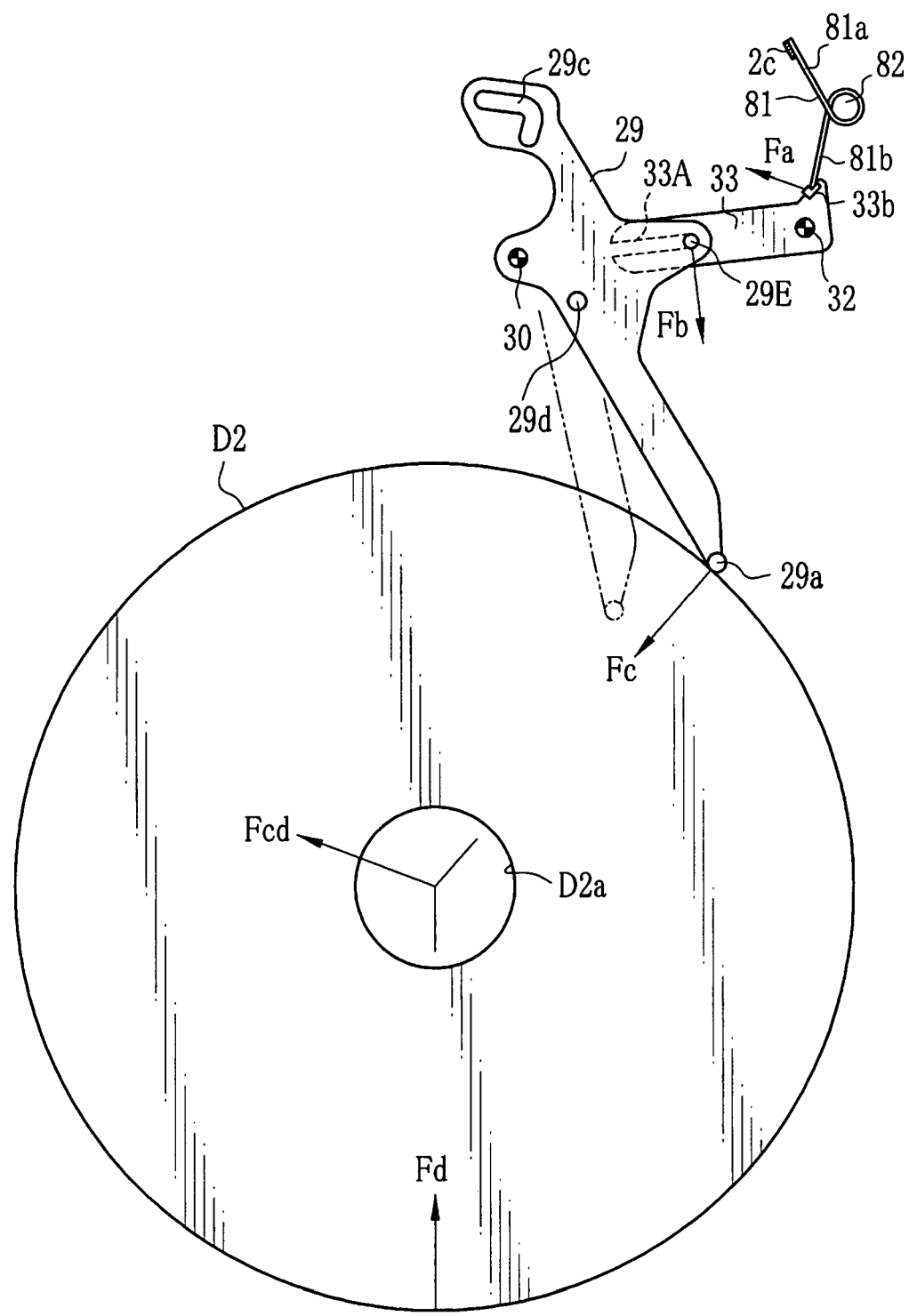
FIG. 46 is an explanatory view illustrating operation of the main portion of the loading mechanism.

In FIG. 46, a state of the small disk D2 with a deviation to the right in the insertion slot 3a of the front bezel 3 is illustrated. Force Fd of the small disk D2 in the entry swings the guide arm 29 from the initial position of the phantom line toward the outside. Thus, the biasing force Fc of the guide arm 29 increases. The biasing force Fc is exerted to press back the small disk D2. Added force Fcd as a sum of components of the biasing force Fc and the force Fd for advance of the small disk D2 is exerted to guide the small disk D2 on the moving path. If the force Fd is small, the small disk d2 is moved back in the direction of ejection.

Consequently, the structure of the guide arm 29 with the force Fc maximized in the middle of the range is effective in obtaining performance of regulating the position of the small disk D2 in the lateral direction and cushioning to the small disk D2. Also, strength of the torsion coil spring 81 can be set at a normal level without excessive value. The simple structure with the guide arm 29 can operate to guide the large disk D1 through the insertion slot 3a as well as the small disk D2. So the lead wire 41, the lock lever 37 and other elements are not required in the embodiment. The loading mechanism can be constructed simply. Mechanical load is prevented from occurring in the initial phase of the entry of a disk.

To insert the large disk D1 through the insertion slot 3a, the large disk D1 is entered to the position of FIG. 11 by manual operation of a user. The guide arm 29 swings to the rotational angle of θ2. In the succeeding phase of the automatic loading, the rotational angle changes from θ2 to θ1. The biasing force Fc decreases so no unwanted load is applied to disk moving. In moving out of the large disk D1, the moving is completed before the increase in the biasing force Fc. No unwanted load is applied to the disk moving.

Figure 47:
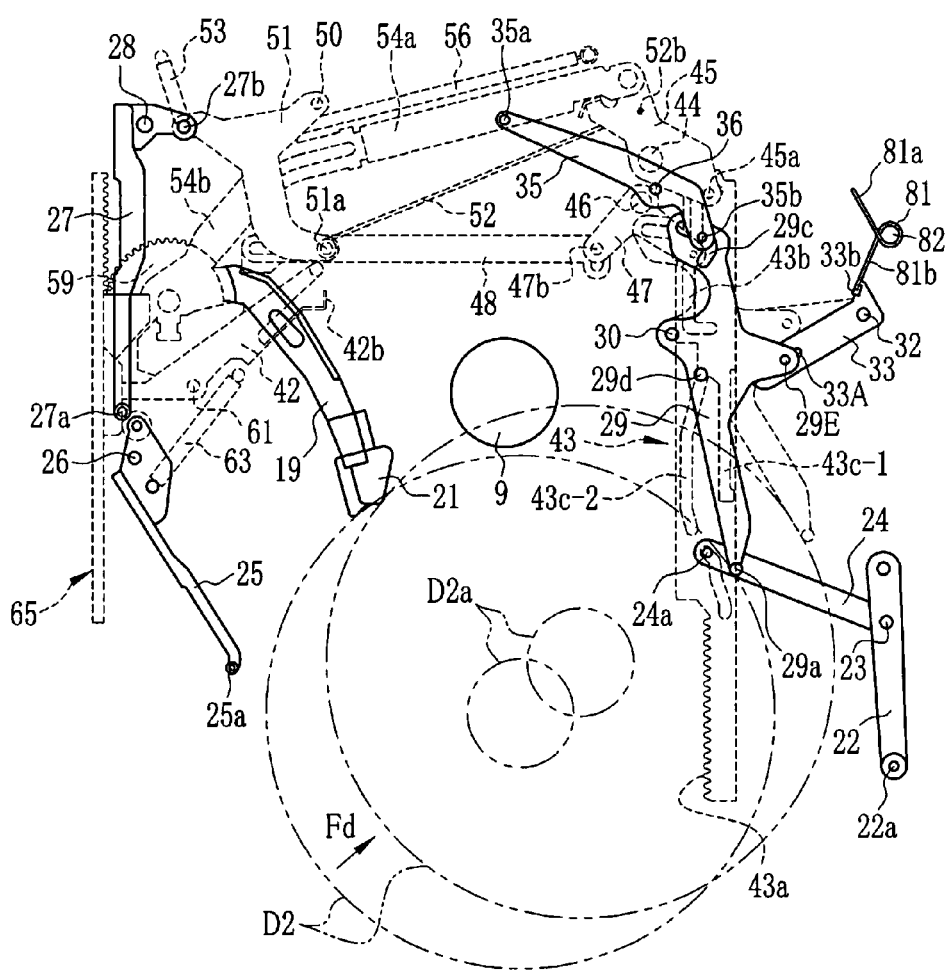
FIG. 47 is a plan illustrating the loading mechanism with failure in automatic loading of the small disk.

In the optical disk drive 1, the torsion coil spring 81 can cause the guide arm 29 to guide a disk without increase in the load of disk moving. In FIG. 47, exertion of force Fd to the small disk D2 with an inclination is depicted for understanding. The small disk D2 is moved in against the torsion coil spring 81 with the inclination, and thus shifts from the position of the solid line to the position of the phantom line. The holder 21 of the disk support arm 19 contacts the disk on a tangential line of the peripheral edge of the small disk D2. The small disk D2 comes to the position of the phantom line without pressing the holder 21. This is failure in the initial operation of the swing of the disk support arm 19 by the force of the small disk D2. The loading motor 66 does not start, so no automatic loading will start.

Figure 48:
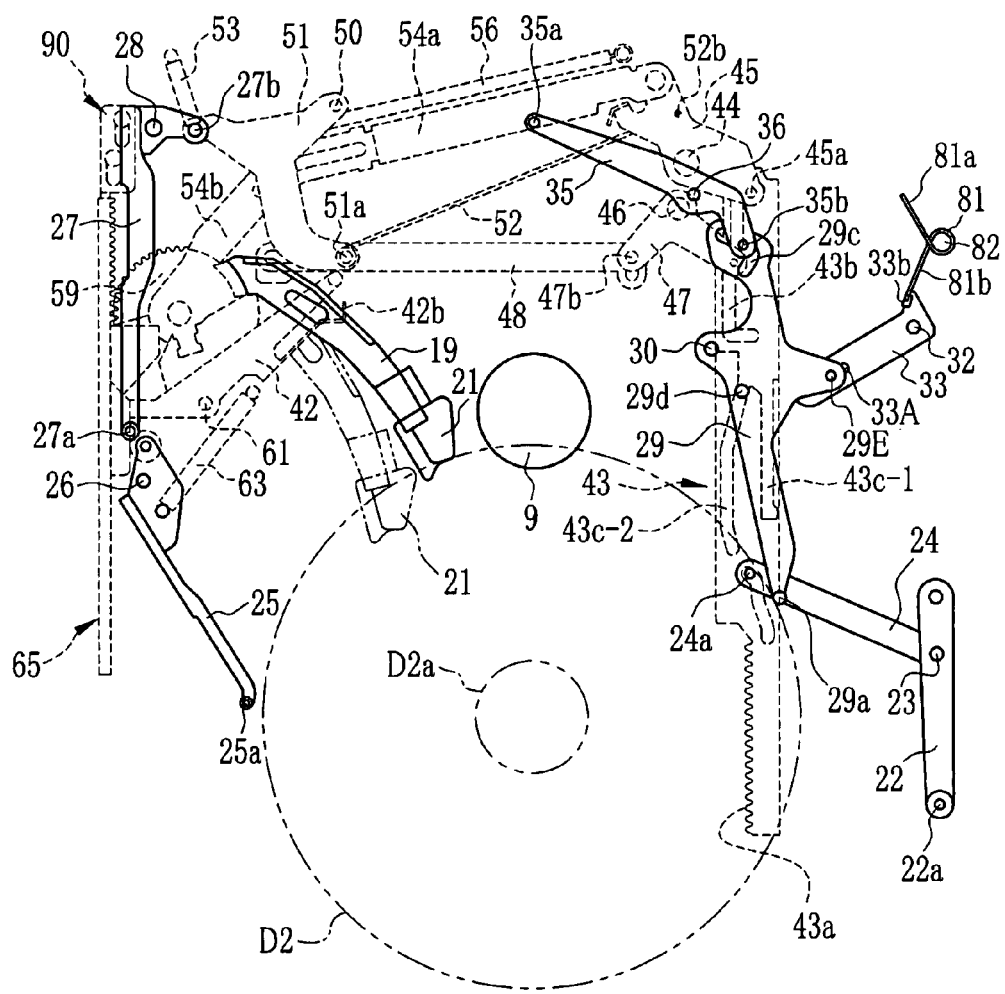
FIG. 48 is a plan illustrating the loading mechanism in a state of a disk support arm in the ready position.

In the embodiment, the disk support arm 19 moves back in the inward direction to a small extent in FIG. 48 from the advance position of the phantom line for completion of moving out the large or small disk D1 or D2 toward the ready position indicated by the solid line. In the second position, the holder 21 receives the peripheral edge of the small disk D2 even if there is an inclination of the small disk D2 in the insertion. An initial operation to swing the disk support arm 19 can be reliable.

A range of the swing of the disk support arm 19 from the advance position to the ready position is outside a region controllable by the loading slider 43 in the entry of a disk. An additional structure is required for forcibly swinging back the disk support arm 19. To this end, a return mechanism 90 in FIG. 48 is associated with a rear end of the rack sliding mechanism 65.

Figure 49:
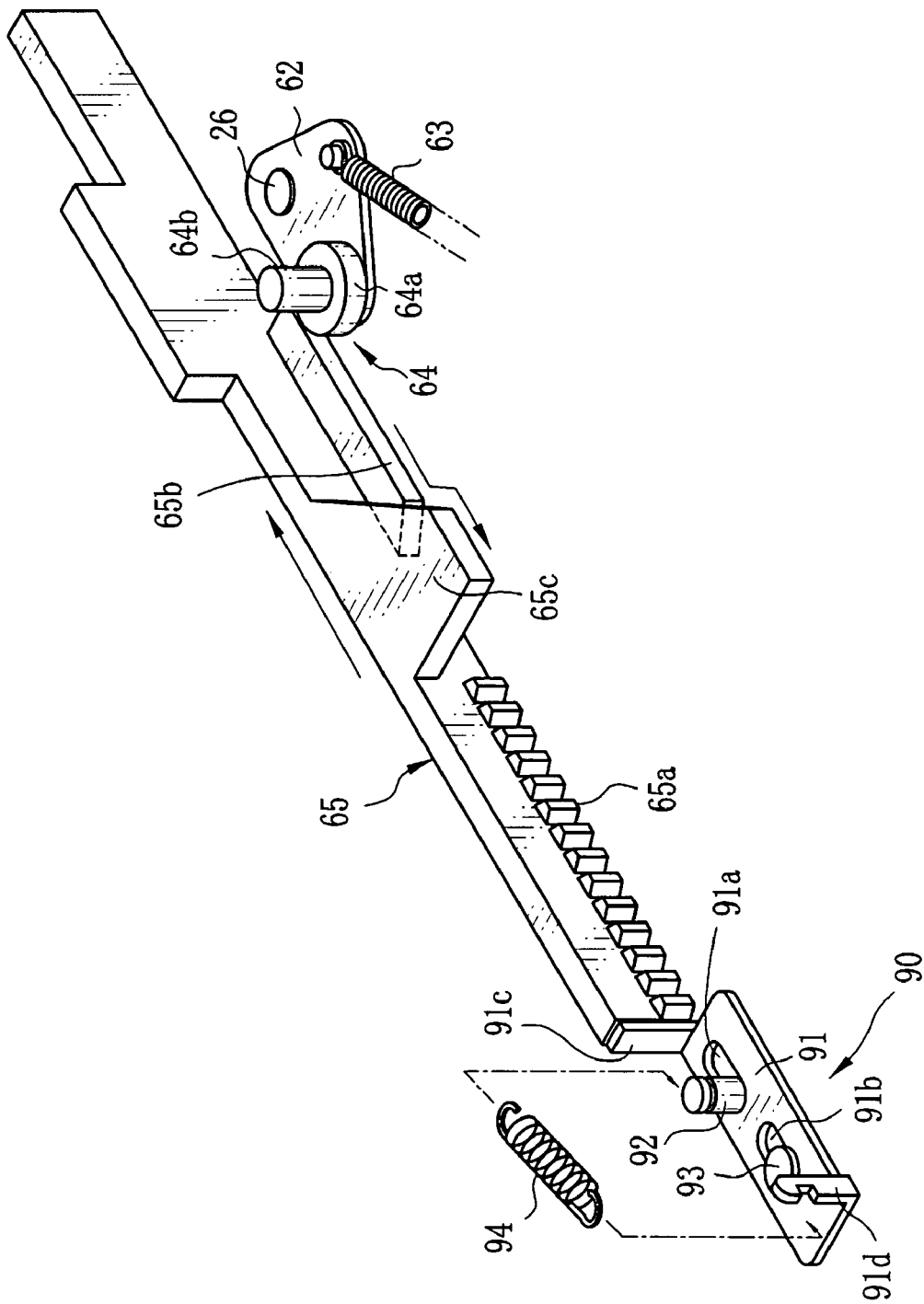
FIG. 49 is a perspective view illustrating a return mechanism.

A slide plate 91 is a main element of the return mechanism 90. In FIG. 49, the slide plate 91 includes slots 91a and 91b and a pressing end 91c. Rivet pins 92 and 93 are secured to a lower surface of the case chassis 2, and are inserted in the slots 91a and 91b for supporting the slide plate 91 in a slidable manner. A region of the slide of the slide plate 91 is restricted by the length of the slots 91a and 91b where the rivet pins 92 and 93 are movable. A tension coil spring 94 is secured between a hook end 91d of the slide plate 91 and the rivet pin 92, to cause the pressing end 91c to press a rear end of the rack sliding mechanism 65.

Figure 50:
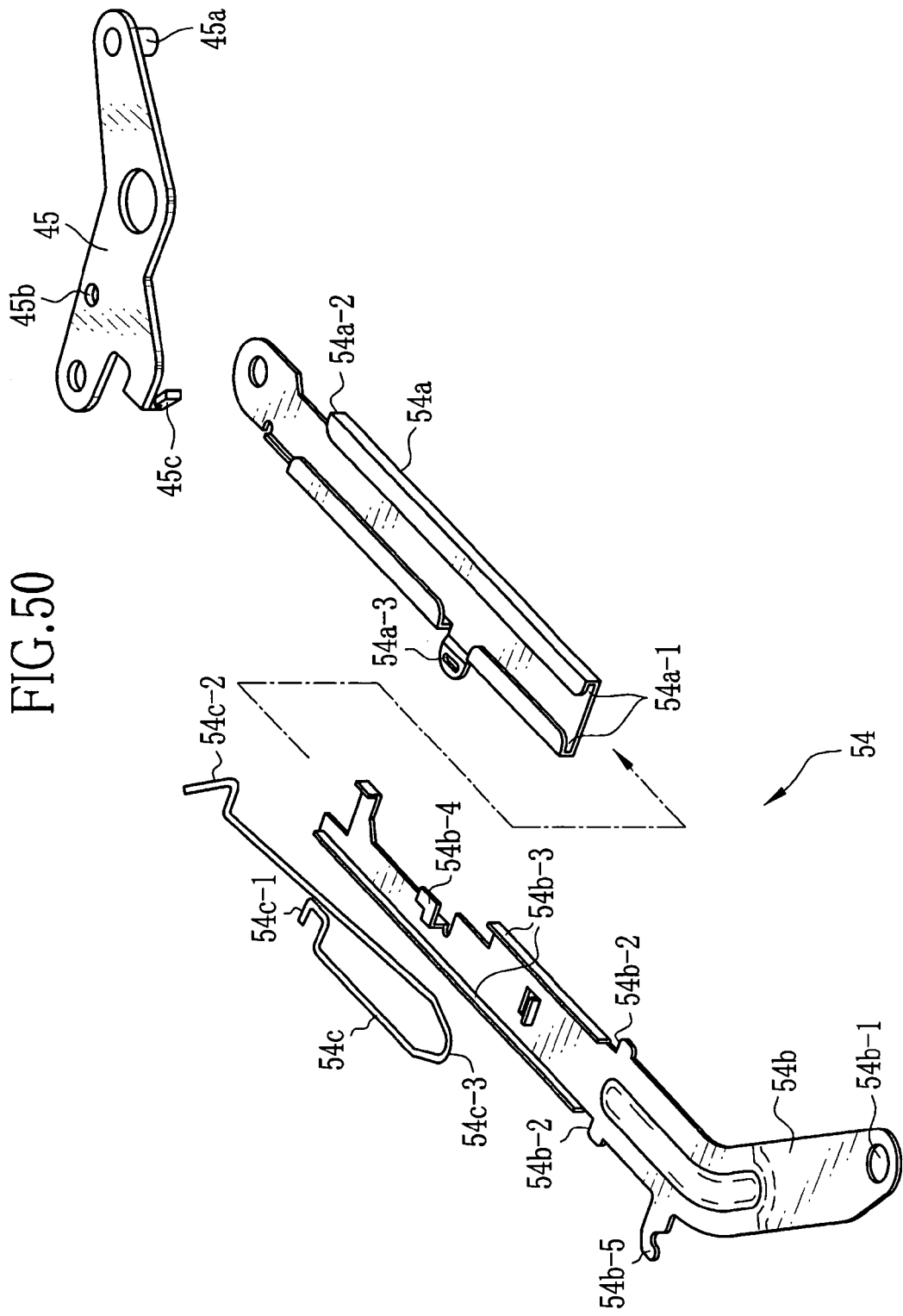
FIG. 50 is an exploded perspective illustrating a link arm.

When a locking mechanism for keeping the short state of the extendable link arm 54 is released, force of bias of the tension coil spring 94 for the return mechanism 90 is applied actually. A specific structure of the extendable link arm 54 is described now. In FIG. 50, the link arm member 54b for driving the disk support arm 19 directly has the through hole 54b-1 which is connected with the gear tooth disk 59 by the pivot pin 57. See FIG. 7.

Stopper projections 54b-2 protrude from the middle of the link arm member 54b and extend in opposite directions. Flanges 54b-3 or ridges are formed on the stopper projections 54b-2, extend in the longitudinal direction, and have a height that is slightly greater than a wire diameter of a lock spring 54c. The lock spring 54c as locking mechanism is a wire member produced by bending with resiliency. A retaining end 54c-1 is disposed on the lock spring 54c. A lock end 54c-2 is a second end of the lock spring 54c. A hook 54b-4 is formed on the link arm member 54b. The retaining end 54c-1 of the lock spring 54c is retained on the hook 54b-4, for the link arm member 54b to contain the lock spring 54c. A bend 54c-3 of the lock spring 54c exerts force of bias of the spring, to bias the lock end 54c-2 in an outward direction.

A guide channel 54a-1 is formed in the link arm member 54a as two gaps arranged in the width direction of the link arm member 54a. The link arm member 54b is inserted in the guide channel 54a-1 in a slidable manner. In FIG. 51A, a locked state is depicted, in which the lock end 54c-2 of the lock spring 54c appears externally through a channel end 54a-2 of the guide channel 54a-1. The extendable link arm 54 is kept shortened. In contrast, in FIG. 51B, an unlocked state is depicted. The lock end 54c-2 is located in the guide channel 54a-1. The extendable link arm 54 is in an elongated state.

A pressing end 45c is disposed on the first pivot lever 45 swinging according to moving back and forth of the loading slider 43. In FIG. 51A for the shortened state of the extendable link arm 54, the pressing end 45c presses the lock end 54c-2 of the lock spring 54c, to release the extendable link arm 54 from the shortened state. A hook 54b-5 protrudes from the link arm member 54b. The tension coil spring 56 extends between a hook 54a-3 of the link arm member 54a and the hook 54b-5, or between the hook 54a-3 of the link arm member 54a and a retaining hook on the lower surface of the case chassis 2. The extendable link arm 54 is biased in a direction toward the shortened state. Force of the bias of the tension coil spring 56 is lower than that of the tension coil spring 94.

Figure 52:
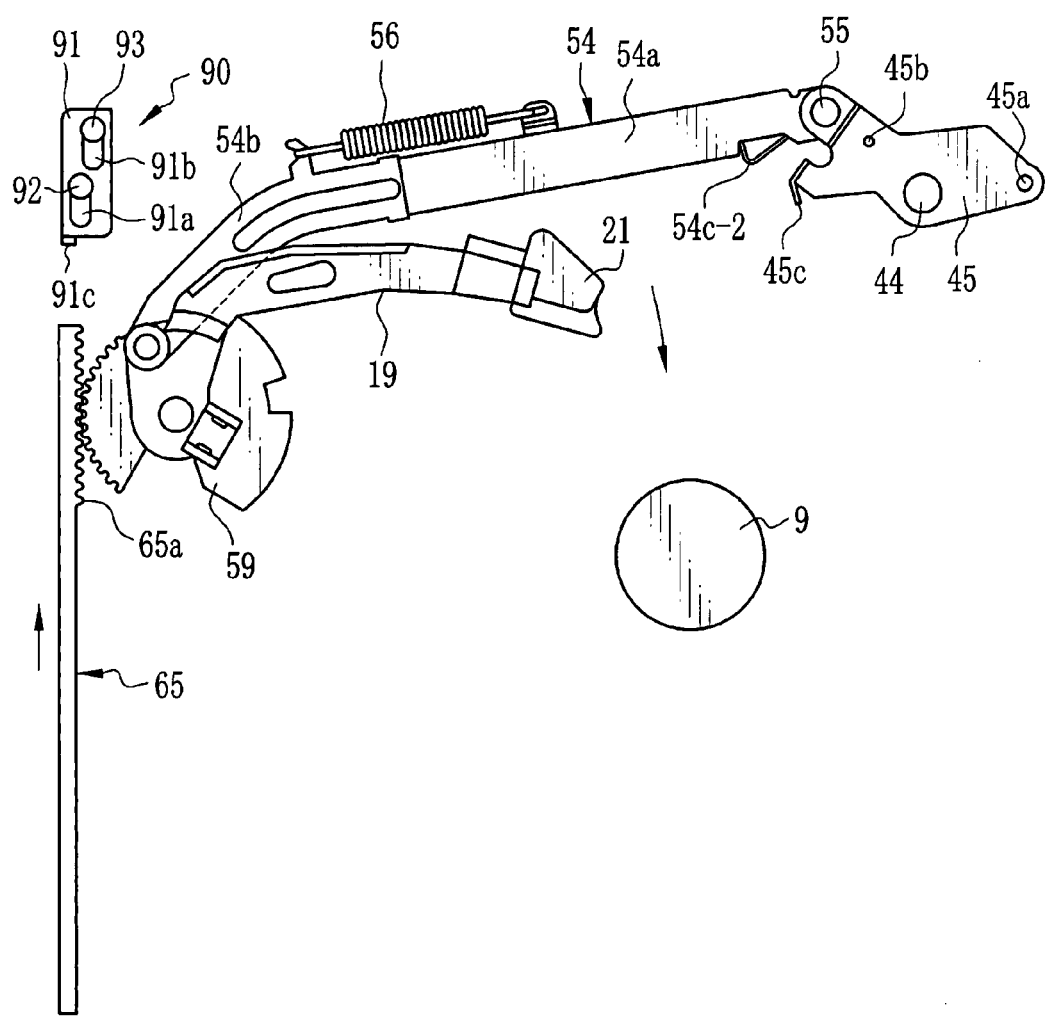
FIG. 52 is a plan illustrating a main portion of the embodiment in a middle phase of the disk unloading.

In the embodiment, force of bias of the return mechanism 90 is exerted upon release of the shortened state of the extendable link arm 54 described above. Details of this structure are described now. In FIG. 52, moving out of the large or small disk D1 or D2 is illustrated at the time of movement of the disk support arm 19 toward the center. This corresponds to the state of FIGS. 12 and 25.

Figure 53:
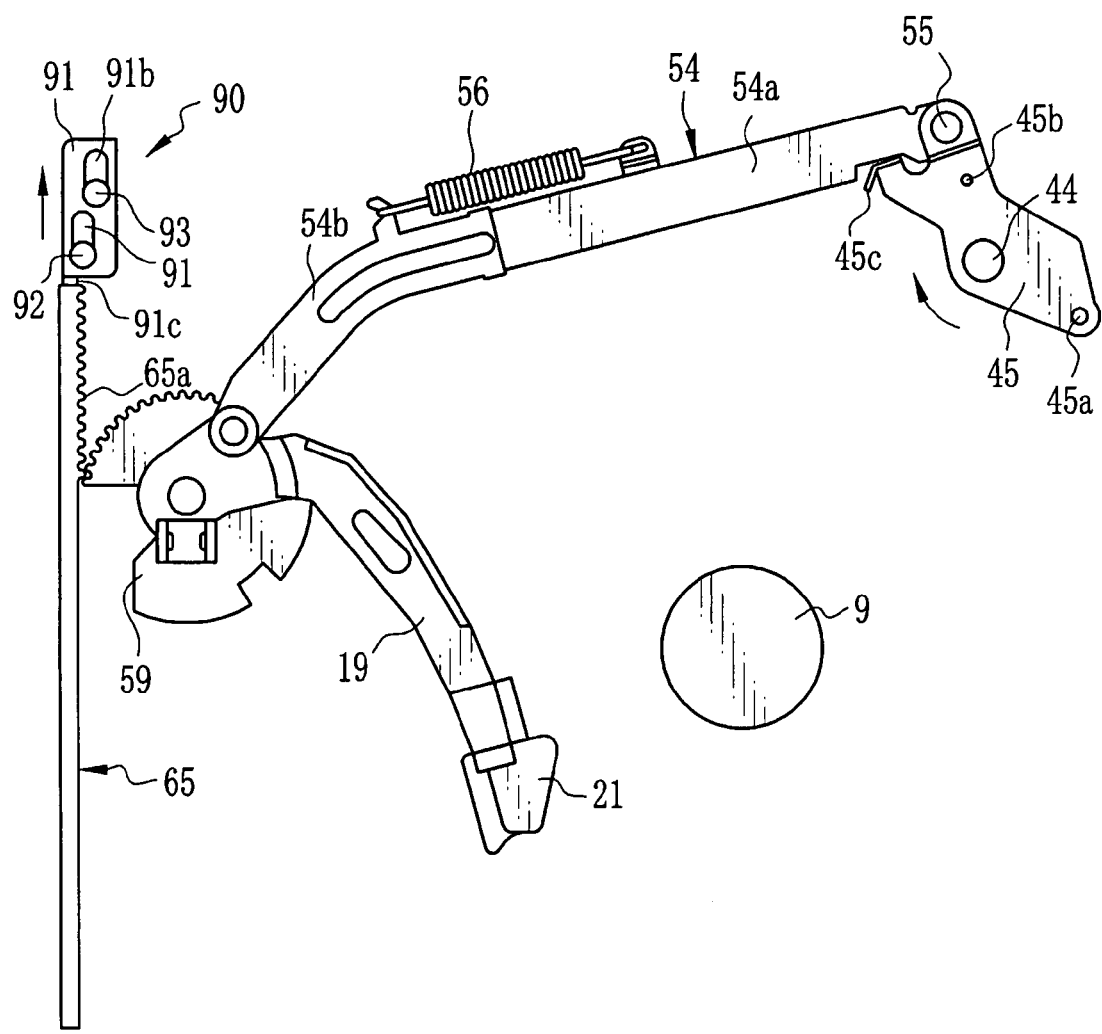
FIG. 53 is a plan illustrating the same as FIG. 52 but in a completion phase of the disk unloading.
Figure 54:
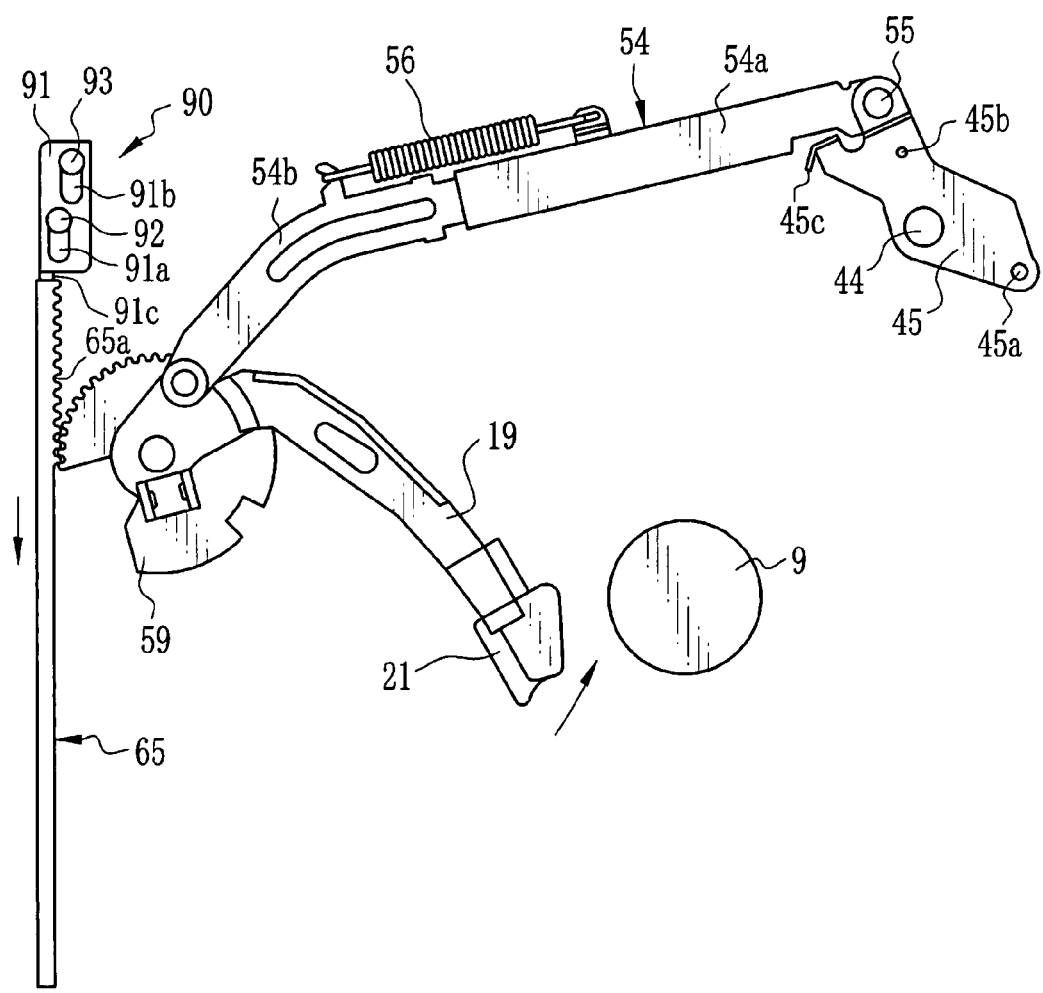
FIG. 54 is a plan illustrating the same as FIG. 52 but in a state of a disk support arm in the ready position.
Figure 55:
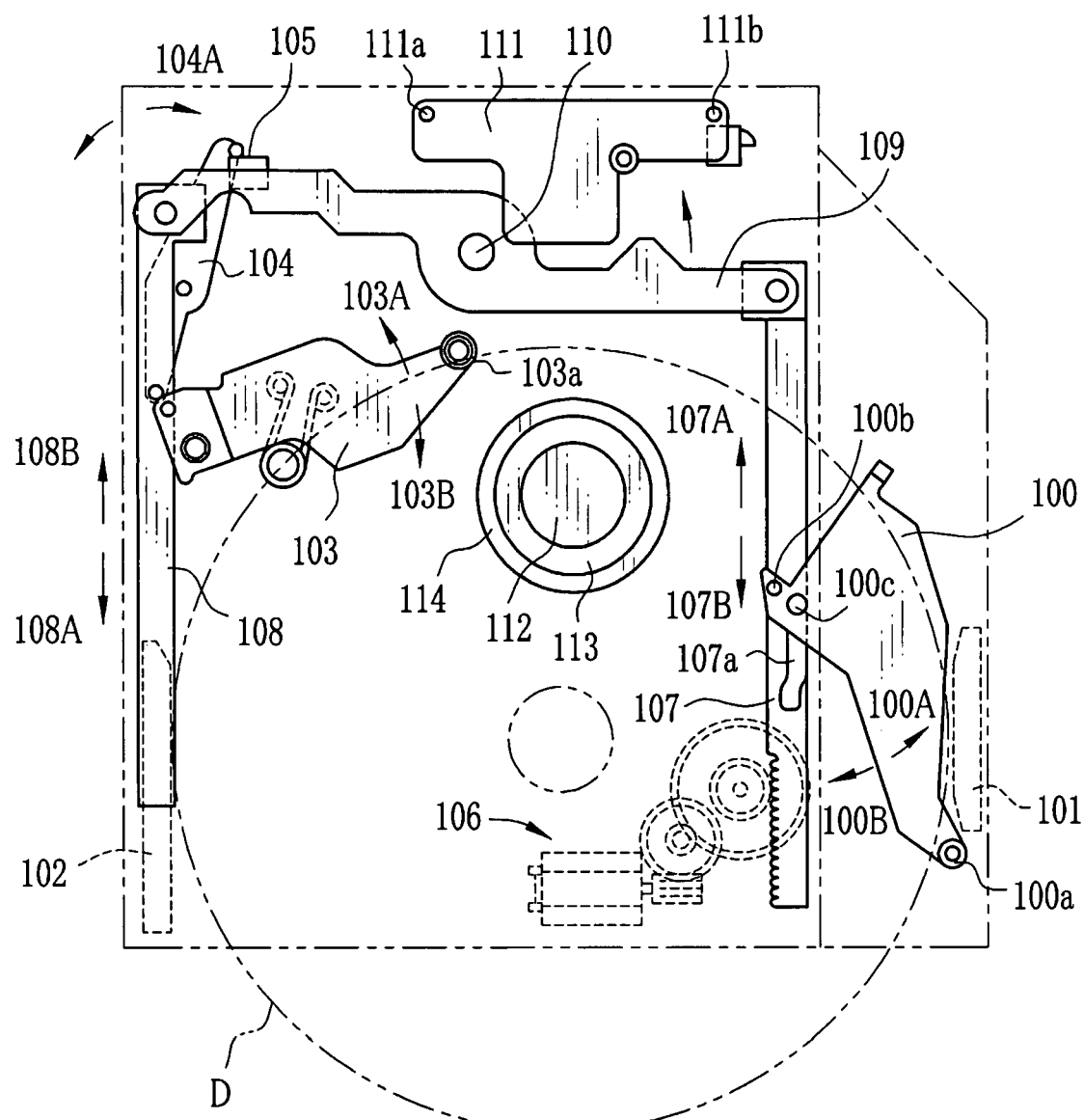
FIG. 55 is a plan illustrating the optical disk drive of a known construction in a middle phase of the disk loading.
Figure 56:
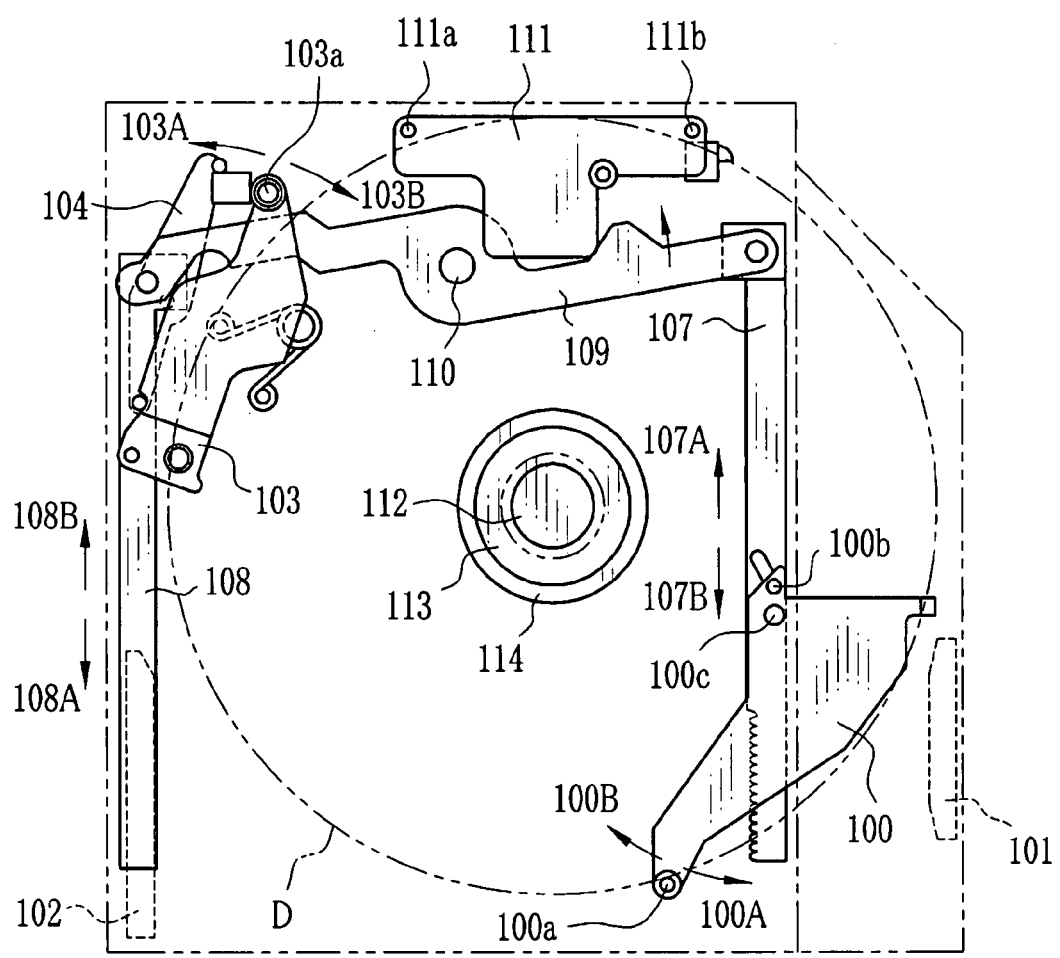
FIG. 56 is a plan illustrating the same as FIG. 55 but in a completion phase of the disk loading.

As described above, the advance of the loading slider 43 causes the extendable link arm 54 to rotate the gear tooth disk 59. In response, the disk support arm 19 moves to the advance position of completing the moving out of the disk. Rotation of the gear tooth disk 59 moves back the rack sliding mechanism 65 from the position of FIG. 52 to the position of FIG. 53. The rack sliding mechanism 65 presses the slide plate 91 in spite of the bias of the tension coil spring 94. When the extendable link arm 54 of the shortened state is unlocked, the pressing end 91c of the slide plate 91 is caused by the tension coil spring 94 to move forwards the rack sliding mechanism 65. The extendable link arm 54 becomes elongated while the tension coil spring 56 is extended. Also, the gear tooth disk 59 is caused to rotate by the extendable link arm 54 to swing the disk support arm 19 in the outward direction. The holder 21 moves back from the advance position of FIG. 53 to the ready position of FIG. 54, and becomes stopped. A distance in which the slide plate 91 moves forwards the rack sliding mechanism 65 is determined by lengths of the slots 91a and 91b of the slide plate 91.

In the final phase of moving out a disk on the disk support arm 19, the disk support arm 19 in FIG. 48 swings to the advance position indicated by the phantom line to complete the unloading. Then the disk support arm 19 moves back to the ready position indicated by the solid line, and stops. The small disk D2 inserted through the insertion slot 3a of the front bezel 3 reliably receives the holder 21 of the disk support arm 19, to start automated loading.

Note that the loading slider 43 moves back upon rotation of the loading motor 66 at the time of loading. The extendable link arm 54 is pressed by means of the first pivot lever 45 toward the gear tooth disk 59. The extendable link arm 54 shifts to a shorter state, and locked by the lock spring 54c in this state.

In the above embodiment, the tension coil spring 94 and the slide plate 91 in the return mechanism 90 presses the rack sliding mechanism 65. Alternatively, the disk support arm 19 may be moved back to the advance position before the loading motor 66 is rotated backwards to return the disk support arm 19 to the ready position. Furthermore, an electromagnetic solenoid may be utilized to actuate the rack sliding mechanism 65. Also, a solenoid with a mechanical structure may be used directly to rotate the disk support arm 19.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A disk device, having a case and an insertion slot formed in a front of said case, for disk loading and disk unloading of a disk of any one of two types different in a diameter, comprising:

a chuck head, disposed in a middle of said case, for chucking and rotating said disk loaded in a chuck position;

plural arms for contacting a peripheral edge of said disk to guide said disk, said arms guiding said disk toward said chuck position for said disk loading upon partial entry of said disk in said case though said insertion slot, said arms guiding said disk for said disk unloading from said chuck position toward an ejection position where said disk partially protrudes through said insertion slot to appear externally;

a disk support arm, movable pivotally, for supporting said peripheral edge of said disk, said disk support arm being set in a ready position for said disk loading, for receiving said peripheral edge of said disk entered through said insertion slot, said disk support arm being shifted back with said disk when said disk moves to said chuck position, wherein said disk support arm, upon completion of said disk loading, is kept in a separate position away from said peripheral edge of said disk in said chuck position, and is then shifted from said separate position to press and move said disk toward said ejection position and further shifted to an advance position during said disk unloading; and an arm driving component for pivotally shifting said disk support arm and said arms, said arm driving component being actuated when said disk support arm shifts back from said ready position for said disk loading, for shifting said disk support arm to said separate position pivotally, wherein said arm driving component is actuated for said disk unloading, for shifting said disk support arm pivotally from said separate position to said advance position, and for shifting back said disk support arm from said advance position to said ready position that is offset toward said chuck head by predetermined distance.

2. A disk device as defined in claim 1, wherein said disk support arm includes an end portion for supporting said peripheral edge, and a proximal portion supported on a shaft positioned laterally in said case.

3. A disk device as defined in claim 2, wherein said disk support arm has a holder, disposed at said end portion, and having a holder groove for receiving entry of said peripheral edge.

4. A disk device as defined in claim 2, wherein said arm driving component includes:
a loading motor;
a loading slider, operated for sliding by rotation of said loading motor, for moving said arms; and
a link arm in connection with said loading slider, for pivotally shifting said disk support arm.

5. A disk device as defined in claim 4, wherein said arm driving component includes:
a gear tooth disk disposed on said proximal portion of said disk support arm;
a rack sliding mechanism, meshed with said gear tooth disk, for moving forwards in said disk loading, and for moving backwards in said disk unloading;
a return mechanism for moving said rack sliding mechanism forwards by a predetermined distance after said disk unloading, to return said disk support arm from said advance position to said ready position by rotating said gear tooth disk; and
an arm length adjuster for adjusting a length of said link arm while said rack sliding mechanism returns by said predetermined distance.

6. A disk device as defined in claim 5, wherein said return mechanism includes:
a slide plate, pressed by said rack sliding mechanism at a final step in said disk unloading, for moving back; and
a biasing structure for biasing said slide plate forwards.

7. A disk device as defined in claim 5, wherein said arm length adjuster includes:
first and second link arm members for constituting said link arm, said second link arm member being kept slidable on said first link arm member in connection; and
a locking mechanism for keeping said link arm shortened when in a locked state, said link arm being in said locked state at an intermediate step in said disk loading, and being in an unlocked state when said disk support arm reaches said advance position, wherein when in said unlocked state, said second link arm member slides on said first link arm member for allowing said return mechanism to advance said rack sliding mechanism and to rotate said gear tooth disk.

8. A disk device as defined in claim 7, wherein said locking mechanism includes a lock spring structure secured to said second link arm member, wherein one end of said lock spring structure is retained on said first link arm member when in said locked state, and being removed from said first link arm member when in said unlocked state.

9. A disk device as defined in claim 1, further comprising a torsion coil spring for biasing a first arm included in said plural arms, with force to direct an arm end of said first arm toward said chuck head, so as to regulate said disk of a smaller one of said types passing through said insertion slot with reference to a lateral direction inside said case, wherein said force increases with a peak at a middle point within a pivotal moving range of said arm end of said first arm.

10. A disk device, having a case and an insertion slot formed in a front of said case, for disk loading and disk unloading of a disk of any one of two types different in a diameter, comprising:
plural arms for contacting a peripheral edge of said disk to guide said disk;
a disk support arm for supporting said peripheral edge of said disk, and for moving said disk, said disk support arm being shifted backwards for said disk loading, and then shifted forwards for said disk unloading; and
an arm driving component for driving said disk support arm, to shift backwards said disk support arm by a predetermined distance after said disk unloading, so as to enable reception of said disk of any one of said two types entered through said insertion slot.

* * * * *

UNITED STATES PATENT AND TRADEMARK OFFICE
CERTIFICATE OF CORRECTION

| | | |
|---|---|---|
| PATENT NO. | : 7,706,360 B2 | Page 1 of 1 |
| APPLICATION NO. | : 11/807243 | |
| DATED | : April 27, 2010 | |
| INVENTOR(S) | : Shinichi Fujisawa | |

It is certified that error appears in the above-identified patent and that said Letters Patent is hereby corrected as shown below:

Column 22, Line 36
"said disk in case though said insertion slot" should read, --said disk in case through said insertion slot--.

Column 22, Line 64
"offset toward said chuck head by predetermined distance" should read, --offset toward said chuck head by a predetermined distance--.

Signed and Sealed this

Fifth Day of October, 2010

David J. Kappos
*Director of the United States Patent and Trademark Office*